US010633288B2

(12) United States Patent
Shao et al.

(10) Patent No.: US 10,633,288 B2
(45) Date of Patent: Apr. 28, 2020

(54) CARBONATE-BONDED CONSTRUCTION PRODUCTS FROM STEEL-MAKING RESIDUES AND METHOD FOR MAKING THE SAME

(71) Applicant: THE ROYAL INSTITUTION FOR THE ADVANCEMENT OF LEARNING/MCGILL UNIVERSITY, Montréal (CA)

(72) Inventors: Yixin Shao, Ile-Perrot (CA); Mehrdad Mahoutian, Montréal (CA); Zaid Ghouleh, Mount Royal (CA)

(73) Assignee: CARBICRETE INC., Montreal (CA)

( * ) Notice: Subject to any disclaimer, the term of this patent is extended or adjusted under 35 U.S.C. 154(b) by 0 days.

(21) Appl. No.: 16/135,318

(22) Filed: Sep. 19, 2018

(65) Prior Publication Data
US 2019/0084884 A1     Mar. 21, 2019

Related U.S. Application Data

(62) Division of application No. 15/124,856, filed as application No. PCT/CA2015/000176 on Mar. 23, 2015, now Pat. No. 10,112,871.

(60) Provisional application No. 61/968,991, filed on Mar. 21, 2014.

(51) Int. Cl.
| | | |
|---|---|---|
| *C04B 28/08* | (2006.01) |
| *B28B 1/14* | (2006.01) |
| *B28B 11/24* | (2006.01) |
| *E04C 1/00* | (2006.01) |

(52) U.S. Cl.
CPC .............. *C04B 28/082* (2013.01); *B28B 1/14* (2013.01); *B28B 11/245* (2013.01); *E04C 1/00* (2013.01); *Y02P 40/18* (2015.11); *Y02W 30/92* (2015.05); *Y02W 30/94* (2015.05)

(58) Field of Classification Search
CPC ....... C04B 28/082; B28B 1/14; B28B 11/245; E04C 1/00; Y02P 40/18; Y02W 30/92; Y02W 30/94
See application file for complete search history.

(56) References Cited

U.S. PATENT DOCUMENTS

| 6,334,885 | B1 | 1/2002 | Fukushima et al. |
| 7,141,112 | B2 | 11/2006 | Comrie et al. |
| 10,112,871 | B2 * | 10/2018 | Shao ........................ E04C 1/00 |
| 2008/0282936 | A1 | 11/2008 | Morioka et al. |

FOREIGN PATENT DOCUMENTS

| BE | 1017180 A3 | 4/2008 |
| CA | 2809225 | 3/2012 |
| CN | 1066047 A | 11/1992 |
| CN | 1248557 A | 3/2000 |
| CN | 101058213 A | 10/2007 |
| EP | 2 484 651 | 8/2012 |
| JP | 2000 350977 | 12/2000 |
| JP | 2003 002726 | 1/2003 |
| JP | 2004 292244 | 10/2004 |
| JP | 101 649 663 | 9/2009 |
| WO | 2009133120A2pt1 | 11/2009 |
| WO | 2009133120A2pt2 | 11/2009 |
| WO | 2009133120A2pt3 | 11/2009 |
| WO | 2009133120A2pt4 | 11/2009 |
| WO | 2011134025 A1 | 11/2011 |
| WO | 2013060870pt1 | 5/2013 |
| WO | 2013060870pt2 | 5/2013 |

OTHER PUBLICATIONS

English Translation of CN 101 649 663, Beijing Shougang Resources Com (Feb. 17, 2010).
English Translation of JP 2003 002726, Nippon Steel Corp (Jan. 8, 2003).
(English) Patent Abstracts of Japan—JP 2003 002726 [Jan. 2003].
English Translation of JP 2000 350977, Kawasaki Steel Co (Dec. 19, 2000).
(English) Patent Abstracts of Japan—JP 2000 350977 [Dec. 2000].
(English) Patent Abstracts of Japan—JP 2004 292244 [Oct. 2004].
English Machine Translation of CN1248557A [Mar. 2007].
English Machine Translation of CN101058213A [Oct. 2007].
English Machine Translation of CN1066047A [Nov. 1992].
Adolfsson, D. et al. "Hydraulic properties of sulphoaluminate belite cement based on steel making slags". Advances in Cement Research. vol. 19. No. 3.2007. pp. 133-138.
Adolfsson, D. et al. "Influence of mineralogy on the hydraulic properties of ladle slag". Cement and Concrete Research. vol. 41. 2011. pp. 865-571.
Akers, S. & Studinka, J. "Ageing behaviour of cellulose fibre cement composites in natural weathering and accelerated tests". The International Journal of Cement Composites and Lightweight Concrete. vol. 11. No. 2. 1989. pp. 93-97.
Atis, C.D. et al. "Influence of activator on the strength and drying shrinkage of alkali-activated slag mortar". Construction and Building Materials. vol. 23. 2009. pp. 548-555.
Baciocchi, R. et al. "Influence of particle size on the carbonation of stainless steel slag for CO2 storage". Energy Procedia 1. 2009. pp. 4859-4866.
Bye, G.C. "Portland cement Thomas Telford". (1999). 225 p.
Champenois, J-B. et al. "Beneficial use of a cell coupling rheometry, conductimety and calorimetry to investigate the early age hydration of calcium sulfoaluminate cement". Rheol Acta. vol. 52. 2013. pp. 177-187.

(Continued)

*Primary Examiner* — Anthony J Green
(74) *Attorney, Agent, or Firm* — Norton Rose Fulbright Canada LLP

(57) ABSTRACT

A building product is made from granular material and a binder that includes steel slag. A process for making the building product includes combining the granular material and the binder and then curing the combined granular material and binder with carbon dioxide. A building material includes a mixture of steel slag and a silica-rich material. The steel slag and silica-rich material is treated by heating. The silica-rich material may be waste glass and/or fly ash. A process for making the building material includes mixing the steel slag and silica-rich material and further heating the mixture.

13 Claims, 19 Drawing Sheets

(56) References Cited

OTHER PUBLICATIONS

Chen, I.A. & Juenger, M.C.G. Incorporation of coal combustion residuals into calcium sulfoaluminate-belite cement clinkers. Cement & Concreted Composites. vol. 34. 2012. pp. 893-902.
Chung, F.H. "Quantitative Interpretation of X-ray Diffraction Patterns of Mixtures. i. Matrix-Flushing Method for Quantitative Multicomponent Analysis". J. Appl. Cryst. vol. 7. 1974. pp. 519-525.
Das, B. et al. "An overview of utilization of slag and sludge from steel industries". sources, Conservation and Recycling. vol. 50. 2007. pp. 40-57.
Dippenaar, R. "Industrial uses of slag—The use and re-use of iron and steelmaking slags". Iron and Steelmaking. vol. 32. No. 1. 2005. pp. 35-46.
Elbaghdadi, A.H. "Carbon Dioxide Activated Steel Slag as a Cementing Material" Thesis submitted to McGill University. Feb. 2012. pp. 1-93.
El-Hassan, H. "Static and Dynamic Carbonation of Lightweight Concrete Masonry Units". Thesis submitted to McGill University. Dec. 2012. pp. 1-232 (Part 1 of 7).
El-Hassan, H. "Static and Dynamic Carbonation of Lightweight Concrete Masonry Units". Thesis submitted to McGill University. Dec. 2012. pp. 1-232 (Part 2 of 7).
El-Hassan, H. "Static and Dynamic Carbonation of Lightweight Concrete Masonry Units". Thesis submitted to McGill University. Dec. 2012. pp. 1-232 (Part 3 of 7).
El-Hassan, H. "Static and Dynamic Carbonation of Lightweight Concrete Masonry Units". Thesis submitted to McGill University. Dec. 2012. pp. 1-232 (Part 4 of 7).
El-Hassan, H. "Static and Dynamic Carbonation of Lightweight Concrete Masonry Units". Thesis submitted to McGill University. Dec. 2012. pp. 1-232 (Part 5 of 7).
El-Hassan, H. "Static and Dynamic Carbonation of Lightweight Concrete Masonry Units". Thesis submitted to McGill University. Dec. 2012. pp. 1-232 (Part 6 of 7).
El-Hassan, H. "Static and Dynamic Carbonation of Lightweight Concrete Masonry Units". Thesis submitted to McGill University. Dec. 2012. pp. 1-232 (Part 7 of 7).
Fuwape, J.A. et al. "Technical assessment of three layered cement-bonded boards produced from wastepaper and sawdust". Waste Management. vol. 27. 2007. pp. 1611-1616.
Georgescu, M. et al. "Highly reactive dicalcium silicate synthesised by hydrothermal processing". Cement and Concrete Composites. vol. 22. 2000. pp. 315-319.
Guntekin, E. & Sahin, H.T. "Accelerated weathering performance of cement bonded fiberboard". Scientific Research and Essay. vol. 4. (5). 2009. pp. 484-492.
Haoze, W. et al. "Effects of Carbonation on Steel Slag Products". Advanced Materials Research. vol. 177. 2011. pp. 485-488.
He, F. et al. "End Temperature Prediction of Molten Steel in LF Based on CBR". Steel Research Int. vol. 83. No. 11. 2012. pp. 1079-1086.
Houghton, J. T. "Global warming: The Complete Briefing." Cambridge University Press. (2004). 351 p.
Huijgen, W.J.J. et al. "Energy Consumption and Net CO2 Sequestration of Aqueous Mineral Carbonation". Ind. Eng. Chem. Res. vol. 45. 2006. pp. 9184-9194.
Isoo, T. et al. "Development of large steelmaking slag blocks using a new carbonation process". Advances in Cement Research. vol. 12. No. 3. 2000. pp. 97-101.
Jankovic. A. et al. "Cement Grinding Optimisation". Metso Minerals Process Technology. 17 (11). 2004. pp. 1075-1081.
Janotka, I. et al. "Performance of Sulphoaluminate-Belite Cement with High C4A3S Content". Ceramics—Silikaty. vol. 51 (2). 2007. pp. 74-81.
Johnson, D.C. "Accelerated carbonation of waste calcium silicate materials." (2000). SCI Lecture Paper Series.pp. 1-10.

Johnson, D.C. et al. "Solidification of stainless steel slag by accelerated carbonation". Environmental Technology. 24:6 2003. pp. 671-678.
Juckes, L.M. "The volume stability of modern steelmaking slags". Mineral Processing and Extractive Metallurgy. vol. 112. 2003. pp. C177-C197.
Kacimi, L. et al. "Synthesis of belite cement clinker of high hydraulic reactivity". Cement and Concrete Research. vol. 39. 2009. pp. 559-565.
Komljenovic, M. et al. "Fly ash as the potential raw mixture component for Portland cement clinker synthesis". Journal of Thermal Analysis and Calorimetry. vol. 96. No. 2. 2009. pp. 363-368.
Li, G. & Ni, H."Recent progress of hot stage processing for Steelmaking Slags in China considering stability and heat recovery". Proceedings of the 2nd International Slag Valorisation Symposium. Apr. 2011. pp. 253-261.
Li, J. et al. "Structural characteristics and hydration kinetics of modified steel slag". Cement and Concrete Research. vol. 41. 2011. pp. 324-329.
Madlool, N.A. et al. "A critical review on energy use and savings in the cement industries". Renewable and Sustainable Energy Reviews. vol. 15. 2011. pp. 2042-2060.
Mahoutian, M. et al. "Carbonation and hydration behavior of EAF and BOF steel slag binders". Materials and Structures. Jul. 23, 2014. *whole document*.
Manso, J.M. et al. "Ladle Furnace Slag in Construction". Journal of Materials in Civil Engineering. 2005. pp. 513-518.
Maslin, M. "Global Warming: Causes, Effects, and the Future." Voyageur Press. (2007). 72 p. (Part 1 of 2).
Maslin, M. "Global Warming: Causes, Effects, and the Future." Voyageur Press. (2007). 72 p. (Part 2 of 2).
Mohr, B.J. et al. "Durability of kraft pulp fiber-cement composites to wet/dry cycling". Cement & Concrete Composites. vol. 27. 2005. pp. 435-448.
Monkman, S. "Maximizing carbon uptake and performance gain in slag-containing concretes through early carbonation". Thesis submitted to McGill University. Aug. 2008. pp. 1-222 (Part 1 of 7).
Monkman, S. "Maximizing carbon uptake and performance gain in slag-containing concretes through early carbonation". Thesis submitted to McGill University. Aug. 2008. pp. 1-222 (Part 2 of 7).
Monkman, S. "Maximizing carbon uptake and performance gain in slag-containing concretes through early carbonation". Thesis submitted to McGill University. Aug. 2008. pp. 1-222 (Part 3 of 7).
Monkman, S. "Maximizing carbon uptake and performance gain in slag-containing concretes through early carbonation". Thesis submitted to McGill University. Aug. 2008. pp. 1-222 (Part 4 of 7).
Monkman, S. "Maximizing carbon uptake and performance gain in slag-containing concretes through early carbonation". Thesis submitted to McGill University. Aug. 2008. pp. 1-222 (Part 5 of 7).
Monkman, S. "Maximizing carbon uptake and performance gain in slag-containing concretes through early carbonation". Thesis submitted to McGill University. Aug. 2008. pp. 1-222 (Part 6 of 7).
Monkman, S. "Maximizing carbon uptake and performance gain in slag-containing concretes through early carbonation". Thesis submitted to McGill University. Aug. 2008. pp. 1-222 (Part 7 of 7).
Monkman, S. & Shao, Y. "Assessing the Carbonation Behaviour of Cementitious Materials". J. Mater. Civ. Eng. 2006. pp. 768-776.
Monkman, S. et al. "Carbonated Ladle Slag Fines for Carbon Uptake and Sand Substitute". J. Mater. Civ. Eng. 2009. pp. 657-665.
Monkman, S. & Shao, Y. "Carbonation Curing of Slag-Cement Concrete for Binding CO2 and Improving Performance". J. Mater. Civ. Eng. 2010. pp. 296-304.
Monkman, S. & Shao, Y. "Integration of carbon sequestration into curing process of precast concrete". Can. J. Civ. Eng. vol. 37. 2010. pp. 302-310.
Monkman, S. & Niven, R. "Integration of Carbon Dioxide Curing into Precast Concrete Production". Carbon Sense Solutions Inc. 2013. pp. 1-9.
Motz, H. & Geiseler, J. "Products of steel slags an opportunity to save natural resources". Waste Management. vol. 21. 2001. pp. 285-293.

(56) References Cited

OTHER PUBLICATIONS

Muhmood, L. et al. "Cementitious and pozzolanic behavior of electric arc furnace steel slags". Cement and Concrete Research. vol. 39. 2009. pp. 102-109.
Murphy, J.N. et al. "Enhancement of the Cementitious Properties". Ind. Eng. Chem. Res. vol. 36. No. 5. 1997. pp. 315-331.
Murri, A.N. et al. "High temperature behaviour of ambient cured alkali-activated materials based on ladle slag". Cement and Concrete Research. vol. 43. 2013. pp. 51-61.
Netinger, I. et al. "Utilisation of steel slag as an aggregate in concrete". Materials and Structures. vol. 44. 2011. pp. 1565-1575.
Nisbet, M. & Venta, G. "Fiber-cement in the USA: past, present and the future". Conference proceeding, Inorganic—bonded wood and fiber composite material. (2000). 7: pp. 248-257.
Pal, S.C. et al. "Investigation of hydraulic activity of ground granulated blast furnace slag in concrete". Cement and Concrete Research. vol. 33. 2003. pp. 1481-1486.
Papayianni, I. & Anastasiou, E. "Effect of granulometry on cementitious properties of ladle furnace slag". Cement & Concrete Composites. vol. 34. 2012. pp. 400-407.
Posch, H. et al. "Mineralogical evaluation of ladle slags at voestalpine Stahl GmbH". Ironmaking and Steelmaking. vol. 29. No. 4. 2002. pp. 308-312.
Radenovic, A. et al. "Characterization of Ladle Furnace Slag from Carbon Steel Production as a Potential Adsorbent". Advances in Materials Science and Engineering. 2013. pp. 1-6.
Reddy, A.S. et al. "Utilization of Basic Oxygen Furnace (BOF) slag in the production of a hydraulic cement binder". Int. J. Miner Process. vol. 79. 2006. pp. 98-105.
Rodriguez, A. et al. "Strength and workability of masonry mortars manufactured with ladle furnace slag". Resources, Conservation and Recycling. vol. 53. 2009. pp. 645-651.
Rostami, V. et al. "Durability of concrete pipes subjected to combined steam and carbonation curing". Construction and Building Materials. vol. 25. 2011. pp. 3345-3355.
Rostami, V. et al. "Microstructure of cement paste subject to early carbonation curing". Cement and Concrete Research. vol. 42. 2012. pp. 186-193.
Sajedi, F. & Razak, H.A. "The effect of chemical activators on early strength of ordinary Portland cement-slag mortars". Construction and Building Materials. vol. 24. 2010. pp. 1944-1951.
Segui, P. et al."Valorization of Wastepaper Sludge Ash as Main Component of Hydraulic Road Binder". Waste Biomass Valor. vol. 4. 2013 pp. 297-307.
Setién, J. et al. "Characterization of ladle furnace basic slag for use as a construction material". Construction and Building Materials. vol. 23. 2009. pp. 1788-1794.
Sherman, N. et al. "Long-Term Behaviour of Hydrolic Binders Based on Calcium Sulfoaluminate and Calcium Sulfosilicate". Cement and Concrete Research. vol. 25. No. 1. 1995. pp. 113-126.
Shi, C. & Qian, J. "High performance cementing materials from industrial slags—a review". Resources, Conservation and Recycling. vol. 29. 2000. pp. 195-207.
Shi, C. "Characteristics and cementitious properties of ladle slag fines from steel production". Cement and Concrete Research. vol. 32. 2002. pp. 459-462.
Shi, C. & Hu, S. "Cementitious properties of ladle slag fines under autoclave". Cement and Concrete Research. vol. 33. 2003. pp. 1851-1856.
Shi, C. "Steel Slag—Its Production, Processing, Characteristics and Cementitious Properties". Journal of Materials in Civil Engineering. May/Jun. 2004. pp. 230-236.
Simatupang, M.H. et al. "Investigations on the Influence of the Addition of Carbon Dioxide on the Production and Properties of Rapidly Set Wood-Cement Composites". Cement and Concrete Composites. vol. 17. 1995. pp. 187-197.
Singh, N.B. et al. "Highly Reactive β-Dicalcium Silicate". J. Am. Ceram. Soc. vol. 85. No. 9. 2002. pp. 2171-2176.

Singh, N.B. "Hydrothermal synthesis of β-dicalcium silicate (β-Ca2SiO4)". Progress in Crystal Growth and Characterization of Materials. vol. 52. 2006. pp. 77-83.
Soroushian, P. et al. "Wood Fiber Reinforced Cement Composites Under Wetting-Drying and Freezing-Thawing Cycles". J. Mater. Civ. Eng. vol. 6. 1994. pp. 595-611.
Soroushian, P. et al. "Durability characteristics of CO2-cured cellulose fiber reinforced cement composites". Construction and Building Materials. vol. 34. 2012. pp. 44-53.
Sturgeon, G. CCMPA, Canadian Concrete Masonry Producers Association, Metric Technical Manual, "Physical properties". 27 p.
Taylor, H.F.W. "Cement chemistry." Second Edition, Thomas Telford Publishing. (1997). 459 p.
Tossavainen, M. et al. "Characteristics of steel slag under different cooling conditions". Waste Management. vol. 27. 2007. pp. 1335-1344.
Turgut, P. "Cement composites with limestone dust and different grades of wood sawdust". Building and Environment. vol. 42. 2007. pp. 3801-3807.
Uibu, M. et al. "The CO2-binding by Ca—Mg-silicates in direct aqueous carbonation of oil shale ash and steel slag". Energy Procedia. vol. 4. 2011. pp. 925-932.
Ukrainczyk, N. . et al. "Calcium Sulfoaluminate Eco-Cement from Industrial Waste". Chem. Biochem. Eng. Q. 27 (1). 2013. pp. 83-93.
Van Zomeren, A. et al. "Changes in mineralogical and leaching properties of converter steel slag resulting from accelerated carbonation at low CO2 pressure". Waste Management. vol. 31. 2011. pp. 2236-2244.
Wang, J. et al. "Exergy analyses and parametric optimizations for different cogeneration power plants in cement industry". Applied Energy. vol. 86. 2009. pp. 941-948.
Wang, Q. et al. "A Discussion on Improving Hydration Activity of Steel Slag by Altering its Mineral Compositions". Journal of Hazardous Materials. vol. 186. 2011. pp. 1070-1075.
Yildirim, I.Z. & Prezzi, M. "Chemical, Mineralogical, and Morphological Properties of Steel Slag". Advances in Civil Engineering. 2011. pp. 1-13.
Young, J.F. et al. "Accelerated Curing of Compacted Calcium Silicate Mortars on Exposure to CO2". Journal of The American Ceramic Society. vol. 57. No. 9. 1974. pp. 394-397.
Zevenhoven, R. . et al. "Carbonation of calcium-containing mineral and industrial by-products". Front Chem. Eng. China. 4 (2). 2010. pp. 110-119.
Zhang, W. et al. "The Properties of Slag Bricks Prepared by Both Alkali Activation and Accelerated Carbonation". Key Engineering Materials. vol. 509. 2012. pp. 113-118.
Zong, Y-B. et al. "Component modification of steel slag in air quenching process to improve grindability". Trans. Nonferrous Met. Soc. China. vol. 19. 2009. pp. 834-839.
"Mineral Profile: Cement Raw Materials". British Geological Survey. Natural Environment Research Council. Office of the Deputy Prime Minister. Nov. 2005. pp. 1-20.
"Standard Test Methods for Chemical Analysis of Hydraulic Cement". ASTM International. Designation C114-11b. 2011. pp. 1-32 (Part 1 of 2).
"Standard Test Methods for Chemical Analysis of Hydraulic Cement". ASTM International. Designation C114-11b. 2011. pp. 1-32 (Part 2 of 2).
"Standard Specification for Loadbearing Concrete Masonry Units". ASTM International. Designation C90-11b. 2011. pp. 75-78.
"Standard Test Methods for Sampling and Testing Non-Asbestos Fiber-Cement Flat Sheet, Roofing and Siding Shingles, and Clapboards". ASTM International. Designation C1185-03. 2003. pp. 773-780 (Part 1 of 2).
"Standard Test Methods for Sampling and Testing Non-Asbestos Fiber-Cement Flat Sheet, Roofing and Siding Shingles, and Clapboards". ASTM International. Designation C1185-03. 2003. pp. 773-780 (Part 2 of 2).
National Research Council. "America's Climate Choices". National Academy of Sciences. 2011 (Part 1 of 5).
National Research Council. "America's Climate Choices". National Academy of Sciences. 2011 (Part 2 of 5).

(56) References Cited

OTHER PUBLICATIONS

National Research Council. "America's Climate Choices". National Academy of Sciences. 2011 (Part 3 of 5).
National Research Council. "America's Climate Choices". National Academy of Sciences. 2011 (Part 4 of 5).
National Research Council. "America's Climate Choices". National Academy of Sciences. 2011 (Part 5 of 5).
"Factsheet: Steel industry by-products-Achieving the goal of zero-waste" WorldSteel Association. (2010) 2p.
CSA A23.1 "Concrete materials and methods of concrete construction/Test methods and standard practices for concrete." (2009) Canada. 674 pgs.
Nippon Slag Association (2012) http://www.slg.jp/e/statistics/index.html Retrieved in 2014.
Cement Association of Canada http://www.cement.ca/en/Manufacturing/History-of-Cement.html (2013).
Concrete Blocks, 2009 http://www.sustainable-buildings.org/wiki/index.php/Concrete Blocks As of 2013.
Precast Concrete Products http://www.concreteconstruction.net/precast-concrete/demand-for-precast-concrete-products-to-reach-113-billion-in-2015.aspx As of Nov. 2013.
Canadian Slag Association http://canslag.ca/techinfo.html.
Euroslag (2010) http://www.euroslag.com/products/statistics/2010/ As of Nov. 2013.
Machine translation of BE1017180A3 (description) (Apr. 2008).
Machine translation of BE1017180A3 (claims) (Apr. 2008).

* cited by examiner ically the United States of America was designated and elected, which application in turn claims priority under 35 USC 119(e) from U.S. Provisional application Ser. No. 61/968,991 filed Mar. 21, 2014 and entitled "CARBONATE-BONDED CONSTRUCTION PRODUCTS FROM STEEL-MAKING RESIDUES AND METHODS FOR MAKING THE SAME", the contents thereof are incorporated herein by reference.

CARBONATE-BONDED CONSTRUCTION PRODUCTS FROM STEEL-MAKING RESIDUES AND METHOD FOR MAKING THE SAME

CROSS REFERENCE TO RELATED APPLICATION

The present application is a divisional of U.S. patent application Ser. No. 15/124,856, filed Sep. 9, 2016, now issued as U.S. Pat. No. 10,112,871, which application is based on a National Phase entry of PCT/CA2015/000176 filed Mar. 23, 2015, in which the United States of America was designated and elected, which application in turn claims priority under 35 USC 119(e) from U.S. Provisional application Ser. No. 61/968,991 filed Mar. 21, 2014 and entitled "CARBONATE-BONDED CONSTRUCTION PRODUCTS FROM STEEL-MAKING RESIDUES AND METHODS FOR MAKING THE SAME", the contents thereof are incorporated herein by reference.

FIELD

The present subject-matter relates to building products and materials, and more particularly to building products and materials that include steel slag.

BACKGROUND

In the construction industry, various products are used, including concrete blocks. Such concrete blocks are precast and are composed inter alia of coarse granular material (the aggregate or filler) embedded in a hard matrix of material (the cement or binder), which fills the spaces between the aggregate particles and glues them together.

The binder that is commonly used is Portland cement.

The cement industry is a primary producer of carbon dioxide ($CO_2$), which is recognized as a major greenhouse gas. Thus, disadvantageously, large amounts of $CO_2$ are produced by the chemical reactions occurring in the manufacture of cement.

SUMMARY

It would thus be highly desirable to be provided with a system or method that would at least partially address the disadvantages of the existing technologies.

The embodiments described herein provide in one aspect a building product, comprising granular material and a binder including steel slag.

The embodiments described herein provide in another aspect a method for making a building product. The method comprises providing granular material and a binder including steel slag; combining the granular material and the binder; and curing the combined granular material and binder with carbon dioxide.

The embodiments described herein provide in another aspect a building material comprising a mixture of steel slag and a silica-rich material, the mixture being treated by heating.

The embodiments described herein provide in another aspect a process for making a building material, the process comprising: mixing steel slag and a silica-rich material; and heating the steel slag and silica-rich material mixture.

According to exemplary building products described herein, curing is achieved with carbon dioxide.

According to exemplary building products and methods for making building products described herein, the building product is precast.

According to exemplary building products and methods for making building products described herein, the building product is a wallboard.

According to exemplary building products and methods for making building products described herein, the building product is a construction block.

According to exemplary building products and methods for making building products described herein, the steel slag comprises at least one of electric arc furnace and basic oxygen furnace slag.

According to exemplary building products and methods for making building products described herein, the steel slag has a cumulative calcium silicate content of at least about 20%.

According to exemplary building products and methods for making building products described herein, the steel slag has a free lime concentration of less than about 7%.

According to exemplary building products and methods for making building products described herein, the steel slag has a silicon dioxide content of at least about 6%.

According to exemplary building products and methods for making building products described herein, the granular material comprises lightweight aggregate and the binder comprises steel slag.

According to exemplary building products and methods for making building products described herein, the lightweight aggregate is chosen from natural lightweight aggregate, expanded clay aggregate, expanded shale aggregate, expanded slag aggregate, expanded steel slag aggregate and expanded iron slag aggregate.

According to exemplary building products and methods for making building products described herein, the granular material consists essentially of lightweight aggregate and the binder consists essentially of steel slag.

According to exemplary methods for making building products described herein, the method further includes after combining the granular material and the binder, mixing the combined granular material and binder with water to a first water-to-slag ratio, after mixing with water, compacting the combined granular material and binder and after the compacting, reducing the quantity of water in the combined granular material and binder to a second water-to-slag ratio that is lower than the first water-to-slag ratio, and wherein the combined granular material and binder is cured with carbon dioxide after the reducing the quantity of water to the second water-to-slag ratio.

According to exemplary methods for making building products described herein, reducing the quantity of water in the combined granular material and binder to the second water-to-slag ratio comprises applying an air flow to the combined granular material and binder.

According to exemplary methods for making building products described herein, applying the air flow increases porosity of the combined granular material and binder.

According to exemplary methods for making building products described herein, the first water-to-slag ratio is effective for forming a smooth surface of the construction block.

According to exemplary methods for making building products described herein, the second water-to-slag ratio is effective for increasing the uptake of carbon dioxide during curing.

According to exemplary methods for making building products described herein, the first water-to-slag ratio is at least about 0.15 and the second water-to-slag ratio is less than about 0.12 and preferably at least about 0.08.

According to exemplary methods for making building products described herein, the first water-to-slag ratio is at least about 0.2 and the second water-to-slag ratio is less than about 0.10.

According to exemplary methods for making building products described herein, the combined granular material and binder is compacted under a pressure of at least about 10 MPa.

According to exemplary building materials and exemplary processes for making building materials described herein, the steel slag comprises ladle slag generated as by-product from steelmaking.

According to exemplary building materials and exemplary processes for making building materials described herein, the silica-rich material comprises at least one of glass and fly ash.

According to exemplary building materials and exemplary processes for making building materials described herein, the slag and silica-rich material mixture consist essentially of waste and/or recycled materials.

According to exemplary building materials and exemplary processes for making building materials described herein, the waste glass comprises glass collected from recycling of fluorescent lamps.

According to exemplary building materials and exemplary processes for making building materials described herein, the slag and glass mixture comprises between about 10% glass and about 30% glass.

According to exemplary building materials and exemplary processes for making building materials described herein, the slag and glass mixture comprises about 20% glass.

According to exemplary building materials and exemplary processes for making building materials described herein, the slag and fly ash mixture comprises between about 20% fly ash and about 40% fly ash.

According to exemplary building materials and exemplary processes for making building materials described herein, the slag and fly ash mixture comprises about 30% fly ash.

According to exemplary processes for making building materials described herein, the slag and glass mixture is heated at a temperature of at least about 700° C.

According to exemplary processes for making building materials described herein, the slag and glass mixture is heated at a temperature of about 1100° C.

According to exemplary processes for making building materials described herein, the slag and fly ash mixture is heated at a temperature of at least 800° C.

According to exemplary processes for making building materials described herein, the slag and fly ash mixture is heated at a temperature about 1250° C.

According to exemplary processes for making building materials described herein, the slag and fly ash mixture is heated to the temperature at a rate of about 5° C./minute followed by heating the slag and fly ash mixture at the temperature for a time interval of at least about 30 minutes.

According to exemplary processes for making building materials described herein, the slag and silica-rich material mixture is heated at a temperature of between about 700° C. and about 1400° C.

According to exemplary processes for making building materials described herein, the slag and glass mixture is heated to the temperature at a rate of about 5° C./minute followed by heating the slag and glass mixture at the temperature for a time interval of at least about 30 minutes.

According to exemplary processes for making building materials described herein, the mixture is compacted in a mold under between about 40 MPa of pressure and about 60 MPa of pressure.

According to exemplary processes for making building materials described herein, the method further includes compacting the slag and silica-rich material mixture before heating the mixture.

According to exemplary processes for making building materials described herein, the method further includes cooling the slag and silica-rich material mixture after heating.

According to exemplary processes for making building materials described herein, the method further includes grinding the slag and silica-rich material mixture after being cooled, thereby forming a cementitious material.

BRIEF DESCRIPTION OF THE DRAWINGS

For a better understanding of the embodiments described herein and to show more clearly how they may be carried into effect, reference will now be made, by way of example only, to the accompanying drawings which show at least one exemplary embodiment, and in which.

DESCRIPTION OF VARIOUS EMBODIMENTS

Figure 1:
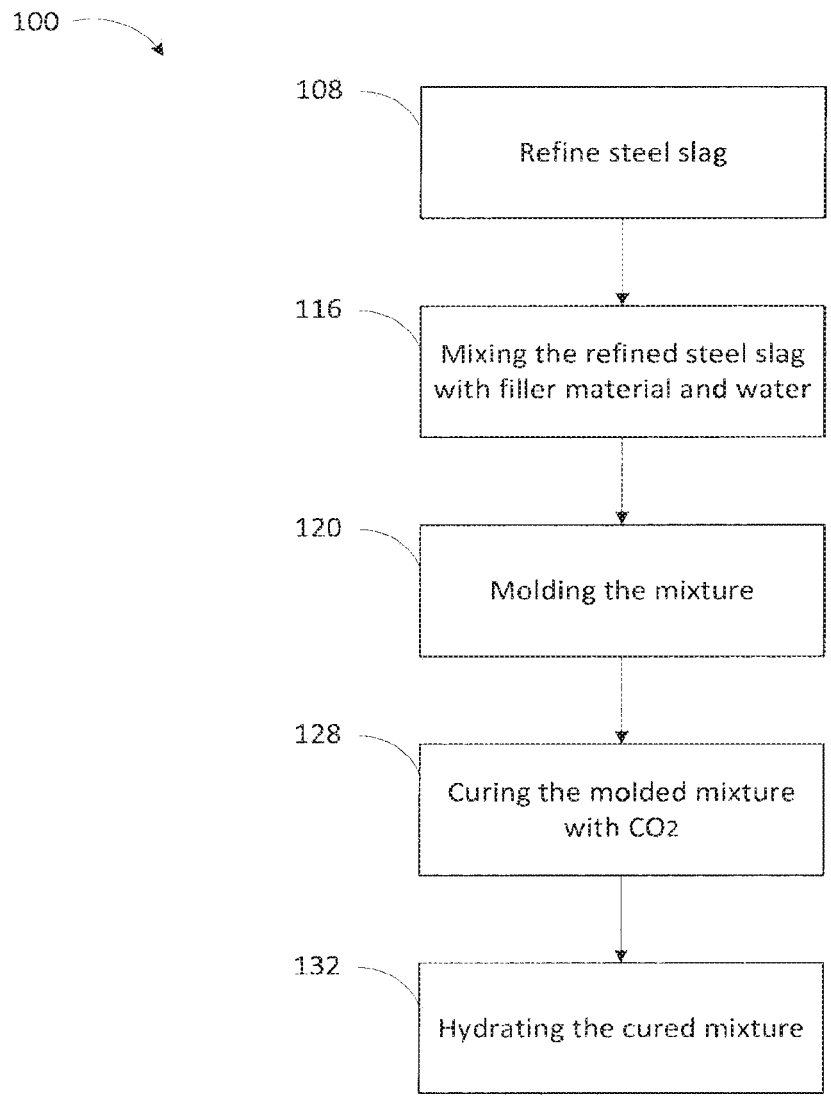
FIG. 1 is a flowchart of the steps of a method for making a building product from steel slag according to one exemplary embodiment.

It will be appreciated that, for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way but rather as merely describing the implementation of the various embodiments described herein.

The word "a" or "an" when used in conjunction with the term "comprising" in the claims and/or the specification may mean "one", but it is also consistent with the meaning of "one or more", "at least one", and "one or more than one" unless the content clearly dictates otherwise. Similarly, the word "another" may mean at least a second or more unless the content clearly dictates otherwise.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

As used in this specification and claim(s), the word "consisting" and its derivatives, are intended to be close-ended terms that specify the presence of stated features, elements, components, groups, integers, and/or steps, and also exclude the presence of other unstated features, elements, components, groups, integers and/or steps.

The term "consisting essentially of", as used herein, is intended to specify the presence of the stated features, elements, components, groups, integers, and/or steps as well as those that do not materially affect the basic and novel characteristic(s) of these features, elements, components, groups, integers, and/or steps.

The terms "about", "substantially" and "approximately" as used herein mean a reasonable amount of deviation of the modified term such that the end result is not significantly changed. These terms of degree should be construed as including a deviation of at least ±10% of the modified term if this deviation would not negate the meaning of the word it modifies.

"Steel slag" herein refers to the slag by-product produced from making steel. Steel slag may include slag produced from Basic Oxygen Furnaces (BOF). Steel slag may also include slag produced from Electric Arc Furnaces (EAF). Steel slag as used herein may further include ladle slag. It will be understood that "steel slag" as used herein excludes iron slag and blast furnace slag that are typically generated during iron production and that may be used in making cement, such as pozzolanic slag.

"Ladle slag" herein refers to a type of steel slag. Ladle slag is produced as a by-product from a ladle refining operation. In various steel making processes, molten steel produced in an EAF or BOF process undergoes an additional refining processes based on the quality of the desired steel. Additional fluxes and alloys are added to a ladle to remove the impurities within the steel and to produce steel with the desired properties. The reaction takes place in the presence of a slag in which the most significant oxides are $SiO_2$, $Al_2O_3$, $CaO$, and $MgO$. This operation is known as ladle refining, because it is executed in the transfer ladle. During this process, additional steel slags are generated, which are ladle slags. It has been observed that the chemical compositions of ladle slag which are linked to the grade of the steel produced are highly variable and different from the chemical compositions of BOF and EAF steel slags. It has been observed that ladle slag shows higher aluminum oxide content and lower iron oxide content as compared to BOF and EAF steel slags. Generally, ladle slags exhibit a calcium oxide to silica oxide ratio of about 2.

"EBH slag" herein refers to EAF-BOF Hybrid, which is a type of steel slag formed of a mixture of EAF and BOF produced slags.

It will be understood that with respect to fineness, a greater degree of fineness denotes a more fine state (i.e. smaller sizes) and a lesser degree of fineness denotes a less fine state (i.e. larger sizes). For example, for fineness as measured by Blaine fineness number, a greater Blaine fineness number denotes a more fine state and a lesser Blaine fineness number denotes a less fine state.

Steel mills produce about 130 million tons of slag worldwide. Electrical Arc Furnace (EAF), Basic Oxygen Furnace (BOF) slags and ladle slags are the major types of steel slags produced in the steelmaking process. Currently, the steelmaking by-products are mainly marketed as aggregates for construction, including their use in asphalt pavement, roadbed construction, and concrete.

Although steel slag is rich in calcium, the use of steel slag as a cementing material is not common. Steel slag is neither a hydraulic nor a pozzolanic material, as it is lacking tri-calcium silicate compound and the amorphous silicon dioxide ($SiO_2$) content. The hydraulic behavior of steel slag can be modified by treatment at high temperature to serve as a cementitious material for a cement blend. The heat treatment, followed by a proper cooling process, generates phases that improve the hydraulic properties of slag. The addition of up to 20% of thermally-treated steel slag to Portland cement can yield a concrete of equivalent strength to the base cement.

Because of its high calcium content, steel slag can react with carbon dioxide ($CO_2$). The high potential of slag to react with $CO_2$ was recently exploited for mineral carbonation using steel slag as feedstock to sequester carbon dioxide and reduce carbon emissions. For the carbon dioxide sequestration, the reaction is generally carried out in a high pressure and high temperature reactor with finely ground powder (<38 micron). Based on the slag mass, the carbon uptake by steel slag could reach up to 75% of the theoretical uptake capacity.

Another benefit results from activating steel slag to serve as a binder in place of Portland cement to make building products. Steel slag contains calcium silicates which can be converted to strength-contributing calcium silicate hydrates and calcium carbonates upon exposure to carbon dioxide. The reactions of di-calcium silicate ($C_2S$) and tri-calcium silicate ($C_3S$) with $CO_2$ are described respectively by the following Equations (1) and (2):

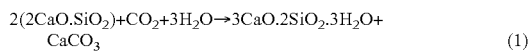
$$2(2CaO.SiO_2)+CO_2+3H_2O \rightarrow 3CaO.2SiO_2.3H_2O+ CaCO_3 \quad (1)$$

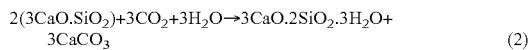
$$2(3CaO.SiO_2)+3CO_2+3H_2O \rightarrow 3CaO.2SiO_2.3H_2O+ 3CaCO_3 \quad (2)$$

Whereas several studies have been conducted on steel slag for use as a Portland-cement additive or as a feedstock in mineral carbonation, studies that focused on compressive strength development in steel slag as a sole cement binder are scarce, although carbonation-activated strength gain is of utmost interest. Isoo et al. (2000) reported that a 1 m³ slag block reached a compressive strength of 18.4 MPa after 12 days of carbonation for a seaweed bed application. Stainless steel slag compacts exposed to carbon dioxide for one hour achieved a compressive strength of 9 MPa and a carbon dioxide uptake of 18%. By replacing Portland cement with steel slag in building products, the consumption of energy and natural resources is significantly reduced. Furthermore, as slag carbonation is a $CO_2$ uptake process, carbon dioxide can be sequestered through mineral precipitation in slag products resulting in a reduction in $CO_2$ emitted to the atmosphere. For example, the gaseous $CO_2$ is converted into a carbonaceous product.

Referring now to FIG. 1, therein illustrated is a flowchart of the steps of an exemplary method 100 for making a building product from steel slag.

Steel slag produced as a by-product of a steel making process is received. The steel slag may include a mixture of coarse slag pieces and fine slag pieces. Coarse slag pieces may have a fineness less than about 150 m²/kg and fine slag pieces may have a fineness greater than about 150 m²/kg. The coarse slag pieces, the fine slag pieces, or both may be land-filled as an outcome from typical steel making process.

At step 108, the received steel slag may optionally be refined. Refining of the received slag may be carried out where the received steel slag by-product is not immediately ready for use for making the building product.

Refining the steel slag may include filtering the received steel slag to separate fine slag pieces from coarse slag pieces.

Alternatively, or additionally, refining the received steel slag may also include pulverizing the steel slag to a fine powder. In some exemplary embodiments, the filtered fine pieces are pulverized while coarser pieces are not pulverized. For example, for EAF steel slag, the slag may be pulverized to a Blaine fineness of at least 150 m²/kg, and preferably about 178 m²/kg. For example, for EBH steel slag, the slag may be pulverized to a Blaine fineness of at least 200 m²/kg and preferably about 240 m²/kg. In other exemplary embodiments, the steel slag may be pulverized to a finer size.

At step 116, the steel slag is combined with a filler material. The refined steel slag may be finer than the filler material. Accordingly, the filler material is a granular material while the refined steel slag acts as the binder. The combined steel slag and granular material is further mixed with an amount of water. The granular material may already have some water content. Additional water may be introduced. The amount of water mixed with the combined steel slag and granular material may vary depending on the type of granular material and the building product to be made.

The amount of water may be characterized by a water-to-steel slag ratio. It will be understood that the water-to-slag ratio refers to the ratio of water content to slag content that is used as binder. That is, the water-to-slag ratio does not account for where additional slag is used, such as slag being used as an aggregate material. For example, the water-to-slag ratio of the initial steel slag, granular material and water mixture may be about 0.10, about 0.12, about 0.15, about 0.20, or about 0.25.

The steel slag may be provided within the mixture of steel slag, granular material and water so that the steel slag constitutes at least 30% of the total mass of the mixture. In other exemplary embodiments, the steel slag may be provided so as to constitute at least about 40%, at least about 50% or at least about 60% of the total mass of the mixture. It will be understood that the amount of steel slag may also correspond to percentage of total mass of the building product. Mass loss due to evaporation and/or reaction is substantially offset by $CO_2$ uptake, such that in various exemplary embodiments the total mass of the mixture is approximately the same as the mass of the building product.

At step 120, the mixture of steel slag and granular material may be molded or precast. The molding may also include compacting the steel slag and granular material mixture. The molding and compacting may be applied to achieve the desired shape and dimensions of the building product. The amount of pressure applied in the compacting may vary depending on the type of granular material and the building product to be made. For example, the amount of pressure may be between 5 MPa and 20 MPa, and preferably around 12 MPa. It was observed that a larger amount of pressure can contribute to higher compressive strength of the building product but resulted in lesser carbon uptake, thereby also limiting the compressive strength achieved. Accordingly, an amount of pressure less than about 20 MPa may be applied to allow satisfactory carbon uptake.

At step 128, the molded and compacted mixture of steel slag and granular material is cured with carbon dioxide. Curing causes activation of the mixture and also results in sequestration of the carbon dioxide within the mixture.

Figure 2:
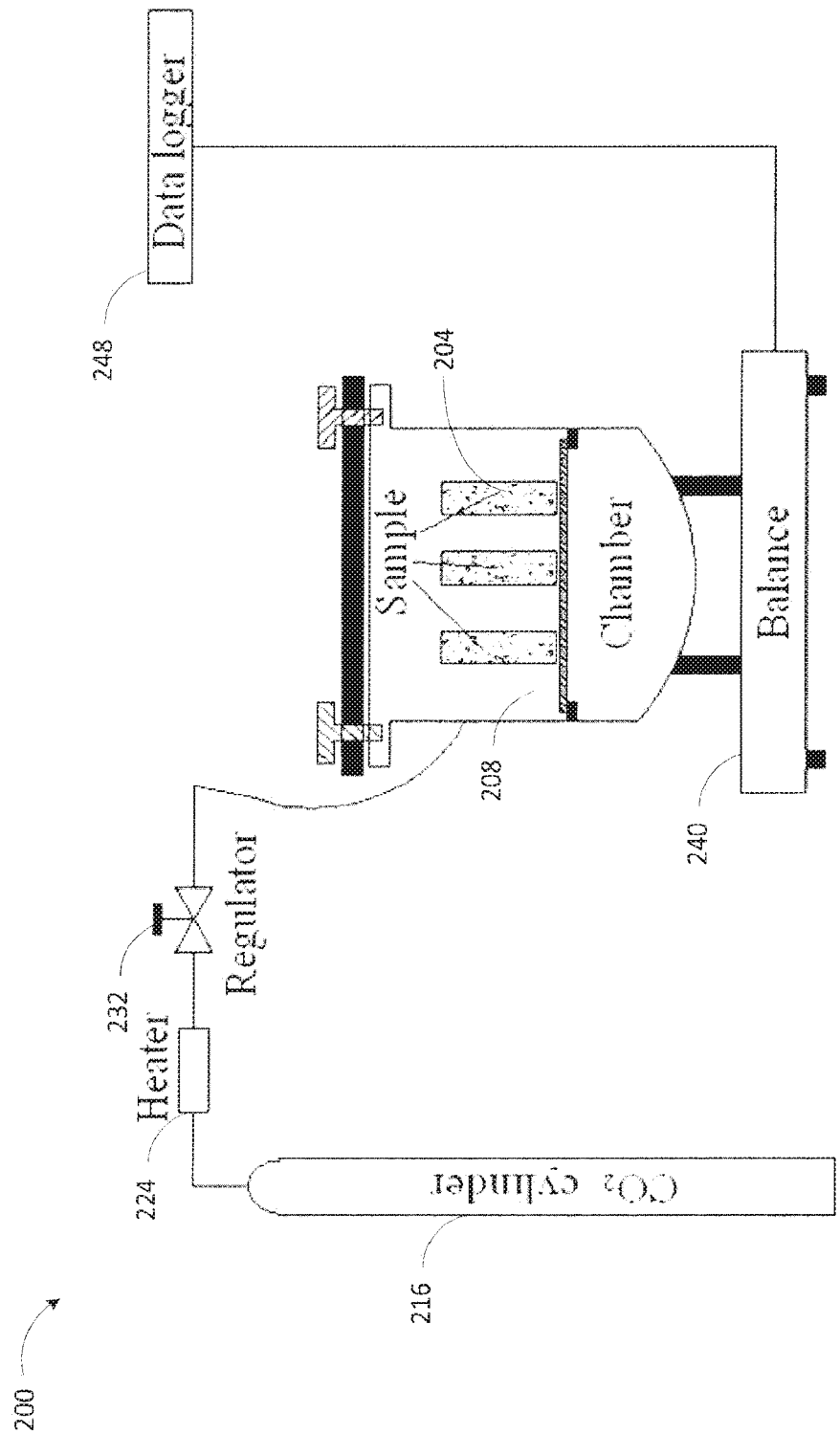
FIG. 2 is a schematic representation of a carbonation step in according with an exemplary embodiment.

Referring now to FIG. 2, therein illustrated is a schematic representation of an exemplary carbonation set-up 200. The steel slag and granular material mixture in the form of samples 204 to be cured is placed within a curing chamber 208. A source of $CO_2$ gas 216 is warmed by a heater 224 to ambient temperature and injected into the chamber 208 under pressure. The pressure is regulated by a regulator 232. The regulator also maintains a constant pressure and ensures that carbon dioxide consumed by the steel slag and granular material mixture is continually replenished. A balance 240 and data logger 248 may be further provided to calculate the carbon dioxide uptake.

The source $CO_2$ gas 216 may be substantially pure $CO_2$, such as 99.5% $CO_2$ gas. However, it will be understood that in other exemplary embodiments, a gas having a lower concentration of $CO_2$ may be used. For example, gas having a concentration of at least 90% $CO_2$ gas may be used for curing. For example, gas having a concentration of at least 80% $CO_2$ gas may be used for curing. For example, gas having a concentration of at least 50% $CO_2$ gas may be used for curing. In other embodiments, the gas may be flue gas produced as a by-product of steelmaking.

According to various exemplary embodiments, the steel slag and granular material mixture is cured with carbon dioxide for at least about 2 hours. The mixture maybe cured with carbon dioxide for less than about 36 hours.

The steel slag and granular material mixture may be cured with $CO_2$ for a duration of at least about 2 hours. It was observed that carbon uptake occurs in the first approximately 2 hours but continues to increase afterwards. According to some exemplary embodiments, the steel slag and granular material mixture may be cured with $CO_2$ for a duration of at least about 6 hours, at least about 12 hours or at least about 24 hours.

Referring back to FIG. 1, the method 100 may optionally further include hydrating the steel slag and granular material mixture at step 132. For example, the steel slag and granular material mixture is placed within a sealed hydrating environment for a predetermined amount of time after the curing. The length of the hydrating may vary depending on the building product to be made.

For example, the mixture may be hydrated for at least 2 days.

For example, the mixture may be hydrated for at least about 7 days.

For example, the mixture may be hydrated for at least about 14 days.

For example, the mixture may be hydrated for about 35 days.

The building product formed according to exemplary methods described herein may include steel slag from an electric arc furnace, steel slag from a basic oxygen furnace or a mixture thereof.

It was observed that some types of steel slag may be useful as received for making a building product. Steel slag "as-received" refers to the steel slag in the state as it is received as a by-product from a steelmaking process. It will be understood that some refining of the steel slag may be required, but additional treatment, such as heat treatment, is not required in order to make the as-received steel slag immediately useful for making building products.

For example, the as-received steel slag used for making the building product has a free lime content less than about 10.8% by chemical composition. Accordingly the method for making the building product may be carried out free (i.e. not requiring) of a heat treatment of the steel slag.

For example, the as-received steel slag used for making the building product has a free lime content less than about 7.2% by chemical composition. Accordingly the method for making the building product may be carried out free (i.e. not requiring) of a heat treatment of the steel slag.

For example, the as-received steel slag used for making the building product has a cumulative calcium silicate content (ex: $C_2S+C_3S$ phase concentration) of at least about 15%. Accordingly the method for making the building product may be carried out free (i.e. not requiring) of a heat treatment of the steel slag.

For example, the as-received steel slag used for making the building product has a cumulative calcium silicate content (ex: $C_2S+C_3S$ phase concentration) of at least about 23.3%. Accordingly the method for making the building product may be carried out free (i.e. not requiring) of a heat treatment of the steel slag.

For example, the as-received steel slag used for making the building product has a cumulative calcium silicate content (ex: $C_2S+C_3S$ phase concentration) of at least about 30%. Accordingly the method for making the building product may be carried out free (i.e. not requiring) of a heat treatment of the steel slag.

For example, the as-received steel slag used for making the building product has a cumulative calcium silicate content (ex: $C_2S+C_3S$ phase concentration) of at least about 40%. Accordingly the method for making the building product may be carried out free (i.e. not requiring) of a heat treatment of the steel slag.

For example, the as-received steel slag used for making the building product has a $SiO_2$ content of at least about 6%. Accordingly the method for making the building product may be carried out free (i.e. not requiring) of a heat treatment of the steel slag.

For example, the as-received steel slag used for making the building product has a $SiO_2$ content of at least about 12.4%. Accordingly the method for making the building product may be carried out free (i.e. not requiring) of a heat treatment of the steel slag.

In other exemplary embodiments, the building product may be made with steel slag that is pre-treated, such as being mixed with a silica-rich material and applying a heat treatment, as described elsewhere herein.

The building product formed according to exemplary methods described herein may have a binder that consists essentially of the steel slag. Furthermore, the granular material that is used may be waste material and/or recycled material. Accordingly, the building product consists essentially of waste material and/or recycled material. The granular material being a waste material may be steel slag sand, sawdust, glass aggregate, lightweight aggregate and recycled concrete aggregate.

Figure 3:
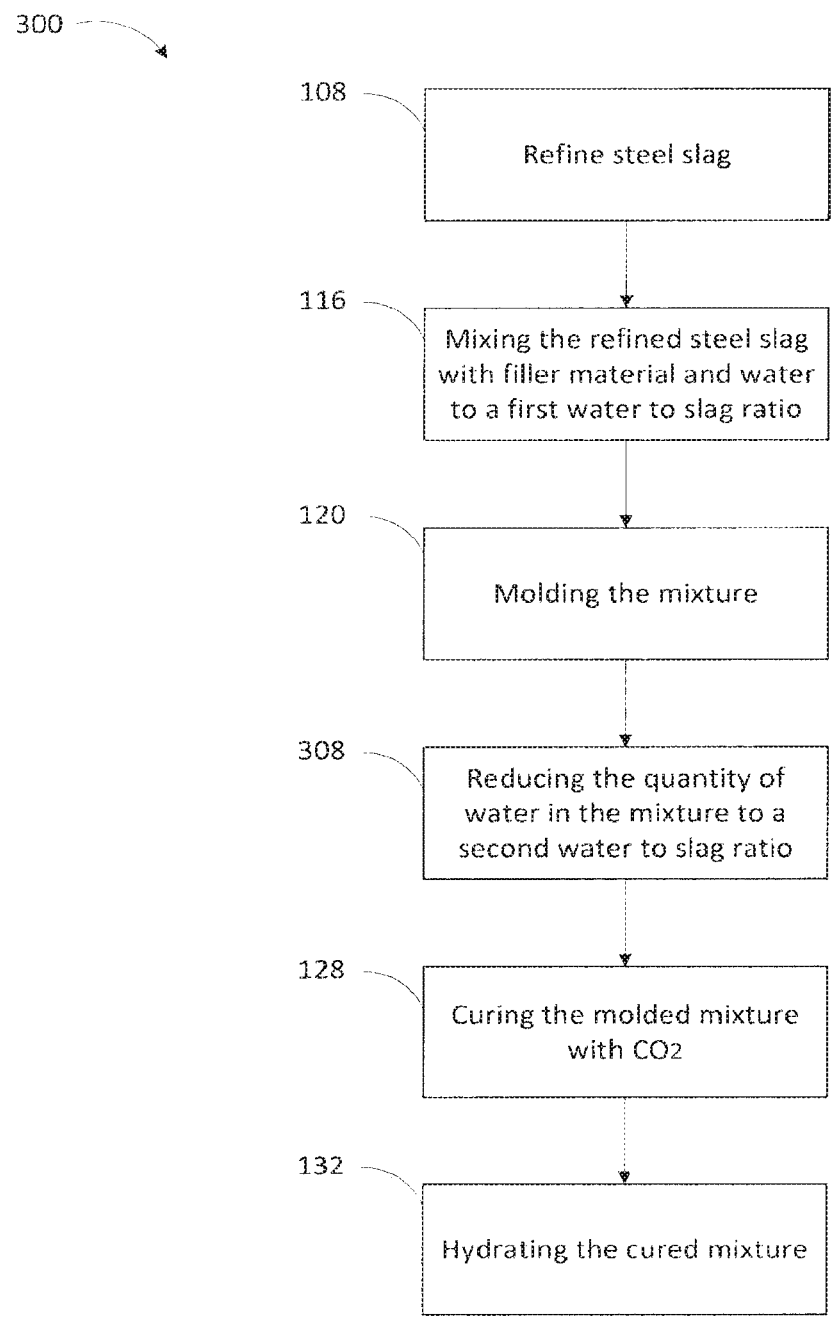
FIG. 3 is a flowchart of the steps of a method for making a construction block according to one exemplary embodiment.

According to various exemplary embodiments, the building product that is made is a construction block. Referring now to FIG. 3, therein illustrated is a flowchart of the steps of an exemplary method 300 for making a construction block that includes steel slag.

At step 108, the received steel slag may optionally be refined. For example, a filtering process or equivalent process may be used to separate fine slag pieces from coarse slag pieces. Alternatively, or additionally, refining the received steel slag may also include pulverizing some of the steel slag to fine powder.

At step 116, a suitable aggregate is provided as the granular material that is mixed with the steel slag that is being used as the binder. According to some exemplary embodiments, the aggregate is expanded iron slag sands. For example, the expanded iron slag may be produced from molten iron slag that is treated by high pressure steam.

According to various exemplary embodiments, the granular material used for making a construction block includes lightweight aggregate, such as natural lightweight aggregate, expanded clay aggregate, expanded shale aggregate, expanded slag aggregate, expanded steel slag aggregate and expanded iron slag aggregate.

The suitable aggregate is further mixed with the steel slag binder and water to a first water-to-slag ratio. It will be understood that the first water-to-slag ratio refers to the ratio of water content to slag content that is used as binder and does not account for any steel slag sands provided as aggregate. The first water-to-slag ratio may be higher than a given water-to-slag ratio that is optimal for achieving the highest $CO_2$ uptake at the curing step 128. It was observed that a higher first water-to-slag ratio improves the surface quality of the construction blocks that are made. It was observed that increasing the first water-to-slag ratio increased the smoothness of the surface of the construction blocks that are made. Accordingly, the first water-to-slag ratio is one that promotes, or is effective for, forming a smoothness of the construction block surface. For example, the first water-to-slag ratio may be at least about 0.15. For example, the first water-to-slag ratio may be about 0.16, about 0.17, about 0.18, about 0.19, about 0.20 or greater than about 0.20.

At step 120, the mixture of steel slag and suitable aggregate is molded or precast. The molding includes compacting the steel slag and aggregate mixture. A higher compacting pressure may be applied as the construction block may have a high density. For example, the amount of steel slag and aggregate mixture that is poured into a mold and the pressure of the compaction are chosen together so that a resulting thickness of the block after compaction corresponds to a conventional thickness, such as 10 mm, 15 mm, 20 mm, 25 mm or 30 mm.

The pressure of the compaction may be at least about 5 MPa. For example, the pressure of the compaction may be about 8 MPa, about 10 MPa, or about 12 MPa or greater than 12 MPa. In other exemplary embodiments, the pressure of the compaction may be greater than 15 MPa.

It was observed that a higher pressure of compaction can lead to higher compressive strength of the construction block. A higher compaction pressure may result in a slightly higher compressive strength.

It was further observed that a larger amount of pressure may result in less carbon uptake, thereby also limiting the compressive strength achieved. Accordingly, the pressure of the compaction may be less than 20 MPa.

After molding, the block formed of the steel slag and aggregate mixture is removed from the mold.

At step 308, the amount of water in the steel slag and aggregate mixture is reduced to a second water-to-slag ratio. The second water-to-slag ratio is less than the first water-to-slag ratio. It will be understood that the second water-to-slag ratio refers to the ratio of water content to slag content that is used as binder and does not account for any steel slag sands provided as aggregate. The second water-to-slag ratio is one that promotes, or is effective for, carbon uptake during the subsequent step of curing with carbon dioxide. For example, the second water-to-slag ratio may be between approximately 0.06 and approximately 0.12. For example, the second water-to-slag ratio may be between approximately 0.08 and approximately 0.10.

According to one exemplary embodiment, the amount of water in the steel slag and aggregate mixture is reduced after the molding of step 120 by applying an air flow to the mixture (i.e. block formed from the molding of step 308). It is believed that applying the air flow also increases porosity of the steel slag and aggregate mixture in the form of the block. The increased porosity further leads to increased carbon uptake in the subsequent step of curing with carbon dioxide. For example, the steel slag and aggregate mixture in the form of a block is blown with a fan for at least about 1 hour in order to reduce the water content. For example, the steel slag and aggregate mixture is blown with a fan for about 2 hours.

At step 128, the molded and compacted mixture of steel slag and aggregate in the form of a block is cured with carbon dioxide. Curing causes activation of the mixture and also results in sequestration of the carbon dioxide within the mixture. For example, the mixture of steel slag aggregate in the form of a block is cured with carbon dioxide for a period of at least about 2 hours. According to some exemplary embodiments, the steel slag and steel slag aggregate mixture may be cured with $CO_2$ for a duration of at least about 6 hours, at least about 12 hours or at least about 24 hours. For example, the mixture of steel slag aggregate in the form of a block is cured at a pressure of between 0.1 MPa and 0.5 M Pa.

Optionally, at step 132, the cured mixture of steel slag and aggregate may be further hydrated as described above. For example, the mixture of steel slag and aggregate in the form of a block is hydrated in a sealed chamber, such as a sealed plastic tent, or ambient air for at least 2 days.

For example, the mixture may be hydrated for at least 2 days.

For example, the mixture may be hydrated for at least about 7 days.

For example, the mixture may be hydrated for at least about 14 days.

For example, the mixture may be hydrated for about 35 days.

Figure 4:
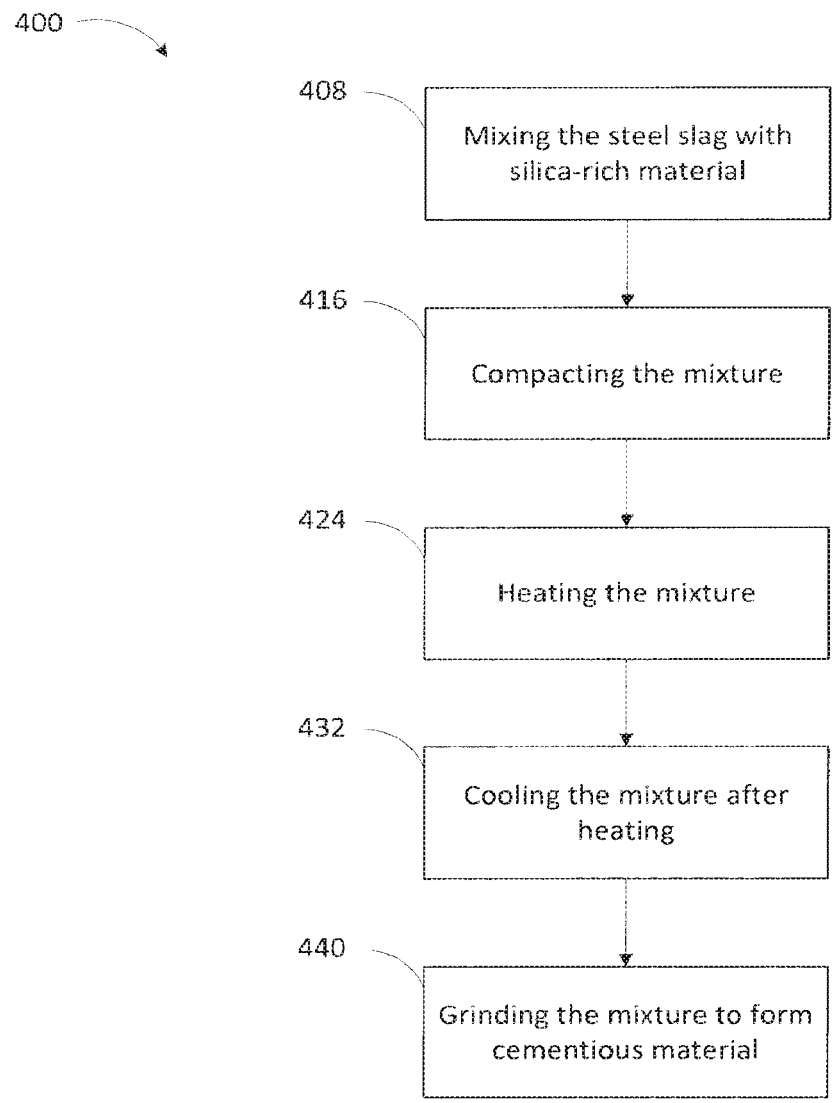
FIG. 4 is a flowchart of the steps of a method for making a building material from steel slag according to one exemplary embodiment.

Referring now to FIG. 4, therein illustrated is a flowchart showing the steps of an exemplary process 400 for treatment of steel slag for making a building material. The building material may be a cementitious (i.e. cement-like) material that may be used for making a building product. For example, the building material may be the binder material that is mixed with the granular material in order to make the building products described herein.

The exemplary process 400 may be applied for treating types of slag that are not immediately ready for use as binder for making a building product. That is, the steel slag as received from a steelmaking process requires treatment in addition to refining at step 108 in order to be used as binder.

For example, the steel slag requiring further treatment may be ladle slag.

For example, the steel slag requiring further treatment may be steel slag having a cumulative calcium silicate content of less than about 15%. For example, the cumulative calcium silicate content of the steel slag is less than about 12%.

For example, the steel slag requiring further treatment may be steel slag having a free lime concentration of greater than about 7.2%.

For example, the steel slag requiring further treatment may be steel slag having a silicate dioxide concentration of less than about 6.2%.

At step 408, the steel slag is mixed with a silica-rich material. The silica-rich material may be any material that includes at least 40% silicon dioxide ($SiO_2$) by chemical composition. In other embodiments, the material may include at least about 50% silicon dioxide, at least about 60% silicon dioxide or at least about 70% silicon dioxide by chemical composition.

The silica-rich material may include one or more of glass, fly ash, metakaoline, silica fume, zeolite and rice husk ash, or a combination thereof.

According to various exemplary embodiments, the silica-rich material consists essentially of waste and/or recycled materials.

In some exemplary embodiments, the silica-rich material includes glass. For example, the glass consists essentially of waste and/or recycled glass, such as glass recovered from fluorescent lamps. Such glass may have at least 70% silicon dioxide by concentration.

In some exemplary embodiments, the silica-rich material includes fly ash.

Residues generated in the combustion of coal include fly ash. Fly ash is also found in the fine particles arising from flue gases. By-products of power plants also include fly ash, which is classified as either Class F or Class C. Such fly ash may have at least 50% silicon dioxide by concentration.

The steel slag is mixed with the silica-rich material according to a slag to silica-rich material ratio. The slag to silica-rich material ratio may vary depending on the type of silica-rich material provided. For example, the slag to silica-rich material ratio may vary depending on the concentration of silicon dioxide within the silica-rich material.

For example, where the silica-rich material consists essentially of glass, the slag and silica-rich material is mixed such that the mixture includes between about 10% glass and about 30% glass. For example, the mixture may include about 20% glass.

For example, where the silica-rich material consists essentially of fly ash, the slag and silica-rich material is mixed such that the mixture includes between about 20% and about 40% fly ash. For example, the mixture may include about 30% fly ash.

The slag may be mixed with the silica-rich material in a pulverizer.

Accordingly, the mixing also causes grinding of the slag and the silica-rich material. In other exemplary embodiments, the slag and the silica-rich material may be ground before being mixed.

At step 416, the mixture of slag and silica-rich material is compacted. For example, the mixture is compacted into clinkers of a predetermined size. The mixture may be compacted in a mold, such as a steel mold, under a pressure of at least 30 MPa. For example, the mixture is compacted under a pressure of between about 40 MPa and 60 MPa, and preferably about 50 MPa.

At step 424, the compacted mixture of slag and silica-rich material is further heated. In one example, the mixture of slag and silica-rich material is heated on refractory plates placed in high-temperature furnaces. However, it will be understood that other suitable forms of heating may be used.

The heating may be performed by slowly increasing the temperature to a target temperature. Heating is then continued at the target temperature for a given duration of time. The target temperature and duration of the heating at the target temperature may vary.

For example, where the silica-rich material consists essentially of glass, the slag and glass mixture is heated to the target temperature at a rate of about 5° C./min. The target temperature may be at least about 700° C. For example, the target temperature may be between about 900° C. and about 1200° C. In one exemplary embodiment, the slag and glass mixture is heated at a target temperature of about 1100° C. The slag and glass mixture may be heated at the target temperature for a duration of at least about 30 minutes.

In some exemplary embodiments, the slag and glass mixture may be heated at the target temperature for a duration from about 30 minutes to about 60 minutes.

For example, where the silica-rich material consists essentially of fly ash, the slag and fly ash material is heated to the target temperature at a rate of about 5° C./min. The target temperature may be at least about 1000° C. For example, the target temperature may be between about 1200° C. and about 1400° C. In one exemplary embodiment, the slag and fly ash mixture is heated at a target temperature of about 1250° C.

In some exemplary embodiments, the slag and fly ash mixture may be heated at the target temperature for a duration of at least about 30 minutes. In some exemplary embodiments, the slag and fly ash mixture may be heated at the target temperature for a duration from about 30 minutes to about 60 minutes.

At step 432, the mixture of slag and silica-rich material is rapidly cooled after being heated at step 424. The mixture may be cooled by applying an air flow to the slag and glass mixture. For example, the air flow may be from a fan blowing onto the mixture in the form of clinkers. For example, the air flow may have a cooling rate of about 600° C. per hour. For example, the air flow is applied to the mixture for a duration of at least about 1 hour. The air flow may be applied for a duration of about 2 hours.

The mixture may also be cooled in ambient air. In such exemplary embodiments, the mixture may be cooled for a longer period of time, such as 6 hours or more. Depending on the method of cooling and rate of air flow, cooling duration can vary from about 1 hour to about 6 hours.

At step 440, the mixture of slag and silica-rich material is ground to fine pieces after being cooled. The fine pieces of the mixture of slag and silica-rich material form a building material that is ready to be used as binder within a building product. The fine pieces may exhibit cement-like properties that make it suitable for use for making a building product.

For example, the mixture of slag and silica-rich material in the form of clinkers after being cooled is pulverized at step 440.

The mixture may be pulverized to fine pieces having a Blaine number of at least about 200 $m^2$/kg.

For example, where the silica-rich material is glass, the mixture of slag and glass is ground to a fineness of about 285 $m^2$/kg.

For example, where the silica-rich material is fly ash, the mixture of slag and fly ash is ground to a fineness of about 200 $m^2$/kg.

According to various exemplary embodiments, building products made according to methods 100 or 300 may be made using the cement-like material formed according to method 400. The cement-like material formed according to method 400 is used as the binder within the building product.

Advantageously, building materials and building products made with exemplary methods and processes described herein may use one or more waste or recycled materials. In particular, steel slag, which is a by-product of steelmaking is used as binder material.

In other examples, steel slag sands are also used as aggregate for making building products.

In yet other examples, waste glass is mixed with steel slag, namely ladle slag, and is used to make a cementitious material.

In yet other examples, fly ash is mixed with steel slag, namely ladle slag, and is used to make a cementitious material.

According to various exemplary building materials and building products described herein, the building materials and building products consist essentially of waste and/or recycle materials.

According to various exemplary embodiments, steel slag is used as-received from a steelmaking process as a binder for making a building product. Accordingly, heat treatment typically required for making Portland cement may be avoided, thereby achieving a savings in energy.

According to various exemplary embodiments, steel slag is treated by mixing with a silica-rich material and further heat treatment. The temperature of the heat treatment is lower than typically required for making Portland cement. Accordingly, a savings in energy may be achieved.

Advantageously, it was observed that curing with carbon dioxide at least improved early strength of the building products that were made. It was also observed that carbonation curing may improve the ultimate compressive strength. It was also observed that carbonation curing of construction products with carbon dioxide improves the durability properties, such as freeze and thaw resistance and/or permeability. Curing with carbon dioxide further results in sequestration of carbon dioxide. This sequestration reduces carbon dioxide that is emitted from steel making or that needs to be disposed of in another way.

EXPERIMENTAL PROGRAMS AND RESULTS

Measuring Carbon Uptake

Various experimental programs that were carried out included measuring the quantity of carbon uptake from curing with carbon dioxide. Three different methods were used to quantify the carbon dioxide uptake by steel slag slabs subject to carbonation. The results are complementary and comparable. They are the mass gain method, mass curve method, and $CO_2$ analyzer method.

The mass gain method, expressed in Equation 3, estimates the mass difference before and after carbonation. The mass difference together with water evaporated from the exothermic carbonation reaction represents the mass gain due to carbon dioxide uptake. The carbonation reaction is exothermic in nature, and as a result some of the mixing water in the samples evaporates and condenses on the inner walls of the chamber. This water can be collected using absorbent paper and should be added to the mass of the carbonated sample since the water present in the chamber is part of the water in the original slag mass.

$$CO_2 \text{ uptake } (\%) = \frac{\text{Final mass} + \text{Mass of } wter \text{ loss} - \text{Initial mass}}{\text{Mass of dry sample}} \quad \text{Equation 3}$$

The mass curve method determines $CO_2$ uptake using recorded mass with the origin at the time of gas injection. A mass curve was recorded until the end of the process at which time $CO_2$ was released and the residual mass, M, was measured. The system was calibrated by repeating the tests using $CO_2$-insensitive polystyrene foam of the same volume to obtain a second residual mass, m. The difference between M and m represented the $CO_2$ uptake by the sample (Equation 2). Data collected by mass gain and mass curve methods are two simultaneous measurements from the same process and therefore should be comparable. They are independent from any carbon content which existed before carbonation.

$$CO_2 \text{ uptake } (\%) = \frac{M - m}{\text{Mass of dry sample}} \quad \text{Equation 4}$$

An ELTRA CS-800 carbon analyzer with an induction furnace and infrared detection of the evolved $CO_2$ was also used to quantify the $CO_2$ uptake of ladle slag compacts after carbonation. For comparison, the $CO_2$ content of the hydrated slag reference was also measured using the ELTRA CS-800 analyzer. The $CO_2$ uptake of the slag compacts upon carbonation is then given by the difference in the carbon content ($\Delta M$) between the carbonated and hydrated slags with reference to dry slab mass $$CO_2 \text{ uptake } (\%) = \frac{\Delta M}{\text{Mass of dry sample}} \quad \text{(Equation 3)}$$

X-ray diffraction (XRD) analysis was performed to identify the phases generated or consumed during carbonation/hydration of the different forms of slag considered in this study: as-received, thermally-treated, hydrated, and carbonated. A Bruker D8 Diffractometer (Cu Kα radiation, scan interval 15-80° 2θ, 0.02°) was employed to perform this analysis.

Thermogravimetric analysis and differential thermogravimetric analysis (TG/DTG) were also conducted using a NETZSCH TG 449F3 Jupiter thermo-analyzer to determine hydration and carbonation products. The same powder prepared for XRD analysis was used for TG analysis. The samples were collected to include surface and core, and the powder was uniformly mixed to represent the average through thickness. The powder was then heated between 20 and 1000° C. at a heating rate of 10° C./min. The hydration and carbonation products were determined based on the characteristic peaks on DTG curves.

Sample Building Product 1: Construction Block

A slag-bonded block was made with EBH (EAF+BOF slag) steel slag as binder. The chemical composition of EBH slag is presented in Table 1 hereinbelow. Table 2 shows the mix design for the slag-bonded block. Steel slag was the only binder used in the production of a block where expanded slag aggregate was used as aggregate. The water absorption and density of expanded slag sand are 6.5% and 1900 kg/m³, respectively. Although the optimum water-to-slag (W/S) ratio for achieving the highest $CO_2$ uptake and strength was determined as 0.08 (~0.1), this ratio resulted in the production of a block with a rough surface. The waterto-slag ratio was then incrementally increased to improve the surface quality of the blocks. The highest water-to-slag ratio tested, i.e. 0.20, led to the smoothest surface and therefore was identified as the desired first water-to-slag ratio in the mix design. The mixture of EBH, aggregate and water was compacted under 12 MPa pressure, after which it was poured into the steel mold. The thickness of the 127×76 mm block after compaction was designed to be 30 mm, which is the wall thickness of the conventional commercial block. After demolding, the samples were put in front of a fan for 2 hours in order to reduce the water-to-slag ratio from 0.20 to 0.10. Afterward, the blocks with the smooth surface and optimum W/S ratio for the carbon dioxide activation were exposed to $CO_2$ for 24 hours at 23 psi pressure in the carbonation chamber. The carbon dioxide uptake was measured using the mass gain method. All blocks were kept in plastic bags for 35 days for subsequent hydration before testing their mechanical and durability properties. Testing was also carried out on a conventional commercial cement block for comparison to the slag-bonded block.

TABLE 1

Chemical composition of steel slag (wt %)

| Sample | $SiO_2$ | $TiO_2$ | $Al_2O_3$ | $Fe_2O_3$ | MnO | MgO | CaO | $Na_2O$ | $K_2O$ | $P_2O_5$ |
|---|---|---|---|---|---|---|---|---|---|---|
| EBH | 12.47 | 0.87 | 6.87 | 19.48 | 3.84 | 10.57 | 39.08 | <0.01 | 0.01 | 0.41 |
| KOBM | 11.5 | — | 2.8 | 9.9 | — | 27.2 | 43.7 | 0.08 | 0.01 | — |

TABLE 2

Mix design

| Type of sample | EBH ($kg/m^3$) | Mix slag sand ($kg/m^3$) | Initial water/slag ratio | Compaction (MPa) |
|---|---|---|---|---|
| Slag bonded block | 1555 | 930 | 0.2 | 12.0 |

The density and water absorption of the slag-bonded and commercial cement blocks were reported as the average of 3 results. The compressive strength of the blocks was evaluated at two conditions: dry and wet. For measuring the wet compressive strength, the blocks were kept in water at a temperature of 23° C. for 48 hours. The surface of each block was then dried before the blocks were subjected to a compressive load at the rate of 0.5 mm/min.

The durability of the blocks was determined by their exposure to freeze and thaw cycles. The freeze and thaw test methods were carried out in accordance with CSA A23.1 (2009). The reported mass values are the average of 3 results.

A schematic representation of the carbonation setup is shown in FIG. 2. It includes a compressed 99.5% purity $CO_2$ gas cylinder, a carbonation chamber, a pressure transducer, a pressure regulator and a heater. The pressure transducer monitors the gas pressure and the regulator maintains the chamber pressure constant at 0.15 MPa throughout the carbonation process. An electric heater is used to warm the $CO_2$ gas to 22° C. prior to entering the carbonation chamber.

As Table 3 shows, the carbon dioxide uptake of the slag-bonded block reached 6.6%, which was almost the same as the $CO_2$ uptake of the slag-bonded board (discussed further below). The equivalency of the $CO_2$ uptakes is due to the fact that the uptake for both slag-bonded board and slag-bonded blocks were measured based on the weight of steel slag.

TABLE 3

Slag bonded block carbon dioxide uptake

| Product | $CO_2$ pressure (MPa) | $CO_2$ exposure (hours) | Subsequent Hydration (days) | Carbon dioxide uptake (%) |
|---|---|---|---|---|
| Slag-bonded block | 0.15 | 24 | 35 | 6.6 ± 0.2 |

The results for density and water absorption of the commercial cement block and the slag-bonded block are presented in Table 4 hereinbelow. The density of the slag-bonded block exhibited just a 10% increase compared to the commercial block. The water absorption of the commercial cement block and the slag-bonded block was 5.5% and 6.7%, respectively. Therefore, the physical properties represented by density and water absorption were essentially the same for both types of blocks.

TABLE 4

Density and water absorption of slag bonded block

| Product | Slag-bonded block | Commercial cement block |
|---|---|---|
| Density (kg/m3) | 2545.0 ± 25.1 | 2254.9 ± 52.7 |
| Water absorption (%) | 6.7 ± 0.1 | 5.5 ± 0.2 |

Figure 5:
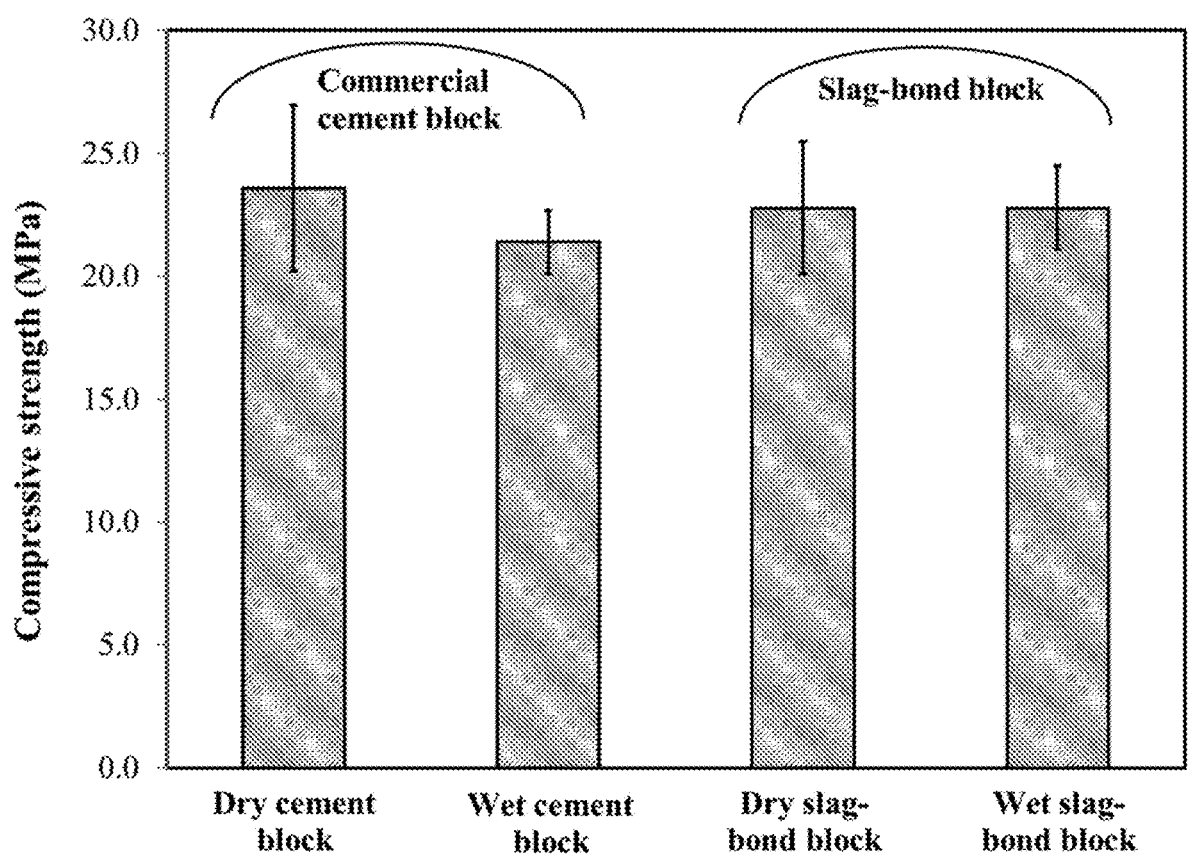
FIG. 5 is a schematic chart showing dry and wet compressive strength of slag-bonded blocks in accordance with an exemplary embodiment.

FIG. 5 illustrates the dry and wet compressive strengths of a commercial cement block and the slag-bonded block. The dry compressive strengths of the commercial and slag-bonded blocks were 23.6 MPa and 22.8 MPa, respectively. The compressive strength of the slag-bonded block satisfied the minimum requirements for the load-bearing masonry units as suggested by BS 6073 (2008). The compressive strength of the wet commercial cement block dropped by 10% while the wet slag-bonded block exhibited no reduction in strength compared to the dry block. The values of compressive strength for the slag-bonded block suggest that the block made solely from waste materials can compete with the commercial cement block on mechanical performance. No report has previously been published on the properties of blocks made with slag as binder and slag sand as aggregate. However, the results of the study performed by Monkman and Shao (2010) showed that the compressive strength of masonry units made with cement and slag sand after being subjected to 2 hours carbonation followed by 28 days hydration was 15.5 MPa. The higher carbonation period in the current experimental program resulted in a higher compressive strength than seen by Monkman and Shao, although they used cement as binder.

Figure 6:
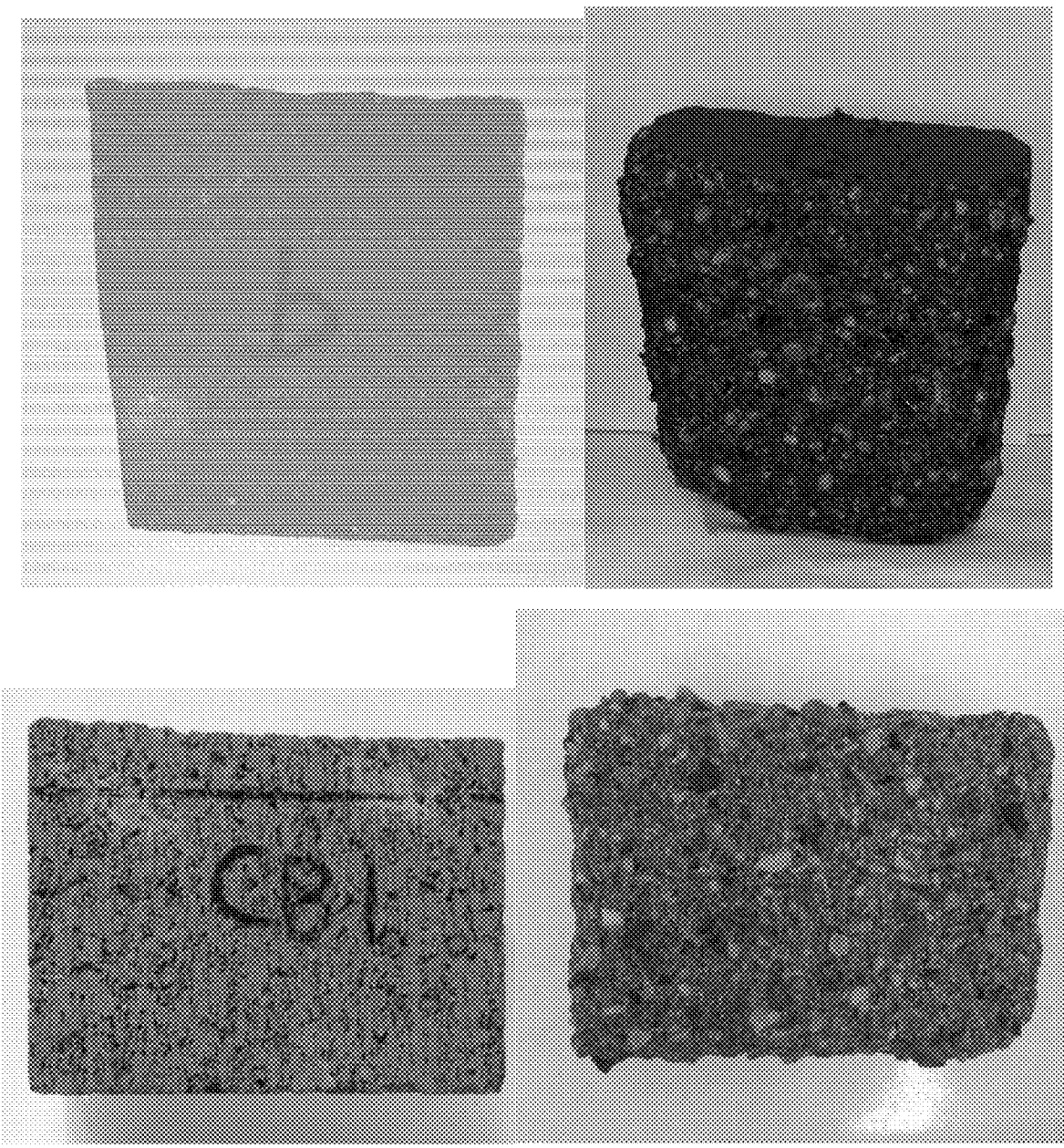
FIG. 6 are pictures of slag-bonded blocks, in accordance with an exemplary embodiment, and commercial cement blocks, after 20 cycles of freeze and thaw.

FIG. 6 are pictures of slag bonded blocks, in accordance with an exemplary embodiment, and commercial cement blocks after 20 cycles of freeze and thaw. The two bottom photos are photos of the commercial cement blocks and the two top photos are photos of the slag-bonded block.

Figure 7:
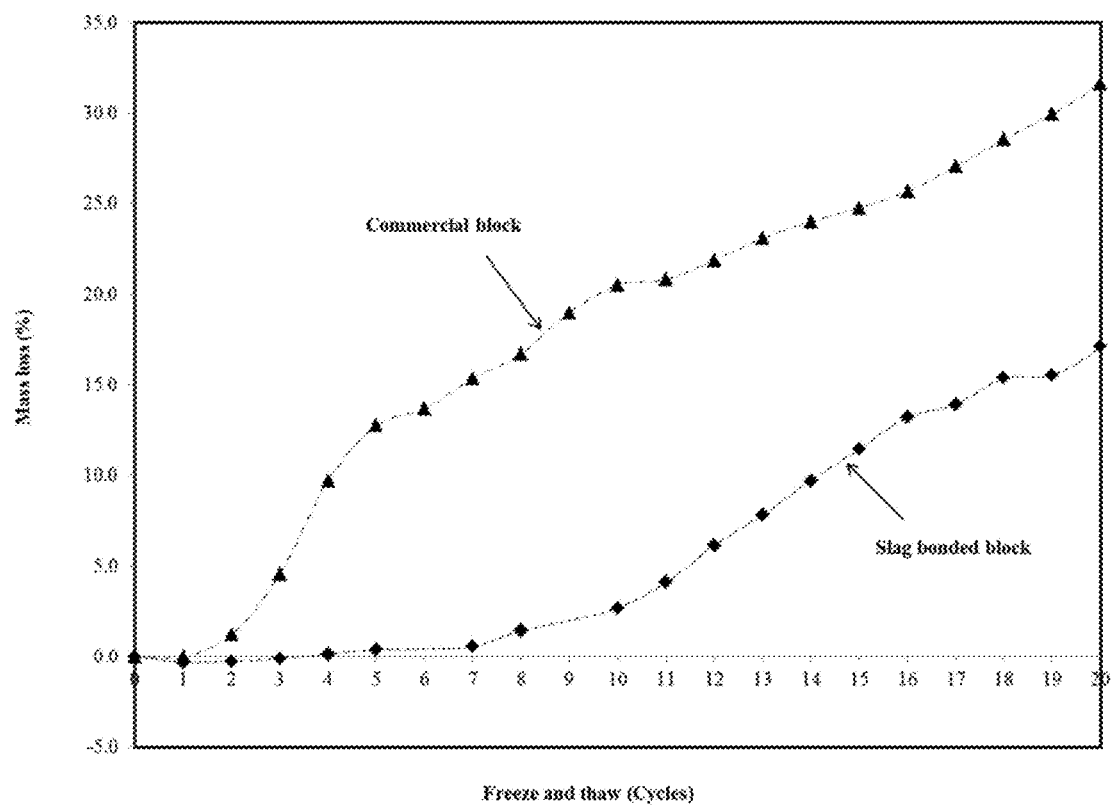
FIG. 7 is a schematic graph showing mass loss in the freeze and thaw test for slag-bonded blocks and commercial blocks, in accordance with an exemplary embodiment.

FIG. 7 shows the mass loss of slag-bonded and commercial cement blocks subjected to 20 freeze and thaw cycles. The commercial and slag-bonded blocks started losing mass after 2 and 7 cycles, respectively. Beyond the 7th cycle, both blocks experienced the same rate of mass loss. After 20 cycles of freeze and thaw, the commercial block lost 32% of its mass, whereas the weight of the slag-bonded block decreased by only 17%. Accordingly, the slag-bonded block exhibited higher resistance when exposed to freeze and thaw cycles compared to the commercial block. Considering the compressive strength and freeze and thaw results, one can conclude that the mechanical and durability properties of blocks made with waste materials in this experiment were equivalent or superior when compared to a commercial cement block.

Sample Building Product 2: Slag Wallboard

The KOBM slag was used as a binder in making slag-bonded wallboard. Klockner Oxygen Blown Maxhutte (KOBM) process is considered as a subset of the basic oxygen furnace (BOF) process. Its chemical composition, as determined by X-ray fluorescence spectrometry (XRF), is presented in the aforementioned Table 1. Prior to its use, the slag was ground to a powder using a Bico Braun Model 395-5 ball mill for 2 hours, and only the material that passed through a 75-μm sieve was used in the subsequent experiments. The Blaine fineness of the ground slag was 402±55 $m^2/kg$. The softwood sawdust used in making the wallboards was sieved through a 600-μm sieve and oven-dried at 50° C. until its mass became invariant.

The carbonation setup shown in FIG. 2 and described hereinabove is also used herein for the carbonation of wallboards.

A mixture of KOBM steel slag, sawdust and water was press-formed at a pressure of 12 MPa for 15 seconds to create a lightweight steel-slag board measuring 76 mm by 127 mm, with a thickness of 12 mm. In preliminary tests, the sawdust-to-slag ratio was varied from 5 to 15% by mass at a water-to-slag ratio of 0.15, and carbonation carried out for 2 hours. In subsequent experiments, a sawdust-to-slag ratio of 10% and a carbonation period of 24 hours were chosen to optimize the density and strength of the board. Mechanical tests on the laboratory wallboards were performed after 28 days of post-carbonation hydration. Flexural strength and modulus were determined using 3-point bending over a 102 mm span. Compressive strength was determined over a compression area of 127 mm×12 mm. The mechanical properties of the slag-bonded sawdust boards were compared to those of three commercial wallboards: cement mesh board, cement-fiber board, and cement bead board with expanded polystyrene (EPS) beads.

The capillary water absorption capacity of the KOBM steel slag sawdust boards was also evaluated. After 28 days of curing in a sealed bag, the boards were dried in an oven at 50° C. After drying, each slag-sawdust board was immersed vertically in a 5-mm thick layer of water for 28 days. At 24-hour intervals, the boards were removed from the water, their surface dried, and then the boards were weighed. After 28 days, the boards were removed from the water, their surface dried again, and they were then tested for flexural strength, compressive strength, and Young's modulus. The results were then compared with those of the dry controls which had been left in a sealed plastic bag for 56 days.

Figure 8:
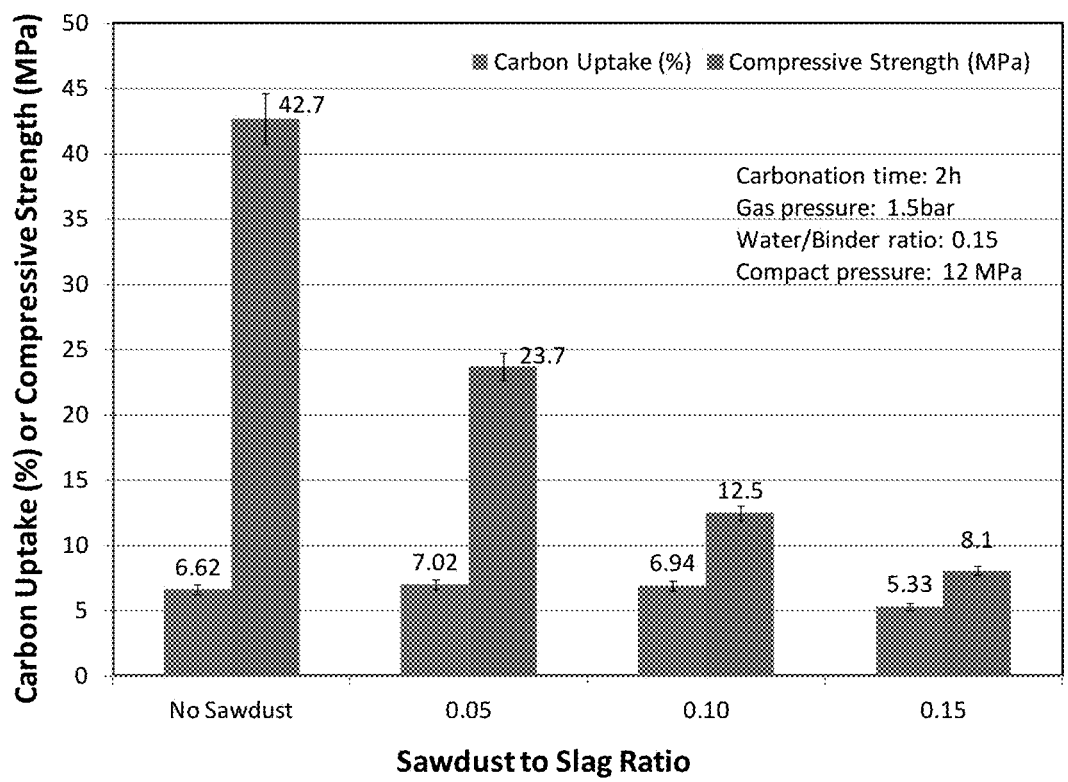
FIG. 8 is a schematic chart showing an effect of sawdust-to-slag ratio on carbon uptake and strength of carbonated slag in accordance with an exemplary embodiment.

To investigate the effect of sawdust on the board performance of carbonated slag, the mechanical properties of four batches with different sawdust-to-slag ratios were compared. The cylinder compacts were 20 mm in height and 15 mm in diameter and formed under optimal process conditions: compaction pressure=12 MPa, water-to-slag ratio=0.15, carbonation time=2 hours, and $CO_2$ gas pressure=1.5 bar. A higher than optimal water-to-slag ratio was used to incorporate the use of the dry sawdust. Compressive tests were carried out one hour after carbonation. The effect of sawdust on carbon uptake and compressive strength is displayed in FIG. 8. Whereas the carbon uptake was not significantly influenced by the addition of the sawdust, the compressive strength of the carbonated slag decreased sharply with the relative sawdust content. This reduction not only resulted from a reduction in the amount of binder, but also from the delayed hydration due to the lignin in sawdust. The sugar content in lignin served as a hydration retarder. Irrespective of the sawdust content, carbonation always improved the performance of the slag-bonded sawdust product.

Figure 9:
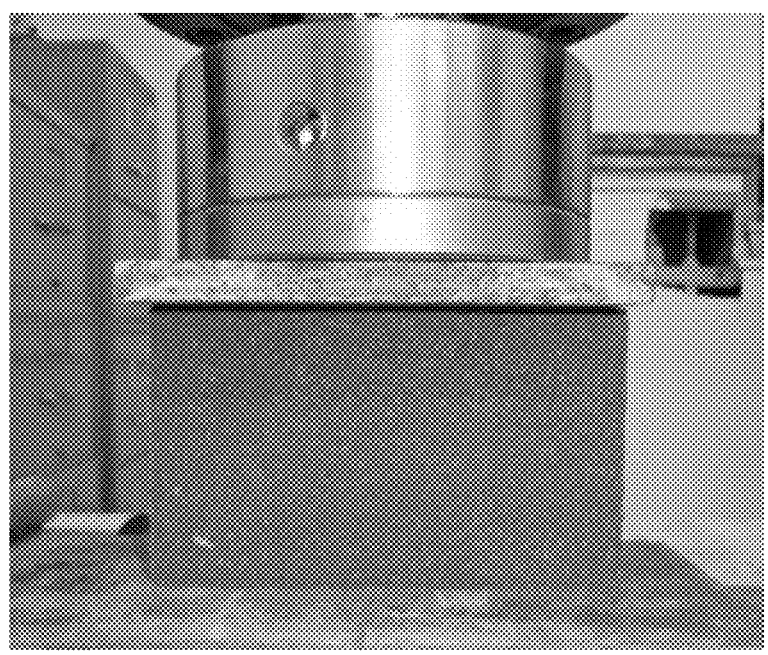
FIG. 9 is a picture of a steel slag-bonded sawdust panel in accordance with an exemplary embodiment.

A picture of a slag-bonded sawdust board specimen (76×127×12 mm) made in the laboratory is shown in FIG. 9. Such slag-bonded sawdust boards were tested 28 days after carbonation and hydration. Results for the compressive strength, the flexural strength, the modulus of elasticity and the density are presented in Table 5 hereinbelow, along with those of three commercial board products. They revealed that the physical properties of the KOBM slag board were comparable to those of the commercial products. The flexural strength of the KOBM slag-sawdust board (6.3 MPa) was higher than that of the cement-mesh board and close to those of the cement-fiber board and cement-EPS board. The compressive strength of KOBM slag-sawdust board was 13.8 MPa, well within the range of strength values of commercial products. Given the high density of the binder, the KOBM slag-sawdust board had the highest density (1.4 $g/cm^3$) of the four materials tested.

TABLE 5

Comparison of wallboard properties

| Wallboard | Compressive strength (MPa) | Flexural strength (MPa) | Modulus (GPa) | Density ($g/cm^3$) |
| --- | --- | --- | --- | --- |
| Slag-sawdust-(10%) | 13.8 ± 0.6 | 6.3 ± 0.3 | 1.1 ± 0.1 | 1.4 ± 0.04 |
| Commercial board [Cement-mesh] | 13.0 ± 0.5 | 4.9 ± 0.7 | 1.9 ± 0.2 | 1.3 ± 0.01 |
| Commercial board [Fiber-cement] | 14.8 ± 0.6 | 6.9 ± 0.2 | 2.2 ± 0.3 | 1.2 ± 0.06 |
| Commercial board [Cement-EPS] | 15.5 ± 0.7 | 7.9 ± 0.4 | 2.2 ± 0.1 | 1.1 ± 0.04 |

Figure 10:
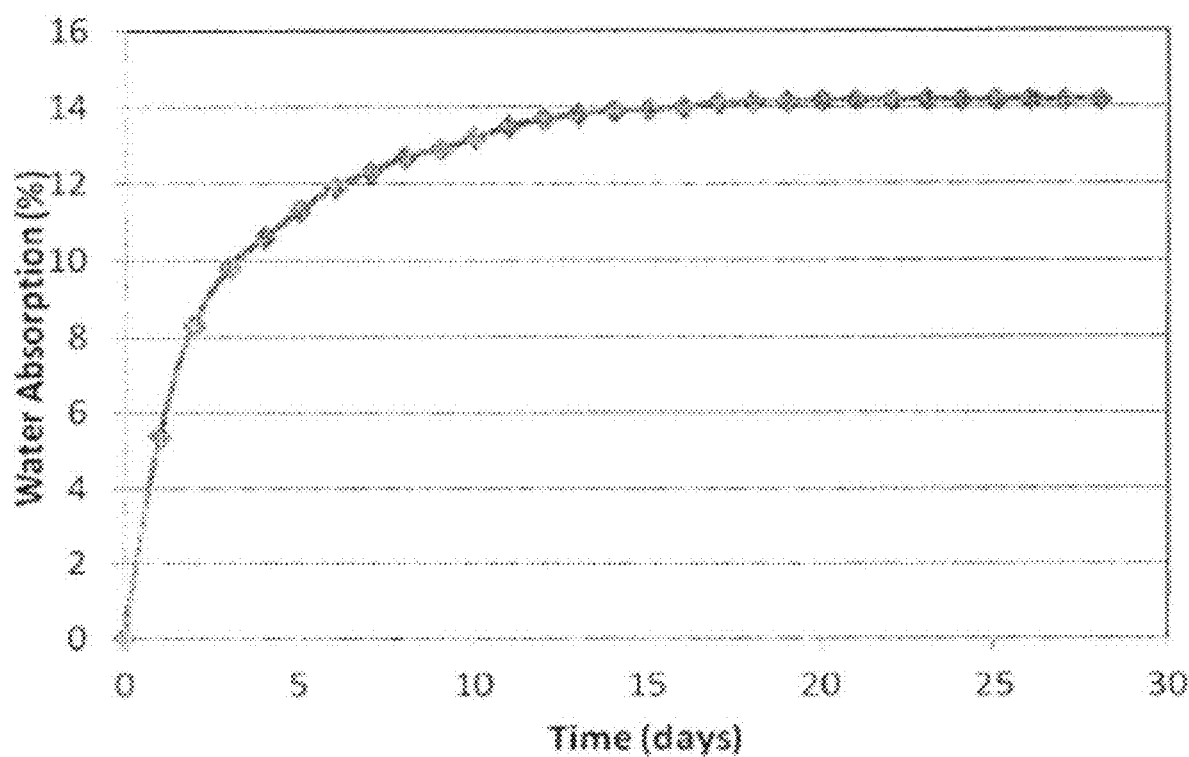
FIG. 10 is a schematic graph showing water absorption of slag-bonded sawdust panels due to wicking in accordance with an exemplary embodiment.
Figure 11:
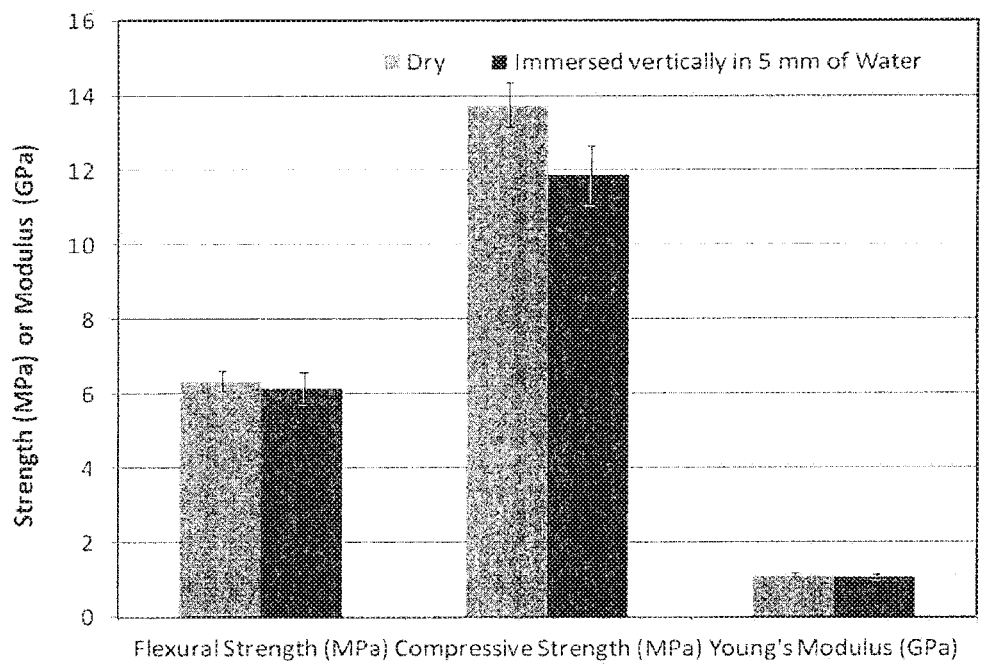
FIG. 11 is a schematic chart showing the mechanical properties of dry and wet KOBM slag boards in accordance with an exemplary embodiment.

Like cement-based boards, the KOBM-slag board was designed for wet applications. Therefore, capillary water absorption and its effect on the mechanical performance is an important measure of its durability. The capillary water absorption of the slag-sawdust board was measured over a period of 4 weeks. After oven drying at 50° C. to a constant mass, the carbonated slag board was immersed vertically in a 5 mm deep layer of water for 28 days. The tests were carried out in triplicate and averaged. The water absorption curve is shown in FIG. 10. The increase in mass due to water absorption was highest in the first 3 days, with the absorption reaching 9.8% by day number 3. The absorption continued until a plateau was reached by day 19 at around 14.2%, indicating that the sample reached saturation through capillary action. The absorption of water was attributed to the open structure of the board in the presence of sawdust particles, which increased the amount of air voids in the sample. The effect of water absorption on the mechanical properties of the KOBM slag-bonded sawdust board is presented in FIG. 11. The flexural strength and elastic modulus of the wet and dry samples were statistically similar, indicating that saturation of the pores had no effect on the bending strength or the stiffness of the slag board. Nevertheless, there was reduction in compressive strength after 28 days of water wicking, as the strength dropped from 13.8 MPa to 11.9 MPa, a 14% decrease.

Example 3: Treatment of Steel Slag for Making a Building Material

Two ladle slags (L2 and L3) were received from a steel mill in Montreal, Canada. They were collected from the same production line of the steel mill at different times. They were received about two years apart from each other. Because of the slow cooling, ladle slag was produced as powder which was then packed into porous "cakes" for shipping and handling. The as-received dry ladle slag "cakes" were first crushed and then further pulverized into powder with Blaine numbers of 318 m$^2$/kg and 247 m$^2$/kg for L2 and L3, respectively. L2 slag was received two years earlier than L3.

The chemical compositions of as-received ladle slag (L2 and L3) were determined by the X-Ray Fluorescence (XRF) analysis and are presented in Table 6. The variability between the two raw forms of slag may be seen. The difference in composition of ladle slag is possibly caused by the changes in process and the different steel products. As shown in Table 6, ladle slag L2 demonstrates a higher calcium and silica content, while ladle slag L3 had higher alumina, iron and magnesium content. The carbon dioxide content was determined by infrared based carbon analyzer. They were relatively low. The free lime was measured using the Franke method, in accordance with ASTM C114 (2014). Ladle slag L3 contains higher free lime than ladle slag L2. To evaluate hydration and carbonation behaviour of ladle slag, it is important to determine the mineralogical phases, mainly the dicalcium silicate ($C_2S$) and tricalcium silicate ($C_3S$). This was accomplished by using semi-quantitative X-ray diffraction (QXRD) analysis with 10% $TiO_2$ as internal reference (Chung 1974). By comparing the XRD peaks of pure $C_2S$, pure $C_3S$, pure $TiO_2$ and ladle slag, the percent of $C_2S$ and $C_3S$ in ladle slag can be estimated. Ladle slag L2 has much higher $C_3S$ content than ladle slag L3. It is possible for ladle slag to contain $C_3S$ (Posch et al. 2002) since the process temperature could go over 1500° C. (He et al. 2012). Table 6 also shows the chemical composition of ground waste glass as silica additive for heat treatment in case the as-received ladle slag cannot be activated directly by carbonation (possibly due to the lack of calcium silicates). The waste glass is the by-product of the recycling process of fluorescent lamps and is ground to a powder having a Blaine number of 600 m$^2$/kg.

For each ladle slag, a total of nine slab specimens of 76×127×12 mm were compact-formed at a pressure of 12.5 MPa with a water-to-slag ratio of 0.1. Six specimens were subjected to carbonation activation right after specimen formation. Of the six carbonated slabs, three were tested immediately after carbonation for compressive strength and the other three were tested after subsequent hydration for 35 days in sealed plastic bags. Three hydration reference specimens were cured in sealed plastic bags and tested after 35 days of hydration. The carbonation set-up is shown in FIG. 2. A $CO_2$ gas with a purity of 99.5% was used for carbonation. The gas was first warmed up by a heater and then injected into the chamber to a pressure of 0.15 MPa for a duration of 24 hours. The pressure was maintained constant by the regulator so that the carbon dioxide consumed by slag products can be replenished.

Both ladle slags L2 and L3 were tested first in as-received form. Ladle slag L2 compacts were $CO_2$— reactive and could develop strength in 24 h by carbon activation. However the ladle slag L3 compacts were totally cracked due to the extreme heat generated from carbonation.

Figure 12:
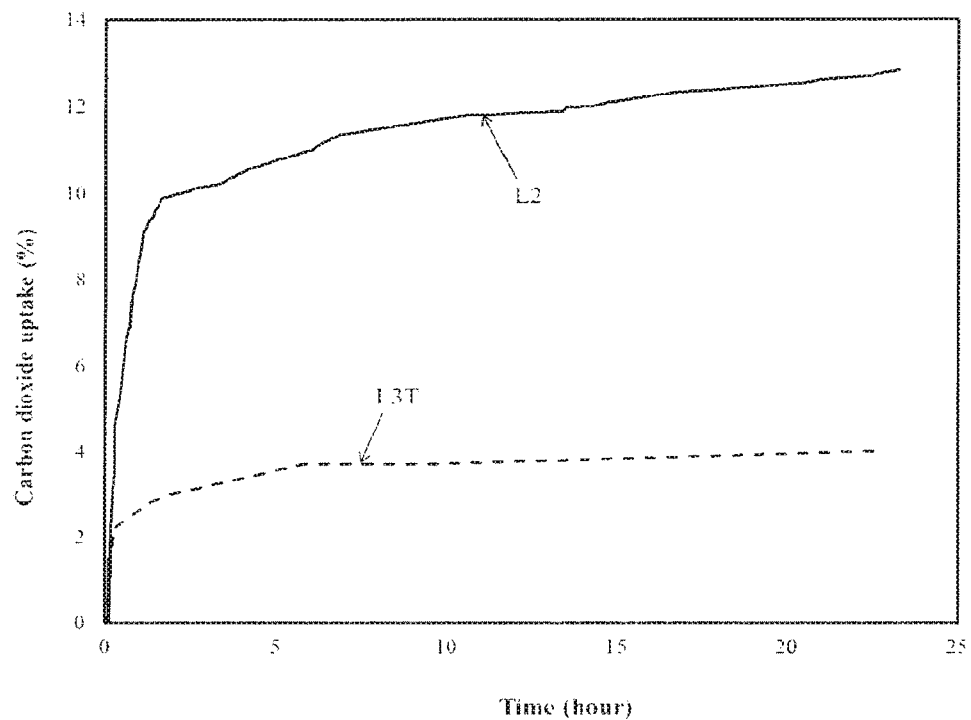
FIG. 12 is a graph mass curves of ladle slag compacts subjected to 24 hour carbonation according to one exemplary embodiment.

Carbonation behavior of the as-received ladle slag, L2 and L3, was characterized by carbon dioxide uptake. Ladle slag L2 compacts exhibited excellent carbon reactivity. Results from the mass gain method yielded an uptake of 9.9%, which was slightly lower than the value of 12.8% obtained by the mass curve method. The average carbon content by $CO_2$ analyzer was 9.4%, which was in the same order of magnitude as measured by the mass gain and mass curve methods. The typical mass curve of ladle slag L2 compact is shown in FIG. 12. It was interesting to notice that more than 70% carbonation reaction had occurred in the first two hours. It seems that the ladle slag compact could reach a similar degree of carbonation reaction as ladle slag powder.

Figure 13:
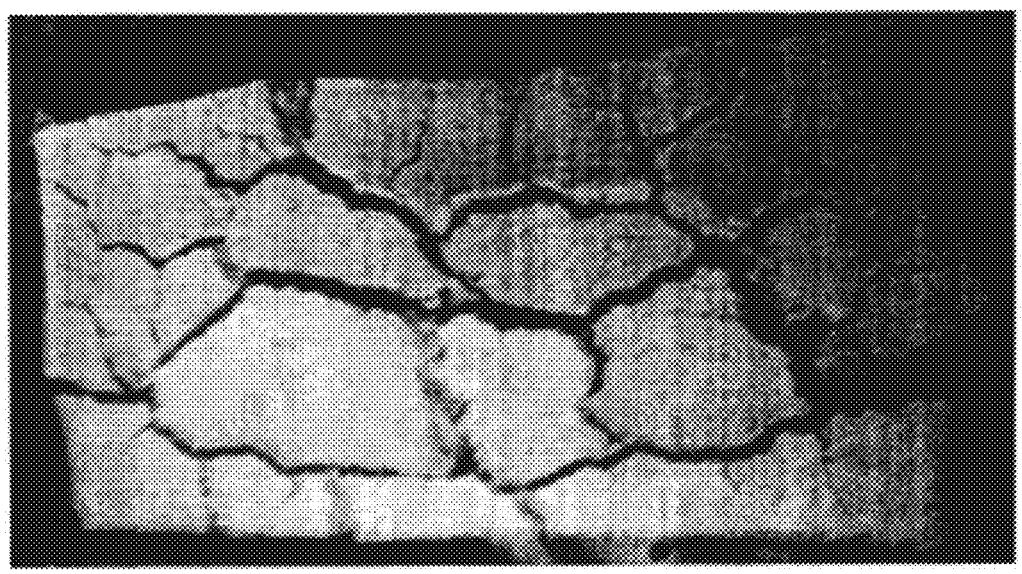
FIG. 13 is a picture showing the crack pattern of a slag compact according to one exemplary embodiment.

By contrast, ladle slag L3 with low silica content cracked during the carbonation, as shown in FIG. 13. There was no mass increase and no carbon dioxide uptake. Instead, significant heat was generated. The ladle slag L3 compacts cracked in a similar way as the quick lime (CaO) compact, indicating that the heat was created by carbonation of free lime. This heat dissipation was felt immediately after the L3 slag was mixed with water, an effect arising from the hydraulic reaction of free lime. As seen in Table 6, the free lime content of L3 was 50% higher than L2. It is likely there is a threshold value of free lime content over which ladle slag cannot stand the hydration and carbonation reactions.

Table 7 shows compressive strength of ladle slag compacts due to hydration and carbonation. Ladle slag L2 was weak in the hydraulic reaction. The compressive strength of L2 compacts reached only 6.0 MPa after 35 days in sealed hydration. On the other hand, the same compact specimens that underwent 24 hours of carbonation curing achieved a significantly higher compressive strength of 34.8 MPa. The compact specimens that underwent combined curing of 24 h carbonation followed by 35 day hydration achieved a com-

TABLE 6

Chemical compisitions and calcium silicate phases of raw material

| ID | Chemical compositions (%) | | | | | | | Free lime | Phases (%) | |
|---|---|---|---|---|---|---|---|---|---|---|
| | CaO | SiO$_2$ | Al$_2$O$_3$ | Fe$_2$O$_3$ | MgO | Na$_2$O | CO$_2$ | | C$_2$S | C$_3$S |
| Ladle slag (L2) | 65.23 | 12.35 | 16.55 | 0.79 | 3.96 | 0.08 | 1.10 | 7.2 | 9.5 | 31.1 |
| Ladle slag (L3) | 57.55 | 6.21 | 23.17 | 3.55 | 5.04 | 0.16 | 0.20 | 10.8 | 9.3 | 3.6 |
| Waste glass | 4.89 | 70.68 | 1.62 | 0.22 | 3.08 | 16.06 | — | — | — | — | pressive strength of 39.5 MPa, demonstrating that the ultimate strength was the superposition of early carbonation strength with subsequent hydration strength. In other words, carbonation did not hinder hydration, and more strength was gained after carbonation from the subsequent hydration. For ladle slag L3, the compacts were cracked either by carbonation or by hydration. In hydration of ladle slag L3, a similar crack pattern as shown in FIG. 13 was developed in the hydrated compact after 10 days in sealed hydration. It is the free lime content that produced the heat and cracked the compacts.

TABLE 7

Compressive strength of ladle slag compacts

| ID | Type of slag | Hydration time (days) | Carbonation time (h) | Subsequent hydration (days) | Test age (days) | Compressive strength (MPa) |
|---|---|---|---|---|---|---|
| L2-0C + 35H | L2 | 35 | — | — | 35 | 6.0 ± 1.7 |
| L2-24C + 0H | L2 | 0 | 24 | 0 | 1 | 34.8 ± 9.52 |
| L2-24C + 35H | L2 | 0 | 24 | 35 | 36 | 39.5 ± 11.9 |
| L3-0C + 35H* | L3 | 35 | 0 | 0 | 35 | 0 |
| L3-24C + 0H* | L3 | 0 | 24 | 0 | 1 | 0 |

Figure 14:
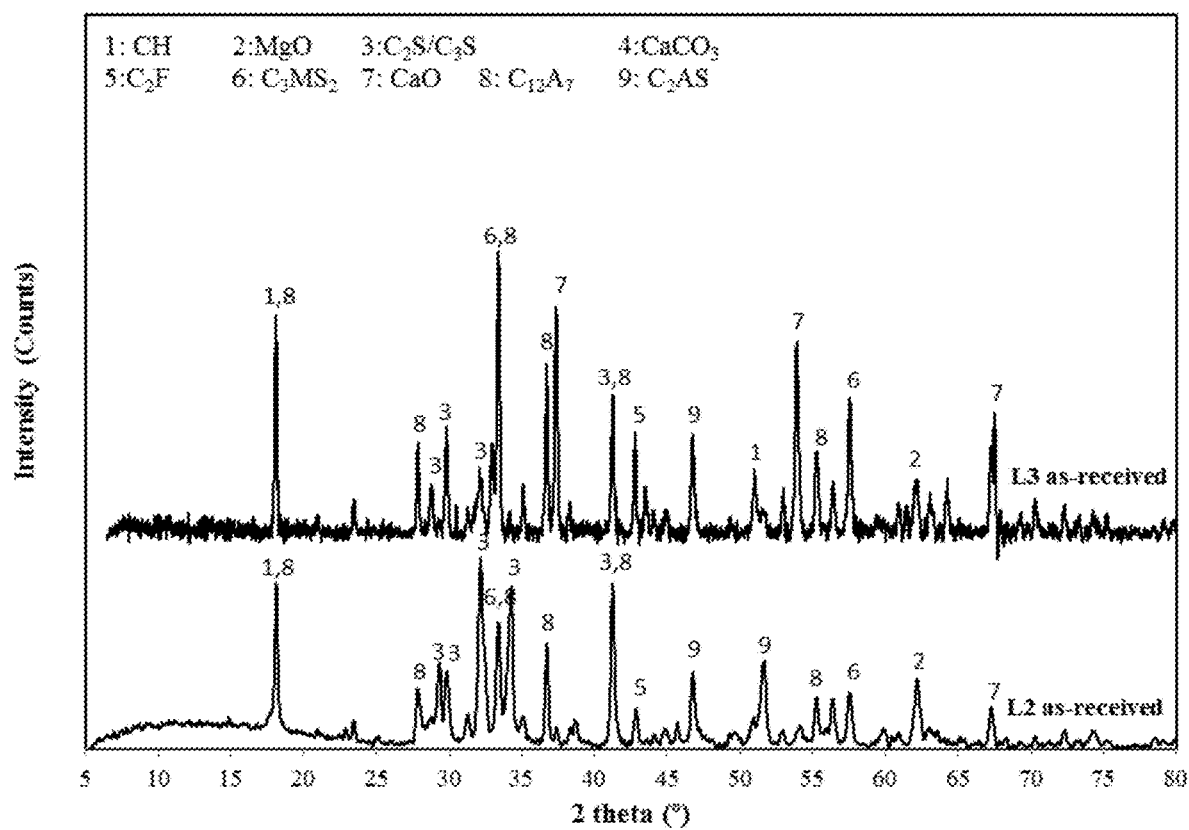
FIG. 14 is a graph showing XRD patterns of as-received ladle slags according to one exemplary embodiment.
Figure 15:
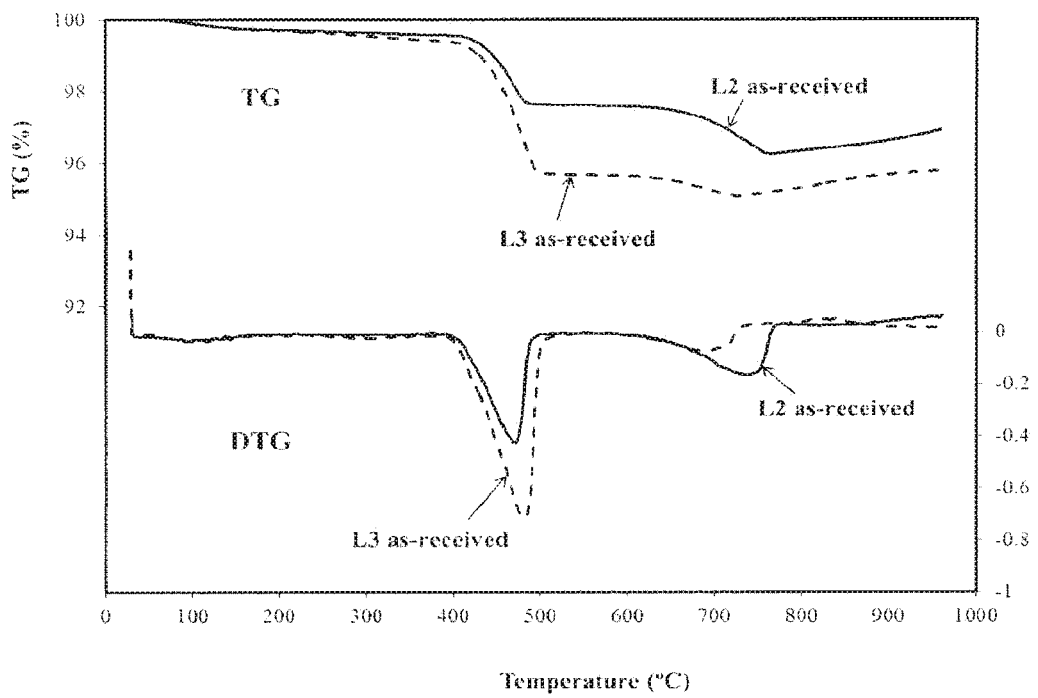
FIG. 15 is a graph showing thermogravimetric analysis and differential thermogravimetric analysis for as-received ladle slags according to one exemplary embodiment.

FIG. 14 shows the XRD patterns of both as-received slags, L2 and L3. The L2 slag with higher Ca and Si content clearly exhibited strong peaks for $C_2S/C_3S$, calcium hydroxide (CH), and much less free lime content. In L2 slag, the major phases included $C_2S/C_3S$ phases, mayenite ($C_{12}A_7$) and minor phases included merwinite ($C_3MS_2$) and gehlenite ($C_2AS$). Calcium-ferrite ($C_2F$) and MgO were found in trace amounts. The L3 slag, on the other hand, revealed the presence of major phases of CH, mayenite ($C_{12}A_7$), merwinite ($C_3MS_2$), free lime (free-CaO) and minor phases of gehlenite ($C_2AS$), $C_2S/C_3S$, and calcium-ferrite ($C_2F$). TG and DTG curves of L2 and L3 are presented in FIG. 15. The occurrence of mass loss between 400-500° C. confirmed the presence of CH in L2 and L3. Mineralogical phases explained why ladle slag L2 was reactive with $CO_2$ producing strength-contribution reaction products and why ladle slag L3 was cracked. It seems that calcium silicate phases played a critical role in strength development. While the $C_2S$ content for both slag samples was virtually identical, the contents for $C_3S$ varied significantly (Table 6). A $C_3S$ content of 31.1% in L2 slag was 9 times higher than the value obtained for L3 slag, where $C_3S$ content was seen to be 3.6%. Although ladle slag generally exhibits higher $C_2S$ content compared to $C_3S$, ladle slag with high $C_3S$ content, like that disclosed herein for the L2 sample, has been previously reported. It is well established that the mineralogical phases of slag are strongly controlled by the temperature in which the slag is produced. The temperature of molten ladle slag was estimated to be about 1500° C. (He et al. 2012); the higher the processing temperature of molten steel slag, the greater the chance to form $C_3S$. Posch et al. (Posch et al. 2002) showed that their ladle slag with a basicity of 2.1 had $C_2S$ and $C_3S$ contents of 9.6% and 24.7%, respectively. L2 slag with high $C_3S$ content displayed promising results pertaining to $CO_2$ reactivity and strength gain by carbonation.

Figure 16:
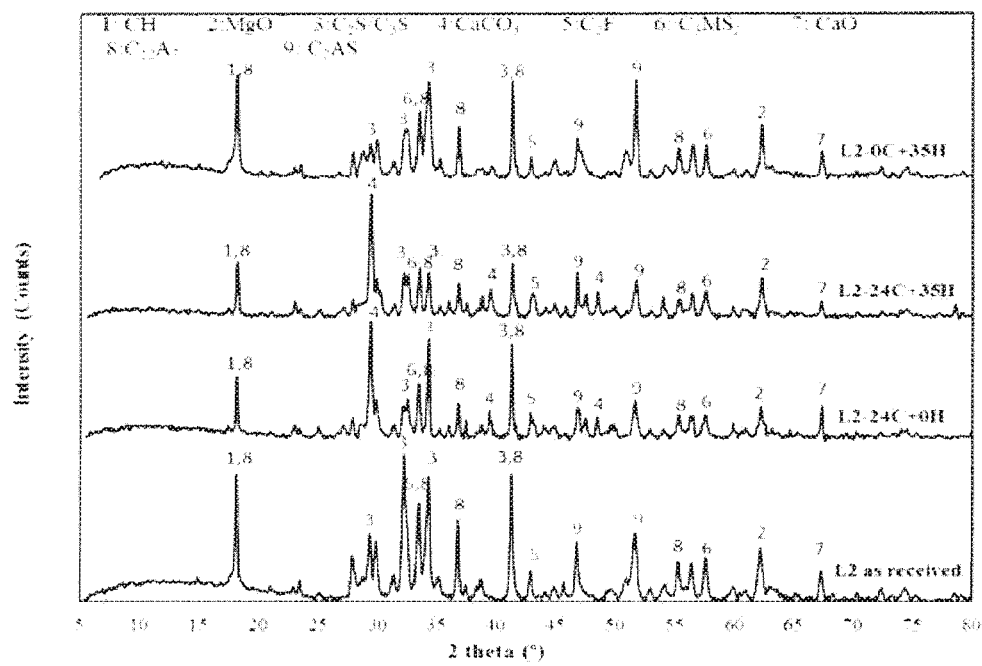
FIG. 16 is a graph showing XRD patterns of carbonated ladle slag compacts according to one exemplary embodiment.

The XRD patterns for ladle slag L2 compacts after 24 h carbonation, after 24 h carbonation followed by 35 day hydration, and after 35 days hydration are plotted in FIG. 16 together with that of the as-received reference slag powder. Comparing the as-received and carbonated slags, it was clear that carbonation resulted in the precipitation of $CaCO_3$ phases, and the simultaneous consumption of the calcium silicate phases and $Ca(OH)_2$ to form carbonation products. Moreover, XRD results suggest that merwinite was not reactive with $CO_2$. Meanwhile, the slight reduction of intensity for the mayenite peaks may indicate the weak reactivity of mayenite with $CO_2$. The reduction of intensity at 2θ of 18° after carbonation was likely due to the consumption of both calcium hydroxide and mayenite. It seems that calcium oxide minerals bonded structurally with elemental components (Mg, Fe or Al), other than silica, displayed low $CO_2$ reactivity in comparison with calcium silicate phases.

Figure 17:
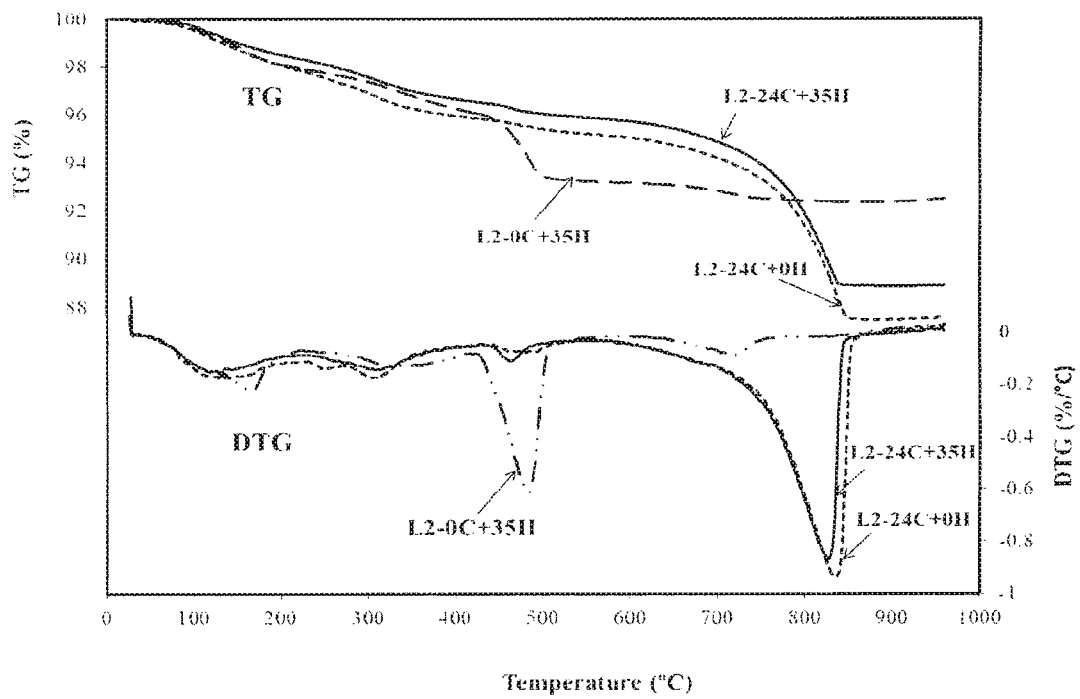
FIG. 17 is a graph showing thermogravimetric analysis and differential thermogravimetric analysis for hydrated and carbonated ladle slag compacts according to one exemplary embodiment.

The reaction products can be determined by TG/DTG analysis. Typical TG and DTG curves for compacts made with L2 slag are plotted in FIG. 17. Based on the DTG peaks, the mass loss can be divided into three regions which were representative of three typical reaction products: 105-400° C., 400-500° C. and 500-900° C. Mass loss between 105-400° C. represented water loss due to dehydration of C—S—H and C-A-H, mass loss between 400-500° C. represented water loss due to dehydration of $Ca(OH)_2$ and mass loss between 500-900° C. represented $CO_2$ loss due to decarbonation of $CaCO_3$. The assumption that mass loss between 105-400° C. was due to dehydration of C—S—H and C-A-H was based on the fact that both calcium silicate and mayenite can be hydrated, generating hydration products. The reaction products are summarized in Table 8. Comparing the hydrated samples to the carbonated samples, the calcium hydroxide content in the carbonated slag was reduced while the calcium carbonate was significantly increased. The formation of C—S-H+C-A-H and CH in the hydrated slag was indicative of slow hydraulic behavior. Although the C—S-H+C-A-H content was similar in the hydrated and carbonated slag compacts, the carbonated slag displayed much higher compressive strength. This improved strength is believed to be attributed to the calcium carbonate formation. The total content of C—S-H+C-A-H plus $CaCO_3$, considered the dual phases contributing to strength gain, was higher in the carbonated slag than in the hydrated one. The 35-day compressive strength was 6 times greater in the carbonated sample than in the hydrated sample. The precipitated calcium carbonate crystals fortify the slag binder in a manner synonymous to a form of particulate-reinforced composite, resulting in a stronger matrix. The peak at the angle of 18° in the XRD pattern shown in FIG. 4-6 was a mix of calcium hydroxide and mayenite. While carbonation apparently consumed both calcium hydroxide and mayenite, the reactivity of mayenite with $CO_2$ is weaker. Slow hydration of mayenite could make a contribution to the formation of calcium-aluminate-hydrate (C-A-H).

TABLE 8

Reaction products in ladle slag (L2) binder

| ID | Age (days) | Water loss in CSH + CAH[a] | Water loss in CH[b] | $CO_2$ loss in $CaCO_3$[c] | $Ca(OH)_2$[b] | $CaCO_3$[c] |
|---|---|---|---|---|---|---|
| L2 as-received, % | — | 0.31 | 1.93 | 1.00 | 7.93 | 2.27 |
| L2-0C + 35H, % | 35 | 3.31 | 2.82 | 1.06 | 11.59 | 2.41 |
| L2-24C + 0H, % | 1 | 3.50 | 0.57 | 7.91 | 2.34 | 17.98 |
| L2-24C + 35H, % | 36 | 3.00 | 0.61 | 7.18 | 2.51 | 16.32 |

[a]Calculated based on mass loss between 105-400° C.
[b]Calculated based on mass loss between 400-500° C.
[c]Calculated based on mass loss between 500-900° C.

Figure 18:
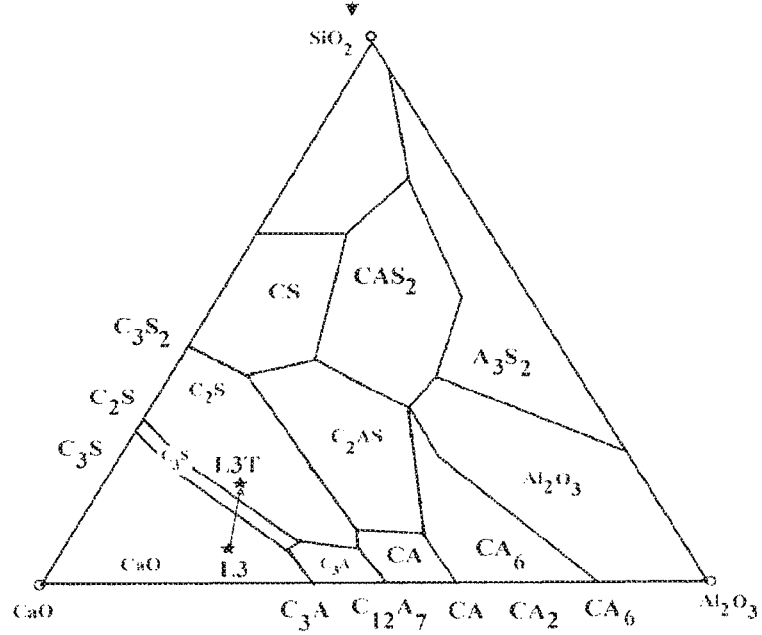
FIG. 18 is a schematic diagram of exemplary primary crystalline phase diagram of the $CaO$—$Al_2O_3$—$SiO_2$.

To improve the carbonation behavior of ladle slag L3, heat treatment was performed. The glass powder was mixed with slag powder in a pulverising machine for 30 seconds. The mixed powder was then compacted in a steel mold under 50 MPa pressure to form prism pellets of 20×20×14 mm. The prism pellet compacts were then placed on refractory trays and carefully positioned inside the furnace. The heat treatment temperature was set at 1100° C. to minimize the energy consumption and maximize the formation of dicalcium silicates. It took about 3.5 hours for the furnace to reach 1100° C. at a rate of 5° C./min. The pellets were held at 1100° C. for 30 minutes and then removed from the furnace immediately for cooling in open air at ambient conditions at a cooling rate of 600° C. per hour with the help of a cooling fan. It took about 2 hours to cool the pellets down to ambient temperature. The pellet compacts were then ground to a powder by using a pulveriser to a Blaine number of 286 kg²/m. The resulting treated ladle slag is referred to herein as L3T (T denoting "treated"). The treated slag powder was then used to make nine slab samples similar to the ones used in the L2 and L3 tests. Six were carbonated for 24 hours. Of the six, three were tested immediately after carbonation for compressive strength and three were tested after subsequent hydration of 35 days. Additionally, three were tested as a hydration reference after being sealed in a plastic bag for 35 days. The chemical composition of the treated ladle slag (L3T) is presented in Table 9. The addition of waste glass increased the SiO2 content from 6.2 to 17.0%, more than double the original content. This addition was administered for the purpose of increasing the high temperature reaction between free-lime and silica for the eventual formation of calcium-silicates. As shown in Table 9, the free lime content dropped to 0.15% from 10.8%, confirming that the devised heat treatment was effective in beneficially combining free lime and silica to produce more dicalcium silicates. With the aid of semi-quantitative XRD analysis, the fractions of the calcium silicate phases in the sample were determined. Compared to the untreated L3 slag material, the $C_2S$ content was increased from 9.3% to 20.3%. As expected, there was no change in the quantity of the $C_3S$ component, since the temperature employed was not sufficient enough to promote the formation of this phase. FIG. 18 shows the location of the normalized compositions of L3 and L3T on the primary crystalline phase diagram of the CaO—$Al_2O_3$—$SiO_2$. The supplementing of silica moved the original makeup of the ladle slag from a highly saturated lime region to a $C_2S$-dominant one, having a characteristically lower basicity value (2.74 compared to the original 9.27). Thermodynamically, this favoured the crystallization of $C_2S$ within the modified slag, thus contributing to a noticeable increase in $CO_2$ reactivity.

TABLE 9

Chemical composition and calcium silicate phases of treated ladle slag

| | Chemical compositions (%) | | | | | | | Free | Phases (%) | |
|---|---|---|---|---|---|---|---|---|---|---|
| ID | CaO | $SiO_2$ | $Al_2O_3$ | $Fe_2O_3$ | MgO | $Na_2O$ | $CO_2$ | lime | $C_2S$ | $C_3S$ |
| L3T | 46.60 | 17.00 | 20.70 | 5.39 | 4.58 | 0.60 | 0.01 | 0.15 | 20.3 | 3.0 |

Carbonation behavior of treated ladle slag L3T was characterized by $CO_2$ uptake from the carbonation reaction. The 127×76×12 mm compacts were subjected to 24 h carbonation curing at a gas pressure of 0.15 MPa. $CO_2$ uptakes recorded by the three different methods were of similar values: 5.3% by mass gain method, 4.0% by mass curve method, and 5.1% by infrared-based $CO_2$ analyzer. A typical mass curve is presented in FIG. 12. The absolute uptake was lower in L3T than L2. Similar to L2, most of the reaction of L3T occurred in the first two hours. It was apparent that heat treatment made the ladle slag L3 $CO_2$-reactive, although the degree of reactivity was only half of that of L2. This was mainly attributed to the relatively higher calcium silicate content ($C_2S+C_3S$=40.6%) in L2 slag compared to 23.3% in the modified L3T slag.

Compressive strength of the modified L3T compacts was evaluated. Results are summarized in Table 10. Hydrated-only specimens exhibited low hydraulic properties, where hydration to 35 days translated to a strength gain of 3.8 MPa. This was only half of the strength developed in L2 slag, possibly due to the low $C_3S$ content of the treated slag. There was no hydration-generated cracking, further confirming the conversion of free lime into calcium silicates. Carbonation curing for 24 hours increased the compressive strength of the treated slag to 25.9 MPa. Undergoing a combined 24 hour carbonation plus 35 day hydration curing raised the strength to 26.7 MPa. Therefore, it appears that the subsequent hydration after carbonation was insignificant. While demonstrating a significant improvement, the modified L3T slag could not achieve as high a compressive strength as that recorded for the L2 slag sample. Likely this could be owing to a lower calcium silicate content in the L3T slag and a lower carbonation reactivity.

TABLE 10

Compressive strength of treated ladle slag compacts

| ID | Type of slag | Carbonation time (h) | $CO_2$ pressure (MPa) | Subsequent hydration (days) | Test age (days) | Compressive strength (MPa) |
|---|---|---|---|---|---|---|
| L3T-0C + 35H | L3T | 0 | — | 35 | 35 | 3.8 ± 0.9 |
| L3T-24C + 0H | L3T | 24 | 0.15 | 0 | 1 | 25.9 ± 4.9 |
| 3L3T-24C + 35H | L3T | 24 | 0.15 | 35 | 36 | 26.7 ± 3.3 |

Figure 19:
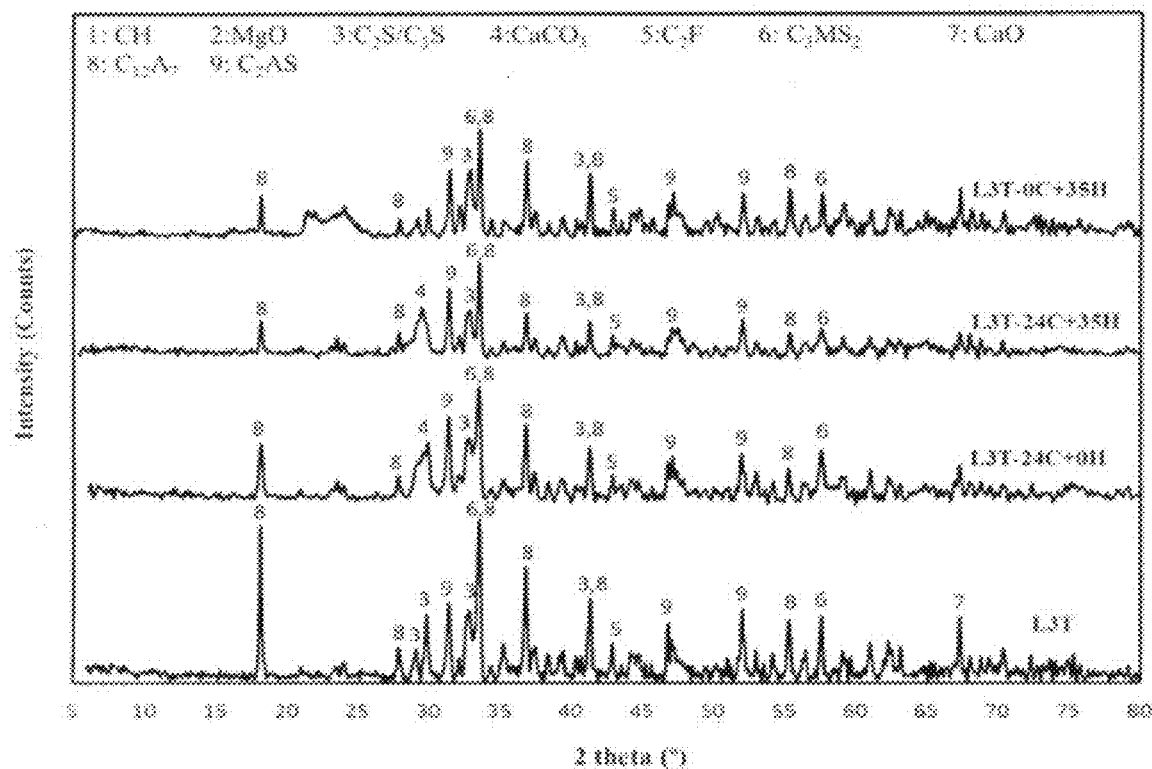
FIG. 19 is a graph showing XRD patterns of treated ladle slag compacts according to one exemplary embodiment.

FIG. 19 shows the XRD patterns for L3T slag after heat treatment, after 24 h carbonation, after 24 h carbonation followed by 35 days hydration and after 35 days hydration. Mayenite and calcium silicates were the major phases identified in the treated slag. Calcium hydroxide was totally eliminated by heat treatment. This was evidenced by the TG curves in FIG. 20. The treated slag also displayed the presence of merwinite, as well as traces of gehlenite and calcium iron oxide. The contents of the calcium silicate phases were estimated using semi-quantitative analysis, and the results are shown in Table 9. The intensity of peaks for mayenite decreased after 35 days hydration, suggesting the formation of calcium aluminate hydrate. Mayenite can be hydrated in the presence of water (Segui et al. 2013). A slight reduction of mayenite intensity after carbonation suggests the reactivity of mayenite with $CO_2$. This phenomenon was also observed for L2. Additionally, gehlenite was non-reactive, as its peak showed no change during carbonation or hydration curing. The presence of the calcium carbonate peak at 2θ angle of 29° demonstrates the carbonation reaction of calcium silicate phases.

Figure 20:
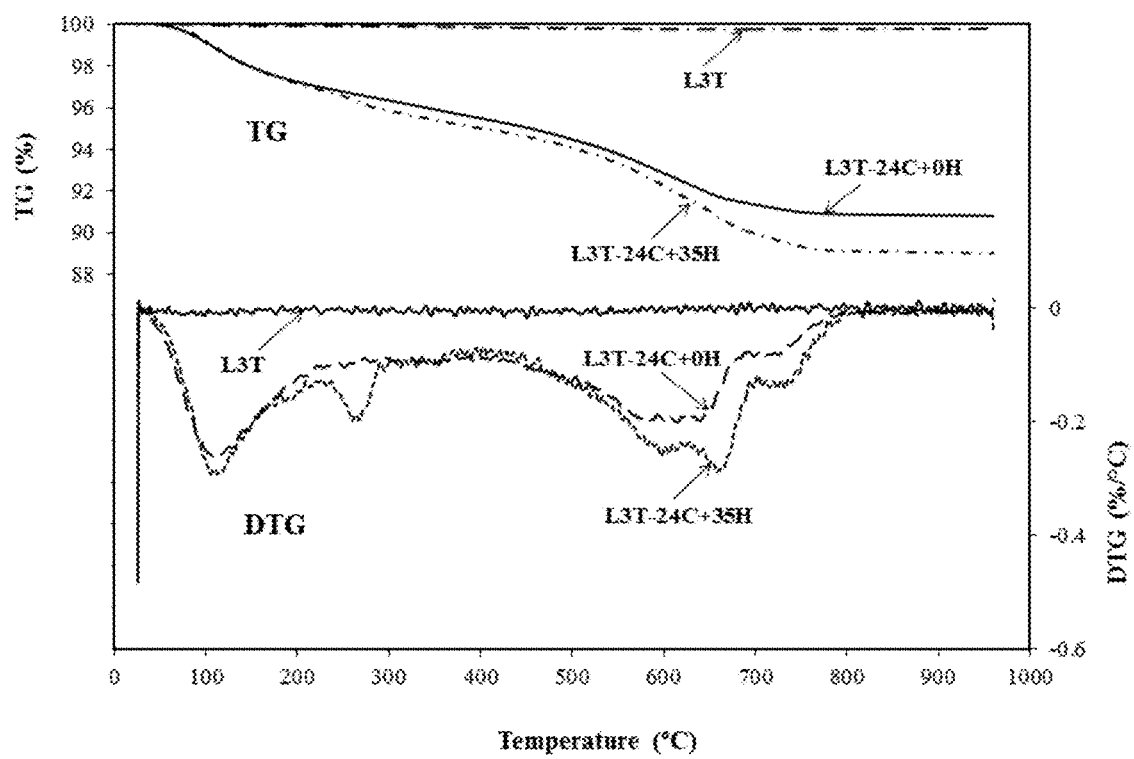
FIG. 20 is a graph showing thermogravimetric analysis and differential thermogravimetric analysis for treated ladle slag according to one exemplary embodiment.

The TG/DTG curves for the treated slag (L3T) subjected to different curing conditions are presented in FIG. 20, and the quantitative results are summarized in Table 11. The TG/DTG curves for treated slag were flat, confirming the elimination of calcium hydroxide during the treatment. The water loss between 105-400° C., representing the C—S—H+C-A-H content of the sample, tested immediately after carbonation showed an increase. Carbonation activation also increased the calcium carbonate content, as expected. The presence of more calcium carbonate particles within the hydrated phases (C—S—H and C-A-H) helped fortify the resulting composite structure. The extent of strength gain can therefore be gauged by the amount of $CaCO_3$ precipitation. The co-existence of calcium carbonates with the hydrated phases can considerably strengthen this composite matrix system.

In this study, the carbonation behavior of two typical ladle slags was investigated for their capacities to serve as cementing binder in building product applications. They were representative of two groups of slag: one can be carbonation-activated in its as-received form and one needs heat treatment with silica addition. Some conclusions that can be drawn are:

1. Ladle slag with higher $SiO_2$ content and lower free lime showed stronger carbonation reactivity. The as-received slag could be activated by carbon dioxide to develop sufficient strength for building product applications. The high carbonation reactivity was attributed to the presence of calcium silicate phases. It is recommended that silica be considered as deoxidization agent instead of alumina during the production of steel in order to produce more calcium silicates in ladle slag and reduce the free lime content, leading to a more $CO_2$-reactive slag for value-added applications.

2. Ladle slag with higher aluminate content or higher free lime content could not be activated by carbon dioxide to develop strength. Heat treatment at 1100° C. with silica addition was effective to produce more dicalcium silicate phases and improve carbonation reactivity. The heat treatment and addition of silica can be accomplished when slag is still in the molten stage to produce value-added ladle slag.

3. The ultimate strength of the ladle slag activated by carbonation was attributed to the hybrid structure of carbonation and hydration products. The calcium carbonate precipitations fortified the amorphous C—S-H+C-A-H matrix by forming a particulate reinforced composite.

4. It was the $C_2S$ and $C_3S$ phases, not the total CaO content, that determined the carbonation reactivity of ladle slag. The calcium-bearing phases such as merwinite and gehlenite were not $CO_2$-reactive and did not make contributions to the strength by carbon activation.

Example 4: Treatment of Slag with Glass to Make Synthesized Cement

The ladle slag was the by-product from the steel making process at Quebec Rio Tinto Iron & Titanium (RTIT) plant.

TABLE 11

Reaction products in treated ladle slag (L3T) binder

| ID | Age (days) | Water loss in CSH + CAH[a] | Water loss in CH[b] | $CO_2$ loss in $CaCO_3$[c] | $Ca(OH)_2$[b] | $CaCO_3$[c] |
|---|---|---|---|---|---|---|
| L3T, % | — | 0.11 | 0.05 | 0.02 | 0.21 | 0.05 |
| L3T-0C + 35H, % | 35 | 1.56 | 1.00 | 0.73 | 4.12 | 1.65 |
| L3T-24C + 0H, % | 1 | 3.49 | 1.02 | 3.64 | 4.19 | 8.27 |
| L3T-24C + 35H, % | 36 | 4.04 | 0.93 | 5.03 | 3.82 | 11.43 |

[a]Calculated based on the mass lost at 105-400° C.
[b]Calculated based on the mass lost at 400-500° C.
[c]Calculated based on the mass lost at 500-900° C.

Because of the slow cooling, ladle slag was produced as powder which was then packed into porous "cakes" for shipping and handling. The as-received dry ladle slag "cakes" were first crushed and then further pulverized into powder with Blaine number of 247 m$^2$/kg.

Waste glass was collected from the recycling of fluorescent lamps. They were crushed and ground to a Blaine number of 600 m$^2$/kg and used as the source of silica for synthesizing cement. The chemical composition of ladle slag and waste glass materials were determined by XRF, and the results are presented in Table 12. Ladle slag showed 57% of CaO and waste glass had 70% of $SiO_2$. Free lime content of as-received ladle slag is 10.8% which is determined by the Franke method in accordance with ASTM C114. A semi-quantitative XRD analysis of the calcium silicate content, i.e. $C_2S$ and $C_3S$, of the ladle slag was performed to determine the quantity of $C_2S$ and $C_3S$ in the original slag. A 2-point calibration method was used to compare the peak heights in the mixture of ladle slag and $TiO_2$ (90% slag+10% $TiO_2$) to those of pure $C_2S$ (100% $C_2S$), pure $C_3S$ (100% $C_3S$) and pure $TiO_2$ (100% $TiO_2$) (Chung 1974). The slag contained 9.3% $C_2S$ and 3.6% $C_3S$.

TABLE 12

Chemical composition and phases of as-received materials

| | Chemical compositions (%) | | | | | | | | Phases (%) | |
| --- | --- | --- | --- | --- | --- | --- | --- | --- | --- | --- |
| | CaO | $SiO_2$ | $Al_2O_3$ | $Fe_2O_3$ | MgO | $K_2O$ | $Na_2O$ | Free lime | $C_2S$ | $C_3S$ |
| Ladle slag (L3) | 57.55 | 6.21 | 23.17 | 3.55 | 5.04 | 0.02 | 0.16 | 10.8 | 9.3 | 3.6 |
| Waste glass | 4.89 | 70.68 | 1.62 | 0.22 | 3.08 | 0.48 | 16.06 | — | — | — |

Different batches were prepared where waste glass was added to the slag at varied weight percentage and mixed individually in a pulverising machine for 30 seconds. The mixed power was then compacted into 20×20×20 mm cubic clinkers in a steel mold under 50 MPa pressure. The cubic clinkers were seated on refractory plates that were then placed in a high temperature furnace. The temperature of the furnace was increased to the desired temperature at a rate of 5° C./min. When the desired temperature was reached, it was kept constant for 30 minutes, after which the clinkers were extracted and rapidly cooled by facing an air draft generated by a mechanical fan for 2 hours. The cooled cubic clinkers were then ground to a powder with a Blaine number of 286 m$^2$/kg by pulverizing for 2 minutes.

Hydraulic behaviour of synthesized cement and its $CO_2$ reactivity relies strongly on the chemical composition of the raw materials and the synthesizing temperature. A comprehensive parametric study was conducted to optimize the process.

To determine the optimal glass-to-slag ratio, the mixtures with 10, 20, and 30 weight percent waste glass were studied. The clinkers with different glass-to-slag ratios were then heated up to a constant temperature of 1250° C. The synthesized cement was shaped into 20×20×12 mm prism compacts and activated by carbonation for 24 hours at a gas pressure of 0.15 MPa. The optimal glass-to-slag ratio was chosen based on the compressive strength by carbonation.

To further optimize energy consumption, different synthesizing temperatures, all below 1250° C., were tested. Clinkers were prepared using the optimized glass-to-slag ratio and synthesized at different temperatures of 700° C., 800° C., 1100° C. and 1200° C. Cement was synthesized from each of the clinkers.

For performance evaluation of the synthesized cement produced from the clinkers heated at the different temperatures, cement prism compacts of dimensions of 20×20×12 mm were prepared. The thickness of 12 mm was selected to simulate fiber-cement board products. For each prism sample, 10 g of synthesized cement was mixed with 1 g water (water/cement=0.1). They were compact-formed under a pressure of 12.5 MPa. These prism cement pastes were activated by carbonation for 2 hours at 0.15 MPa. After carbonation, half of the specimens were tested immediately for compression strength and half of the specimens were sealed for subsequent hydration. Combined curing included a constant carbonation followed by subsequent hydration for durations of 3, 14, and 35 days. This would help assess the effect of subsequent hydration on the characteristics of carbonated cement. Reference samples were also made and sealed in a plastic container for hydration of 35 days. To highlight the effectiveness of the proposed synthesizing process, prisms prepared from as-received slag were also subjected to the same carbonation and hydration curing conditions.

The values of carbon dioxide uptake and compressive strength recorded for synthesized cement at different percentage of waste glass are presented in Table 13. Addition of 10 to 20% waste glass yields a compressive strength up to 36 MPa after 24 hours carbonation with a $CO_2$ uptake at about 9.6%. A further increase of waste glass content to 30% resulted in a decrease in both strength and carbon dioxide uptake. For this reason, the optimal percentage of glass-to-slag ratio was selected as 20%. This parametric study was conducted while synthesis was carried out at a fixed temperature of 1250° C. Table 14 presents $CO_2$ uptake and compressive strength results for cements prepared using 20% glass-to-slag ratio and synthesized at different temperatures ranging from 700 to 1200° C. While temperature increase had no significant effect on carbon dioxide uptake, it had a significant effect on compressive strength. The higher the synthesizing temperature, the higher the compressive strength. In Table 14, the strength was gained by carbonation activation of 2 hours. In comparison to 24 hours in Table 13, a shorter process time was economically beneficial. The strength gain by 2 h carbonation was comparable to 24 h carbonation if the cements were processed at about 1200° C. The choice of temperature was to yield the optimized conditions that successfully address practicality, equivalent alkalinity, free lime content, strength, energy consumption and environmental implications. Taking into consideration these parameters leads to the conclusion that the synthesizing temperature of 1100° C. with glass-to-slag ratio of 20% resulted in suitable cement for carbonation activation with relatively low energy consumption.

TABLE 13

Results of cement synthesised at different percentage of waste glass

| ID | WTL1 | WTL2 | WTL3 |
|---|---|---|---|
| Waste glass content (%) | 10 | 20 | 30 |
| Synthesizing temperature (° C.) | 1250 | 1250 | 1250 |
| Carbonation time (h) | 24 | 24 | 24 |
| $CO_2$ uptake (%) | 9.6 ± 0.7 | 9.7 ± 0.5 | 3.1 ± 0.3 |
| Compressive strength (MPa) | 36.0 ± 19.2 | 36.7 ± 13.8 | 13.1 ± 0.4 |

TABLE 14

Results of cement synthesized at different temperature

| ID | WTL4 | WTL5 | WTL6 | WTL7 |
|---|---|---|---|---|
| Waste glass content (%) | 20 | 20 | 20 | 20 |
| Synthesizing temperature (° C.) | 700 | 800 | 1100 | 1200 |
| Carbonation time (h) | 2 | 2 | 2 | 2 |
| $CO_2$ uptake (%) | 5.8 ± 1.9 | 8.1 ± 0.0 | 5.0 ± 0.3 | 6.6 ± 0.7 |
| Compressive strength (MPa) | 15.6 ± 1.1 | 25.6 ± 1.6 | 32.7 ± 4.4 | 34.4 ± 1.3 |

Table 15 shows the chemical composition of ladle slag synthesized with 20 wt % waste glass at 1100° C. The equivalent alkali of synthesized cement was calculated as 0.7%; slightly higher than the value of 0.6% suggested by ASTM C150. The high sodium oxide content of waste glass made a contribution to the high alkalinity level of synthesized cement. Despite the high alkalinity level, the alkali-silicate reaction cannot be initiated as carbonation mitigates the potential of reaction. The fineness of synthesized cement was measured as 286 m²/kg. Waste glass is high in silica content, and its addition to ladle slag increases the overall content of silica, and also reduces the overall fractions of CaO and $Al_2O_3$ contents in the synthesized cement. This modification shifts the composition of the material in the primary crystalline phase diagram of the CaO—$Al_2O_3$—$SiO_2$, as shown in FIG. 18. The intentional shift was effective in reducing the free lime content from 10.8% in the as-received slag to 0.15% in synthesized cement, suggesting that free lime reacted with the added silica to promote the formation of the desired calcium silicate phases. As a result, free lime content was significantly reduced and $C_2S$ content increased.

and free calcium oxide phases were reduced, suggesting a reaction with the supplemented silica to form calcium silicate-based phases. The results of the free lime content obtained in accordance with the Franklin method confirmed the above observation. Calcium silicate phases ($C_2S/C_3S$) are believed to be the main phases that lend cementitious materials their hydraulic behaviour and $CO_2$ reactivity (Rostami et al. 2011). The calcium silicate content of as-received slag and synthesized cement was quantified through the QXRD analysis. As shown in Table 15, the $C_2S$ content of slag synthesized with waste glass increased from 9.2% to 18.3% while the $C_3S$ content did not significantly change. An increase in the $C_2S$ content further confirms the synthesizing process was successful in combining free lime with silica in glass to form calcium silicate phases. $C_3S$ formation was not expected, since reactions associated with this phase require higher temperatures (Taylor 1997). It is believed that implementing a higher temperature could result in the formation of $C_3S$, however, it may not be justifiable from an economic and practical point of view. For the purpose of energy conservation, the temperature of 1100° C. was adopted for this study.

Figure 22:
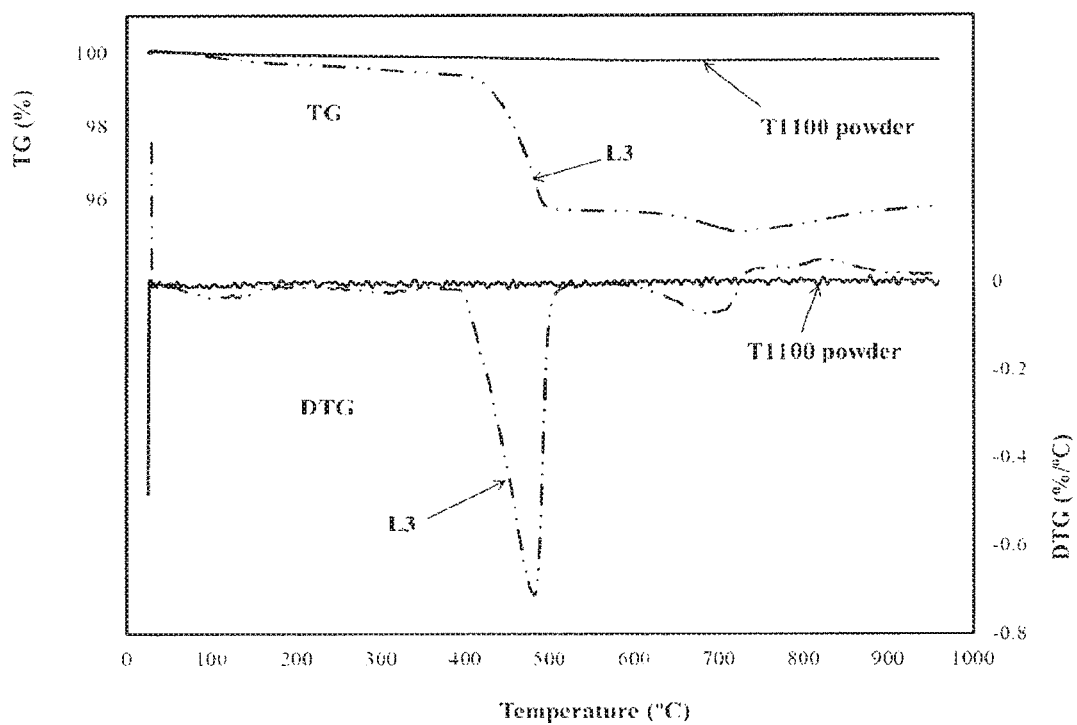
FIG. 22 is a graph showing thermogravimetric analysis and differential thermogravimetric analysis of as-received slag (L3) and synthesized cement (T1100) according to one exemplary embodiment.

FIG. 22 shows the TG/DTG curves of as-received slag and the synthesized cement. For as-received slag, a peak in the DTG curve between 450° C. and 550° C. suggests the presence of CH as was noticed in the XRD pattern. No mass loss was recorded for this synthesized, non-carbonated cement, suggesting that neither carbonates nor calcium silicate hydrate phases were present in cement. The existing calcium hydroxide in L3 was eliminated during the synthesizing process as it was decomposed at the temperature of 500° C.

Figure 23:
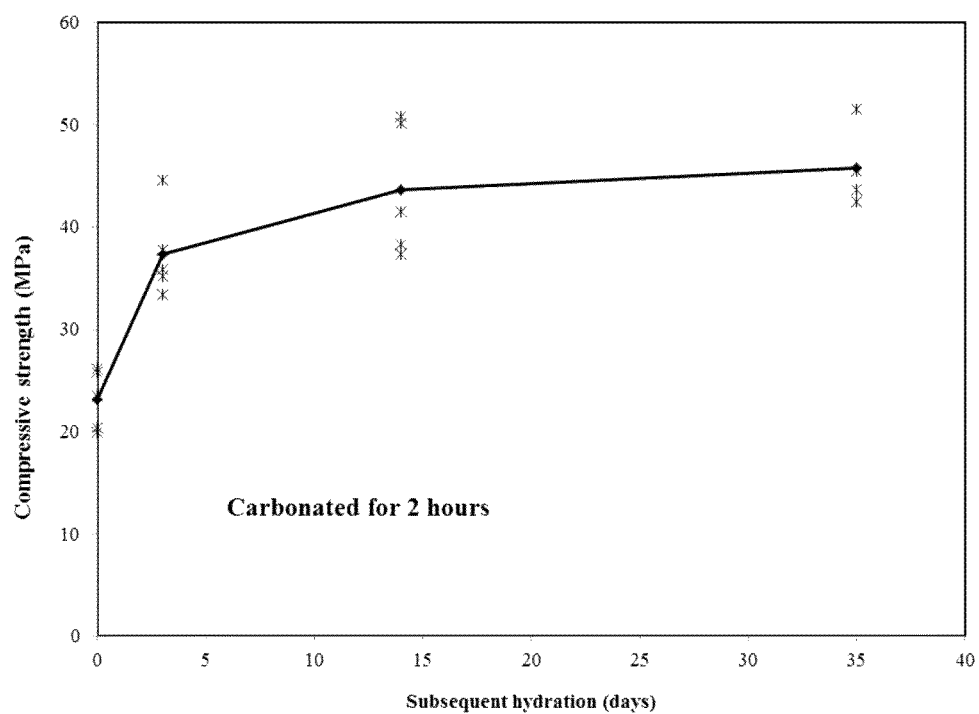
FIG. 23 is a graph showing compressive strength of synthesized cement pastes subjected to hydration according to one exemplary embodiment.

The results of compressive strength and carbon dioxide uptake of pastes prepared from as-received ladle slag and synthesized cement, subject to various curing regimes, are presented in Table 16. The results of the synthesized cement are also shown in Table 16. The synthesis process made non-hydraulic material show hydration behaviour. The compressive strength of 35 days of hydrated cement paste (T1100-1) had exhibited a measurable strength gain of 9.1 MPa after 35 days hydration alone. This was indicative of the formation of calcium silicates during the synthesis process. When exposed to carbonation curing, the cement displayed rapid strength gain. The compressive strength of cement pastes increased immediately after 2 hours of carbonation, reaching 23.1 MPa. As shown in FIG. 23, subse-

TABLE 15

Chemical composition of synthesized cement (%)

| | Chemical compositions (%) | | | | | | | | Phases (%) | |
|---|---|---|---|---|---|---|---|---|---|---|
| | CaO | $SiO_2$ | $Al_2O_3$ | $Fe_2O_3$ | MgO | $K_2O$ | $Na_2O$ | Free lime | $C_2S$ | $C_3S$ |
| T1100 (L3T) | 46.60 | 17.00 | 20.70 | 5.39 | 4.58 | 0.20 | 0.60 | 0.15 | 18.2 | 1.4 |

Figure 21:
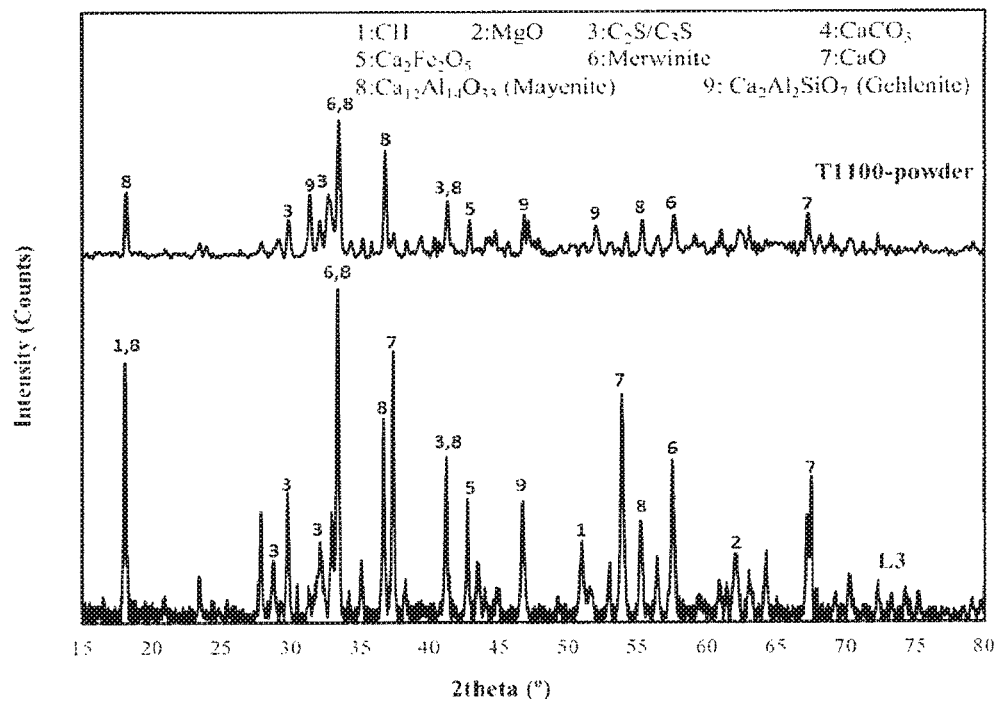
FIG. 21 is a graph showing XRD patterns of as-received slag and synthesized cement according to one exemplary embodiment.

The XRD patterns of as-received slag and the synthesized cement are illustrated in FIG. 21. It can be seen that the as-received slag consisted primarily of free-lime and mayenite, a calcium-aluminate phase. Other phases identified were in trace amounts, including gehlenite, calcium silicate (s), and calcium hydroxide. Mayenite remained as one of the major constituent phases even after the synthesising process with glass was completed. Other studies have also related similar findings with regards to mayenite presence (Uibu et al. 2011). Meanwhile, peak intensities of calcium hydroxide quent hydration of carbonated cements made further contributions to strength gain. The compressive strength of carbonated cement pastes after 3, 14 and 35 days of subsequent hydration achieved 37.3, 43.6 and 45.7 MPa, respectively. Carbonation seemed to intensify the hydraulic properties of the synthesized cement. It is believed this phenomenon occurred as more mayenite was accessible for hydration after the bonded $C_2S$ was consumed over the carbonation period. Samples carbonated for 2 hours and followed by 35 days hydration (T1100-5) showed a peak at 247° C. in the DTG curve (FIG. 24) suggesting the formation of calcium aluminate hydration; this peak cannot be observed in the hydrated sample (T1100-1). As presented in Table 16, the $CO_2$ uptake of carbonated cements determined based on the mass gain method after 2 hours carbonation was less than 5%. Despite the low carbon dioxide uptake, the strength gain was quite significant. It is believed that the precipitated calcium carbonate crystals fortify the hydration products in a manner synonymous to a form of particulate composite. The dispersion of the relatively more resilient carbonates within the C—S—H+C-A-H phase enhanced the composite's microstructure and lent the composite paste better mechanical properties. As an analogy, one may compare the C—S—H/C-A-H—CC system with the cement paste-aggregate or concrete-fiber systems where the dispersed aggregate or fiber in the cement paste or concrete make a composite system with a high strength.

increased mass loss experienced by cements subject to subsequent hydration was indicative of the increase in C—S-H+C-A-H formation due to hydration. The other evidence of hydration was seen by the increase in $Ca(OH)_2$ in carbonated cements. Relatively hydrated cement had shown the lowest $Ca(OH)_2$ which explained the low hydration strength after 35 days of hydration. Although the increase in C—S—H+C-A-H content in subsequent hydration was not proportional to the curing time, the cement after 2 h carbonation and 35 days hydration was much stronger than the cement after 35 days hydration (45.7 MPa versus 9.1 MPa), suggesting the composite action by the simultaneous formation of C—S—H+C-A-H and $CaCO_3$ phases. It was obvious that carbonation had promoted subsequent hydration which was possibly attributed to the calcium carbonates produced by carbonation. The carbonates may act as calcite seeds for subsequent hydration.

TABLE 16

Carbonation and hydration of synthesized cement pastes

| ID | Type of slag | Carbonation (h) | Hydration (days) | CO2 uptake (%) | Compressive strength (MPa) |
|---|---|---|---|---|---|
| L3-24C + 0H | As-received | 24 | 0 | — | Cracked |
| L3-0C + 35H | As-received | 0 | 35 | — | Cracked |
| T1100-1 | Treated | 0 | 35 | — | 9.1 ± 0.5 |
| T1100-2 | Treated | 2 | 0 | 4.0 ± 0.2 | 23.1 ± 2.9 |
| T1100-3 | Treated | 2 | 3 | 4.7 ± 0.3 | 37.3 ± 4.4 |
| T1100-4 | Treated | 2 | 14 | 4.8 ± 0.2 | 43.6 ± 6.4 |
| T1100-5 | Treated | 2 | 35 | 4.8 ± 0.1 | 45.7 ± 4.0 |

Figure 24:
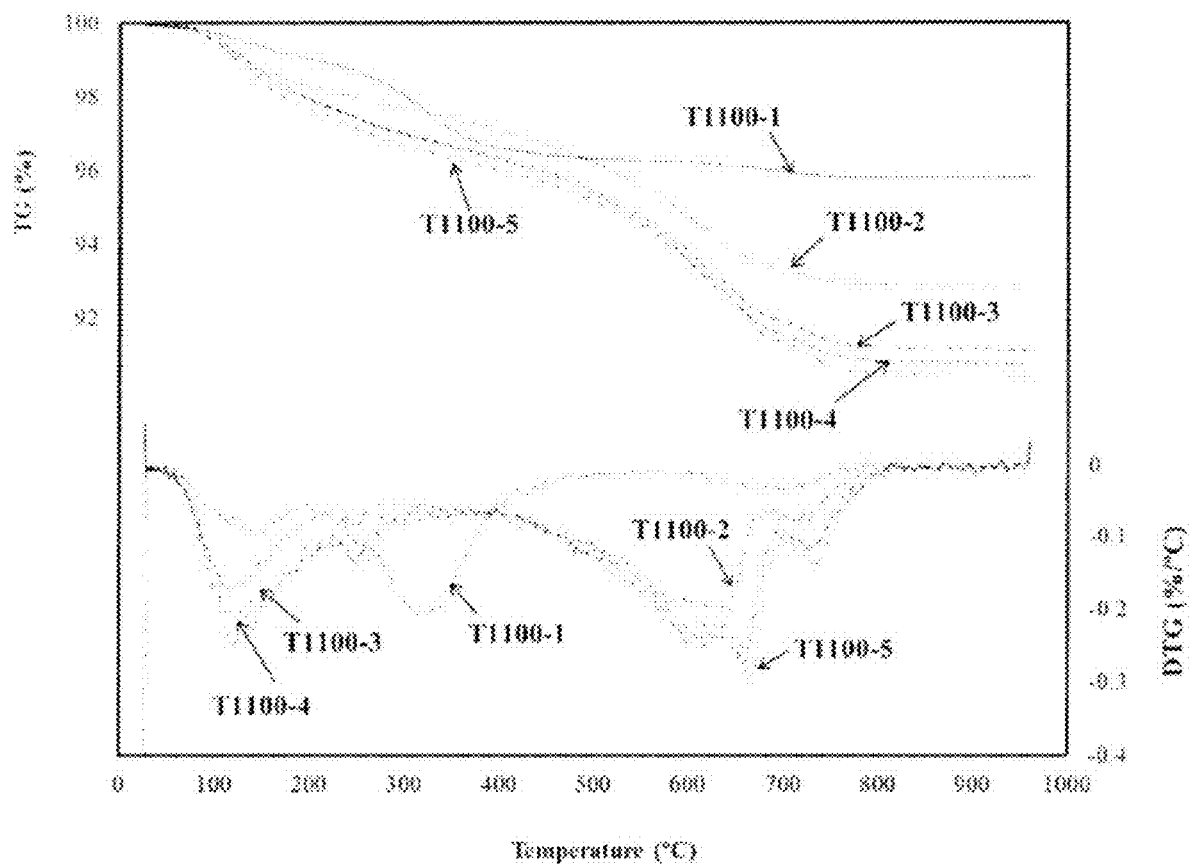
FIG. 24 is a graph showing thermogravimetric analysis and differential thermogravimetric analysis of synthesized cement pastes subjected to carbonation and hydration according to one exemplary embodiment.

24C = 24 hours of carbonation
0C = No carbonation
35H = 35 days of hydration
0H = No hydration FIG. 24 illustrates the TG and DTG curves of carbonated/hydrated samples made with the synthesized cement. The mass loss experienced above 550° C. was considered for calculating the $CO_2$ uptake. As presented in Table 17, the values of $CO_2$ uptake after 2 hour carbonation (T1100-2) obtained from the TG curves were in the same order of magnitude as those determined by the mass gain method in Table 15. As expected, no mass loss was observed for the hydrated sample (T1100-1) after 550° C., indicating the absence of carbonate. The water loss of calcium silicate hydrate and calcium aluminate hydrate of cured cements was measured based on mass loss between 105° C. and 450° C., and showed an increase with an increase in the hydration time. The DTG curves of carbonated cements that were subsequently hydrated for 3, 14 and 35 days constantly showed an increase in intensity of the peaks in FIG. 24 with respect to the carbonation without hydration (T1100-2). This

TABLE 17

Reaction products of carbonated and hydrated synthesized cement pastes

| Sample | Age (days) | Water loss of CAH + CSH | Water loss of CH | CO₂ loss (%) | Ca(OH)₂ (%)* | CaCO₃ content (%)** |
|---|---|---|---|---|---|---|
| T1100-1 | 35 | 3.30 | 0.15 | 0.5 | 0.62 | 1.02 |
| T1100-2 | 2 hours | 2.76 | 1.13 | 2.7 | 4.65 | 6.11 |
| T1100-3 | 3 | 3.42 | 1.24 | 3.6 | 5.10 | 8.14 |
| T1100-4 | 14 | 3.64 | 1.30 | 3.8 | 5.34 | 8.66 |
| T1100-5 | 35 | 3.76 | 1.17 | 4.0 | 4.81 | 9.16 |

*Calculated based on the mass lost at 450-550° C.
**Calculated based on the mass lost at 550-850° C.

Figure 25:
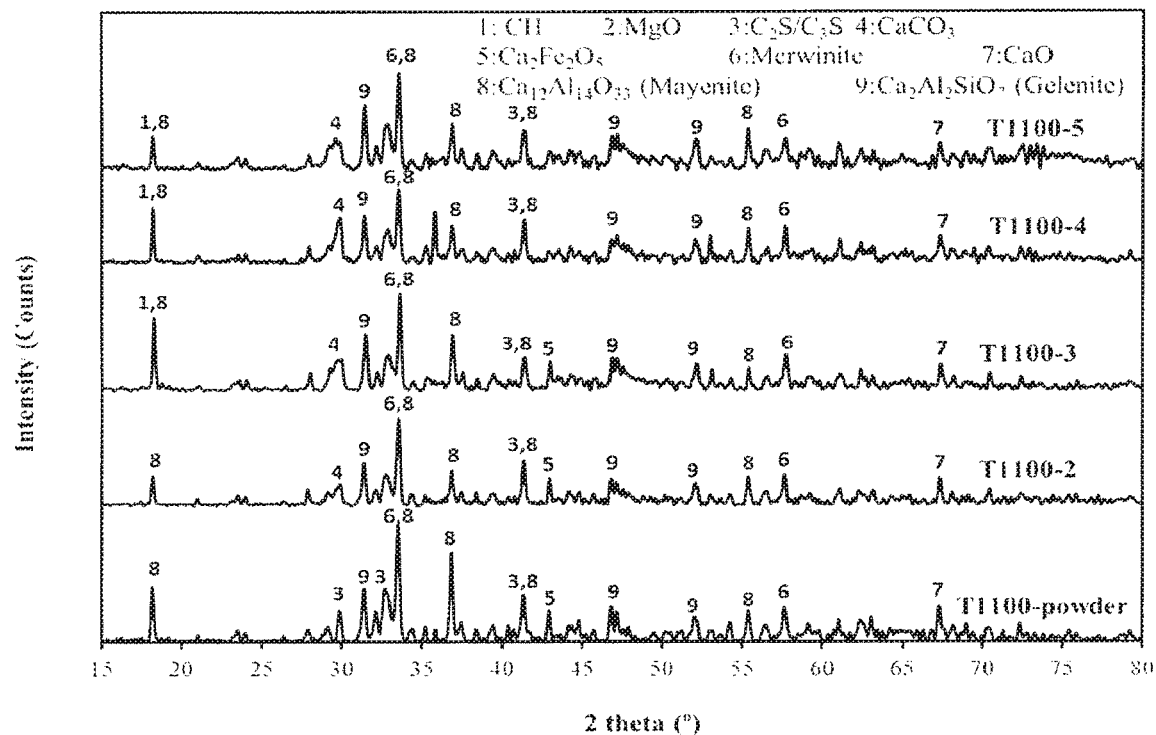
FIG. 25 is a graph showing XRD patterns of synthesized cement pastes subjected to carbonation and hydration according to one exemplary embodiment.

FIG. 25 shows the XRD patterns of synthesized cement that had experienced different curing regimes. It is noticeable that peaks of calcium carbonate appeared in the carbonated cements, as precipitation of this phase occurred from the reaction of $CO_2$ with the calcium silicate phases. By comparing the patterns of non-carbonated and carbonated samples, one may conclude that gehlenite did not react with $CO_2$ and did not contribute to strength gain. Meanwhile, a slight reduction in mayenite peaks indicates its potential reactivity with $CO_2$. The XRD patterns of hydrated and carbonated synthesized cement also revealed a slight reduction in mayenite intensity over the period of 35 days hydration, suggesting the hydration of mayenite which resulted in formation of C-A-H.

The results of this study show that waste glass can be used as source of silica to promote the formation of calcium silicate phases, enhance carbonation reactivity and induce considerable hydration strength gain.

The synthesized cement displayed strength development when subject to carbonation, hydration, or a combination of both. The best practice with this special cement is carbonation first for early strength and hydration second for late strength. The combination of 80% of ladle slag fines with 20% waste glass synthesized at 1100° C. resulted in a stable cement capable of gaining strength when subjected to carbonation and hydration curing. Using waste glass as the additive could convert a non-reactive ladle slag into a value-added binder product. The results also suggested that carbonation curing promoted the strength gain associated with subsequent hydration. The composite action generated by calcium carbonate in a C—S—H—C-A-H matrix eventually played an important role in gaining strength.

Example 5: Treatment of Slag with Fly Ash to Make Synthesized Cement

The ladle slag is the same as used with the glass of example 4. The as-received dry ladle slag "cakes" were first crushed and then further pulverized into powder with a Blaine number of 247 $m^2$/kg. Type F fly ash with a Blaine number of 438 $m^2$/kg sourced from Alberta, Canada was introduced to ladle slag as a source of silica oxide. The chemical composition of ladle slag and fly ash materials were all obtained by XRF, and the results are presented in Table 18. Ladle slag has shown 57% of CaO and fly ash has 54% of $SiO_2$.

Hydraulic behaviour of synthesized cement and its $CO_2$ reactivity relies strongly on the chemical composition of the raw materials and the synthesizing temperature. For this reason, a comprehensive parametric study was conducted to optimize the process.

To determine the optimal fly ash, a few trial batches of cement were produced by introducing fly ash to ladle slag at 20, 30, 40 and 50% of ladle slag weight. After preparing the clinker pallets from each mix, they were then heated up to 1250° C. In the next step, 20×20×12 mm specimens made with produced cement were activated with $CO_2$. This process was done by carbonating the specimens for 24 hours at a pressure of 0.15 MPa in the carbonation chamber. The optimum percentage of fly ash was chosen based on the compressive strength criteria (strength measured immediately after carbonation).

To determine the optimal clinkering temperature, the mix of ladle slag and fly ash was synthesized at various temperatures, including 800° C., 900° C., 1000° C., 1100° C., 1200° C., and 1250° C. The mixes were prepared using the optimal fly ash percentage (30%). The mechanical and chemical properties of samples made with the produced cement were examined after being subjected to carbonation. Ultimately, the final processing route chosen was one that ensured optimum compressive strength, carbon dioxide uptake, minimum free lime content and controlled alkalinity level.

A $CO_2$ gas with a purity of 99.5% was used for carbonation of the steel slag. The $CO_2$ gas was warmed to ambient temperature and injected into the chamber to a pressure of 0.15 MPa. A regulator was used to maintain a constant pressure and ensure that the carbon dioxide consumed by the specimen was continually replenished.

After determining the optimal fly ash percent and clinkering temperature, cement was produced in larger quanti-

TABLE 18

Chemical composition of raw materials and produced cement

| | Chemical composition (%) | | | | | | | | Phases (%) | | |
| --- | --- | --- | --- | --- | --- | --- | --- | --- | --- | --- | --- |
| | CaO | $SiO_2$ | $Al_2O_3$ | $Fe_2O_3$ | MgO | $K_2O$ | $Na_2O$ | *$Na_2O^e$ | Free lime | $C_2S$ | $C_3S$ |
| Ladle slag (L3) | 57.55 | 6.21 | 23.17 | 3.55 | 5.04 | 0.02 | 0.16 | 0.17 | 10.8 | 9.3 | 3.6 |
| Fly ash | 11.3 | 54.39 | 23.65 | 3.9 | 1.17 | 0.75 | 2.91 | 3.42 | — | — | — |
| Treated ladle slag (F1250) | 42.99 | 16.92 | 25.26 | 6.51 | 4.22 | 0.03 | 0.22 | 0.24 | 0.11 | 13.5 | 1.9 |

*$Na_2O^e$ = $Na_2O$ + 0.658 × $K_2O$

Cement was synthesized according to the following steps. Fly ash was added to the slag at variable weight percentages and mixed individually in a pulverising machine for 30 seconds. The mixed power was then compacted in a 20×20×20 mm steel mold under 50 MPa pressure. The pellets were seated on refractory plates that were then placed in a high temperature furnace. The temperature of furnace was then increased to the desired temperature at a rate of 5° C./min. When the desired temperature was reached, the furnace was maintained at that temperature for 30 minutes. After heating, the compacted samples were removed from the furnace immediately for cooling in open air at ambient conditions at the cooling rate of 600° C. per hour with the help of a cooling fan. The cooled cubic clinkers were then ground to a powder with a Blaine number of 202 $m^2$/kg by pulverizing for 2 minutes.

ties for bulk assessment. Specimens with dimensions of 20×20×12 mm were prepared from the synthesized cement. For each prism sample, 10 g cement and 1 g water (water/slag=0.10) were mixed and compacted under a pressure of 12.5 MPa applied to the steel mold by a punch. These samples were subjected to carbonation for 2 hours at 0.15 MPa. Next, the combined effect of both carbonation and hydration was examined for maximum strength gain. Combined curing included a constant carbonation step followed by subsequent hydration for durations of 0, 3, 14, and 35 days. Non-carbonated reference samples were left to simply hydrate for 35 days in sealed conditions. This would help assess the effect of subsequent hydration on the characteristics of carbonated samples.

Figure 26:
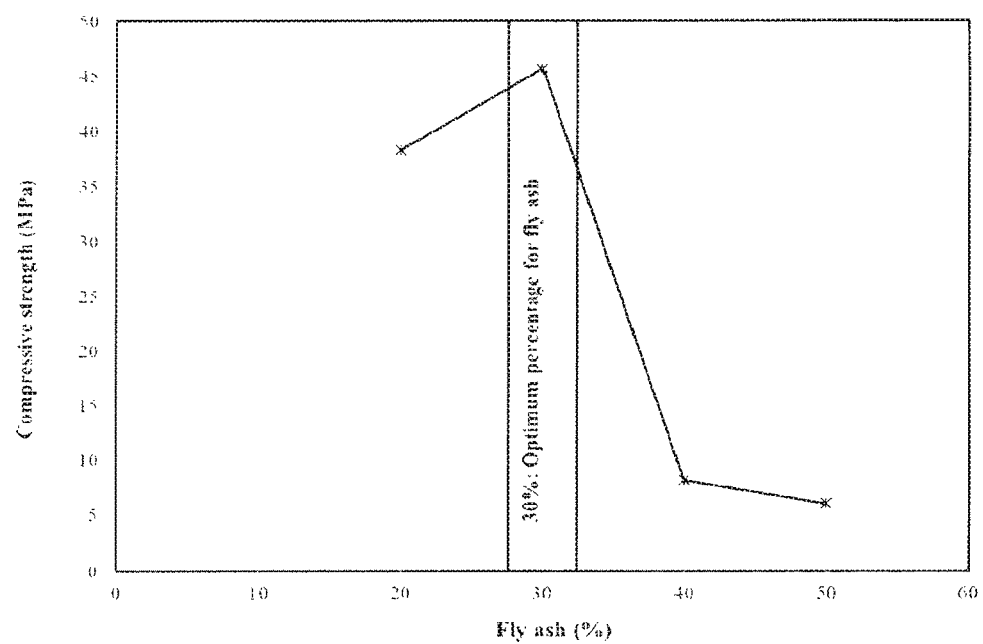
FIG. 26 is a graph showing compressive strength for different fly ash percentages of a produced cement product according to one exemplary embodiment.

The parametric study was carried out to determine the optimal fly ash supplemental additions and clinkering temperature. An arbitrary temperature of 1250° C. was initially chosen and fixed while different raw mixes were prepared from ladle slag and fly ash. Table 19 presents the results of compressive strength and $CO_2$ uptake for cement produced at variable percentages of fly ash after being carbonated for 24 hours. As illustrated in FIG. 26, an increase in fly ash percentage from 20% to 30% increased the compressive strength (measured immediately after carbonation) from 38.3 MPa to 45.7 MPa. Meanwhile, introduction of more fly ash in the mixes did not behave proportionally, and these samples displayed lower compressive strength. The values of carbon dioxide uptake for samples made with slag-20% fly ash and slag-30% fly ash were almost identical, and higher compared to cement produced with 40% and 50% fly ash, suggesting that the optimal percentage of fly ash was found to be about 30%. To optimize energy consumption, different temperatures for processing were employed for the selected mix of slag and fly ash. The different processing temperatures were 800° C., 900° C., 1000° C., 1100° C., 1200° C. and 1250° C., and results for compressive strength and carbon dioxide uptake after 2 hours of carbonation are presented in Table 20. Results reveal that there is an incremental increase in compressive strength with increased clinkering temperature; however, $CO_2$ uptake remained relatively the same for the various temperatures. Considering the values of the comparative analyses, the optimal percentage of fly ash and clinkering temperature for producing cement from ladle slag and fly ash was 30% and 1250° C., respectively. While higher temperature heat treatments could have potentially yielded higher strength, based on the observed trend, the experimental program opted to cap the clinkering temperature at 1250° C. for energy efficiency and practicality (ordinary cement production is normally carried out at 1450° C.).

TABLE 19

Chemical composition of raw materials and produced cement

| ID | FTL1 | FTL2 | FTL3 | FTL4 |
|---|---|---|---|---|
| Fly ash content (%) | 20 | 30 | 40 | 50 |
| Clinkering temperature (° C.) | 1250 | 1250 | 1250 | 1250 |
| Carbonation time (h) | 24 | 24 | 24 | 24 |
| Compressive strength (MPa) | 38.3 ± 12.0 | 45.7 ± 10.3 | 8.2 ± 1.7 | 6.0 ± 0.9 |
| Carbon dioxide uptake (%) | 8.9 ± 0.1 | 6.5 ± 0.3 | 3.4 ± 0.2 | 1.6 ± 0.4 |

TABLE 20

Results of cement produced at different clinkering temperature

| ID | FTL5 | FTL6 | FTL7 | FTL8 | FTL9 | FTL10 |
|---|---|---|---|---|---|---|
| Fly ash content (%) | 30 | 30 | 30 | 30 | 30 | 30 |
| Clinkering temperature (° C.) | 800 | 900 | 1000 | 1100 | 1200 | 1250 |
| Carbonation time (h) | 2 | 2 | 2 | 2 | 2 | 2 |
| Compressive strength (MPa) | 10.1 ± 2.2 | 10.2 ± 1.8 | 7.4 ± 2.2 | 11.7 ± 2.2 | 15.3 ± 1.3 | 24 ± 6.2 |
| Carbon dioxide uptake (%) | 3.9 ± 0.8 | 4.0 ± 0.1 | 5.0 ± 0.6 | 3.4 ± 0.6 | 7.4 ± 0.7 | 4.1 ± 0.1 |

The chemical compositions of cement produced with 30% fly ash at 1250° C. are also presented in Table 18. Synthesized cement showed lower CaO content and higher $SiO_2$ and $Al_2O_3$ contents compared to ladle slag. The latter is attributed to the fly ash additive, which is inherently high in $SiO_2$ and $Al_2O_3$. This modification shifts the composition of the material in the primary crystalline phase diagram of the CaO—$Al_2O_3$—$SiO_2$ toward the production of the $C_2S$ phase. The free lime content of ladle slag, which is considered as a source of problems for construction applications, dropped from 10.80% to 0.11%, indicating that this oxide was consumed during the cement production and formed calcium silicates upon reacting with silica. Zong et al. (2009) introduced fly ash at 5% as an additive to change the structure of slag to improve its grindability. In their study, the mixture of slag and fly ash was melted at high temperature and the molten state was then cooled down rapidly by high pressure air quenching. Their modified slag showed lower free CaO content and higher CS and $\beta$-$C_2S$ contents. One important observation to be related is the compositional relationship between the CaO and $SiO_2$ ratio in the raw mix, or basicity ratio. Regardless of the additive source or type, the production of cement from ladle slag was found achievable by bringing the basicity (CaO/$SiO_2$) ratio to 2.6, achieved in this study through using fly ash.

Figure 27:
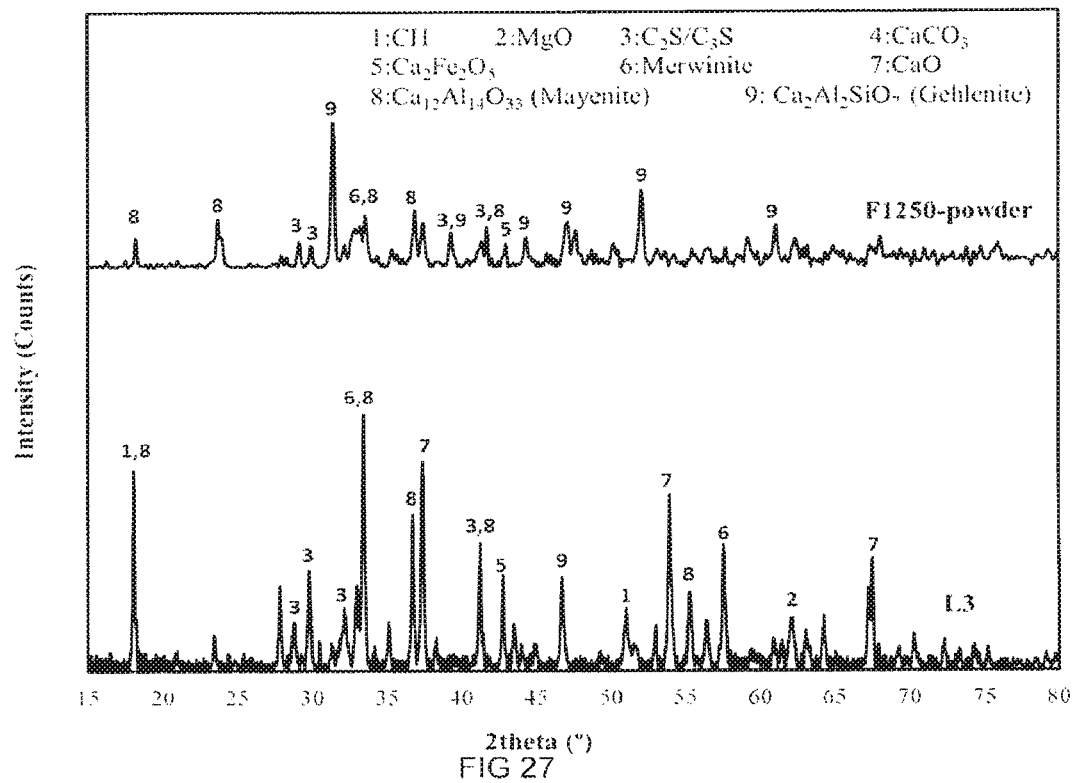
FIG. 27 is a graph showing XRD patterns for ladle slag and produced cement product according to one exemplary embodiment.

The XRD pattern of cement is illustrated in FIG. 27. The identification of phases suggests that the major phases of the cement included mayenite and gehlenite, whereas di-calcium ferrite, calcium oxide and merwinite were detected in trace amounts. The value of free lime revealed a negligible presence in the sample, confirming findings from the XRD analysis. It is believed that the addition of fly ash, revealed to be rich in silica and alumina, contributed to the generation of more gehlenite during the clinkering process. Executing the clinkering process with fly ash eliminated the calcium hydroxide in the ladle slag. As shown in Table 18, the results of QXRD suggest that the C25 content of produced cement with 30% fly ash at 1250° C. increased by 45% compared to ladle slag.

Figure 28:
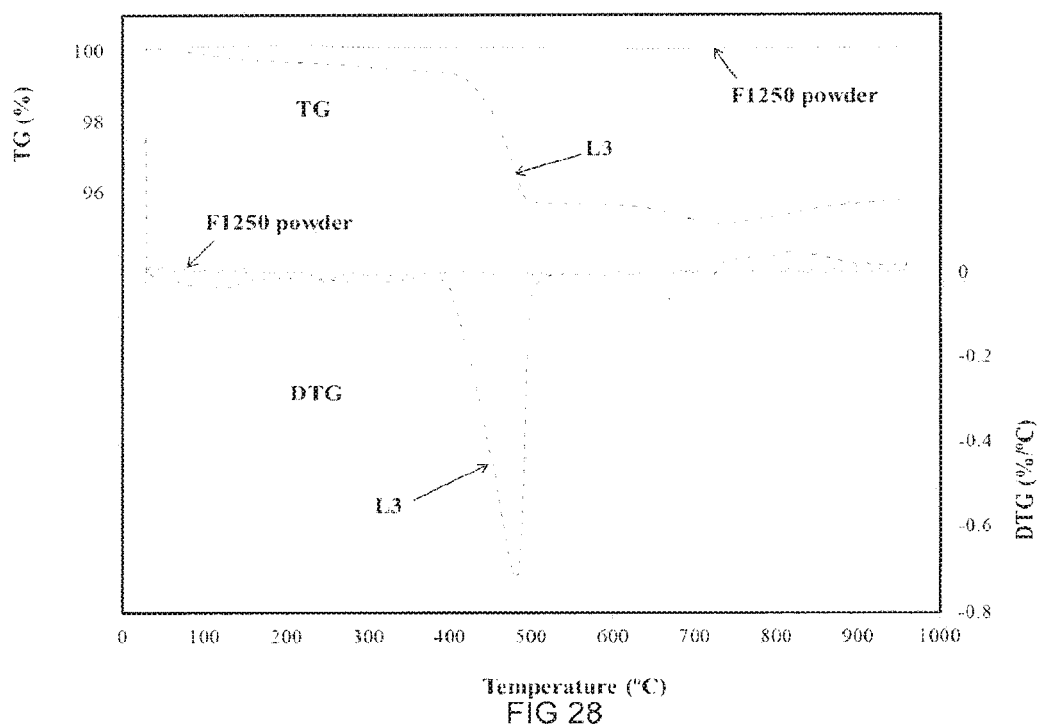
FIG. 28 is a graph showing thermogravimetric analysis and differential thermogravimetric analysis for ladle slag and produced cement product according to one exemplary embodiment.

As shown in FIG. 28, the TG curve of cement displayed no weight loss. This means that no phases prone to thermal decomposition were present in the produced cement. The flat line from 450° C. to 550° C. in the DTG curve for the cement confirms the elimination of the calcium hydroxide phase.

Figure 29:
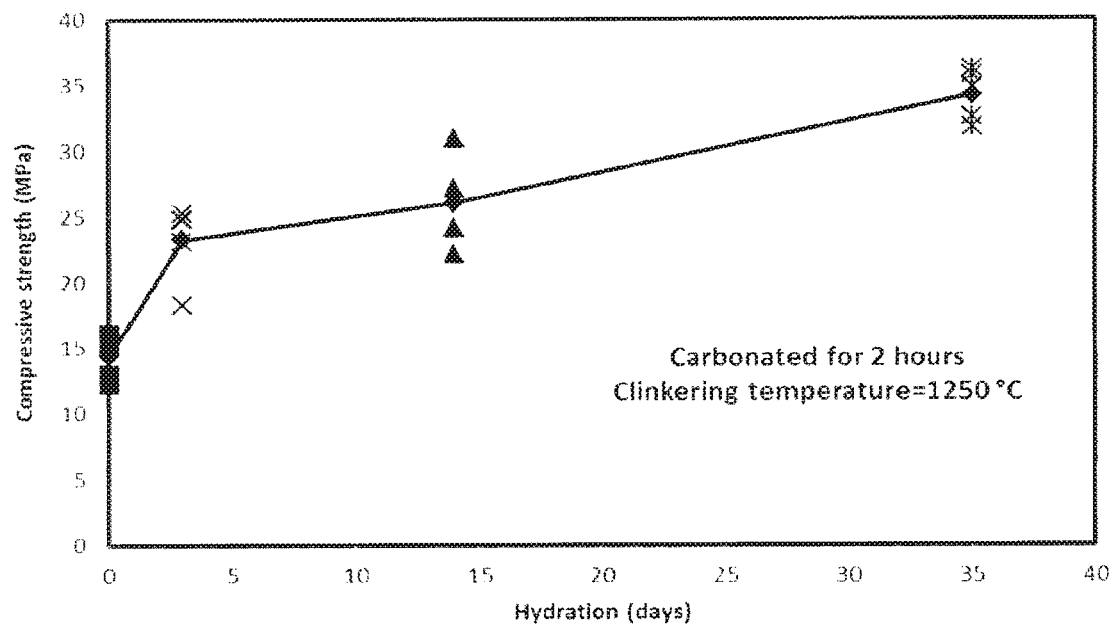
FIG. 29 is a graph showing compressive strength for different durations of hydration according to one exemplary embodiment.

Table 21 shows the results of compressive strength and $CO_2$ uptake for samples made with produced cement which were subjected to 2 hours carbonation and variable periods of subsequent hydration, with the exception of the first sample which had only undergone hydration. The results show that the non-carbonated samples gained relatively considerable strength after 35 days of hydration, indicating that the clinkering process promoted the formation of hydraulic phases that were not previously present in either slag or fly ash. As shown in FIG. 29, an increase in the hydration time of the carbonated sample increased the compressive strength. The compressive strength of samples immediately tested after 2 hours of carbonation achieved an average of 14.4 MPa, and was further increased to 34.2 MPa when similarly processed samples were followed by 35 days of hydration. The compressive strength of the carbonated sample (made with synthesized cement) subjected to 35 days hydration was higher compared to the compressive strength of the carbonated sample plus compressive strength of the non-carbonated sample hydrated for 35 days. The carbonation of samples seemed to improve the hydration reaction as noted from the subsequent strength gain and compared to strength results of the hydrated-only sample. In other words, carbonation promoted strength gain. As is also shown in Table 21, the carbon dioxide uptakes of samples made with produced cement were consistent and all obtained values less than 3 wt % after undergoing 2 hours of carbonation. It is worth noting that although the carbon dioxide uptake was not significant, the compressive strength reached values potentially sufficient for practical demonstration. It is believed that the enhanced strength gain arising from the implemented curing is a result of the composite action generated by the precipitated calcium carbonate crystals and the hydration products. Based on this occurrence, even small carbon dioxide uptakes can correspond to considerable mechanical enhancement and a high strength in final product.

TABLE 21

Compressive strength of samples cured at different ages

| ID | Carbonation (h) | Hydration (days) | $CO_2$ uptake (%) | Compressive strength (MPa) |
|---|---|---|---|---|
| F1250-1 | 0 | 35 | — | 13.9 ± 2.1 |
| F1250-2 | 2 | 0 | 2.5 ± 0.3 | 14.4 ± 1.7 |
| F1250-3 | 2 | 3 | 2.6 ± 0.2 | 23.3 ± 2.9 |
| F1250-4 | 2 | 14 | 2.6 ± 0.0 | 26.1 ± 3.8 |
| F1250-5 | 2 | 35 | 2.4 ± 0.5 | 34.2 ± 2.0 |

Figure 30:
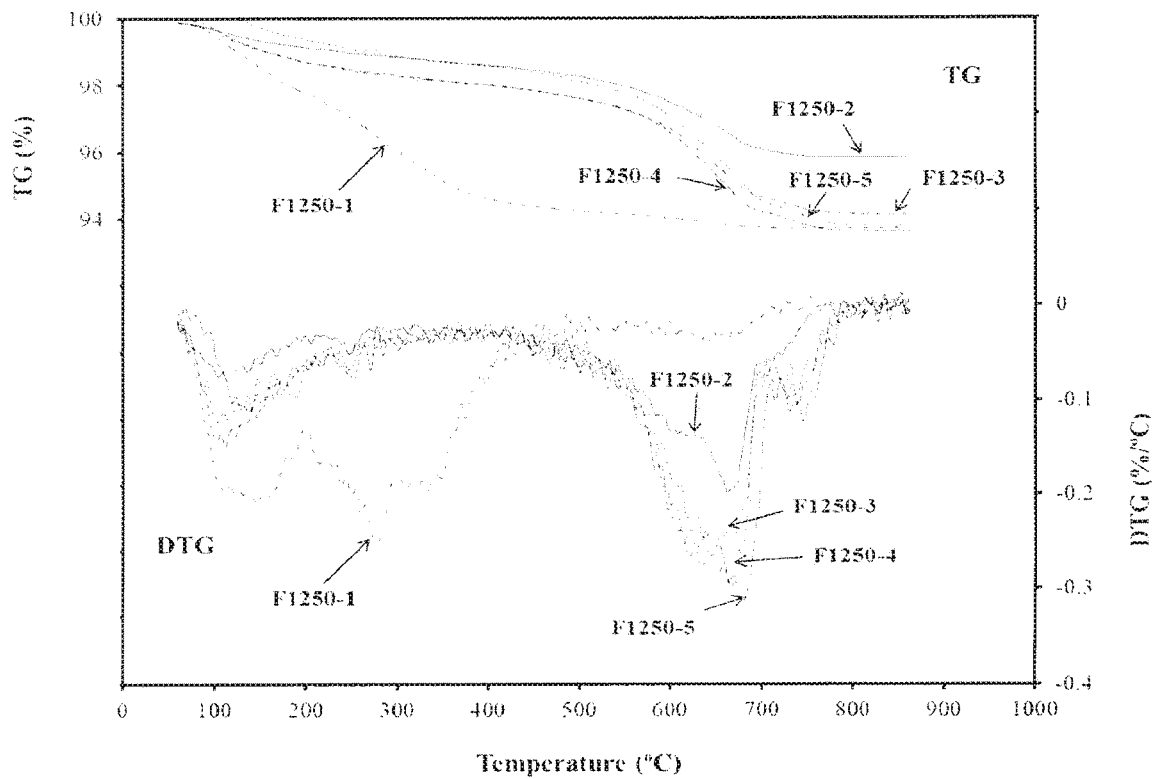
FIG. 30 is a graph showing thermogravimetric analysis and differential thermogravimetric analysis for samples subjected to different carbonation and hydration durations according to one exemplary embodiment.

FIG. 30 shows the TG/DTG curves of samples subjected to different curing regimes. The $CO_2$ uptake of carbonated samples was calculated by considering the mass loss experienced above 550° C. As presented in Table 21, it can be seen that the values of $CO_2$ uptake calculated based on the mass gain and TG methods were almost equivalent. The mass loss from 105° C. to 450° C. represents the hydration products. The C—S—H and CH content of carbonated samples increased with an increase of subsequent hydration period. Although the hydration products of the hydrated sample (F1250-1) were higher than the hydration products of carbonated sample exposed to hydration for 35 days, the compressive strength of the carbonated sample (F1250-5) was significantly higher due to the composite action. Therefore, one may conclude that the coexistence of calcium carbonates and hydration products in a cementitious system contributes to better strength than hydrated systems solely based on C—S—H for strength contribution.

Figure 31:
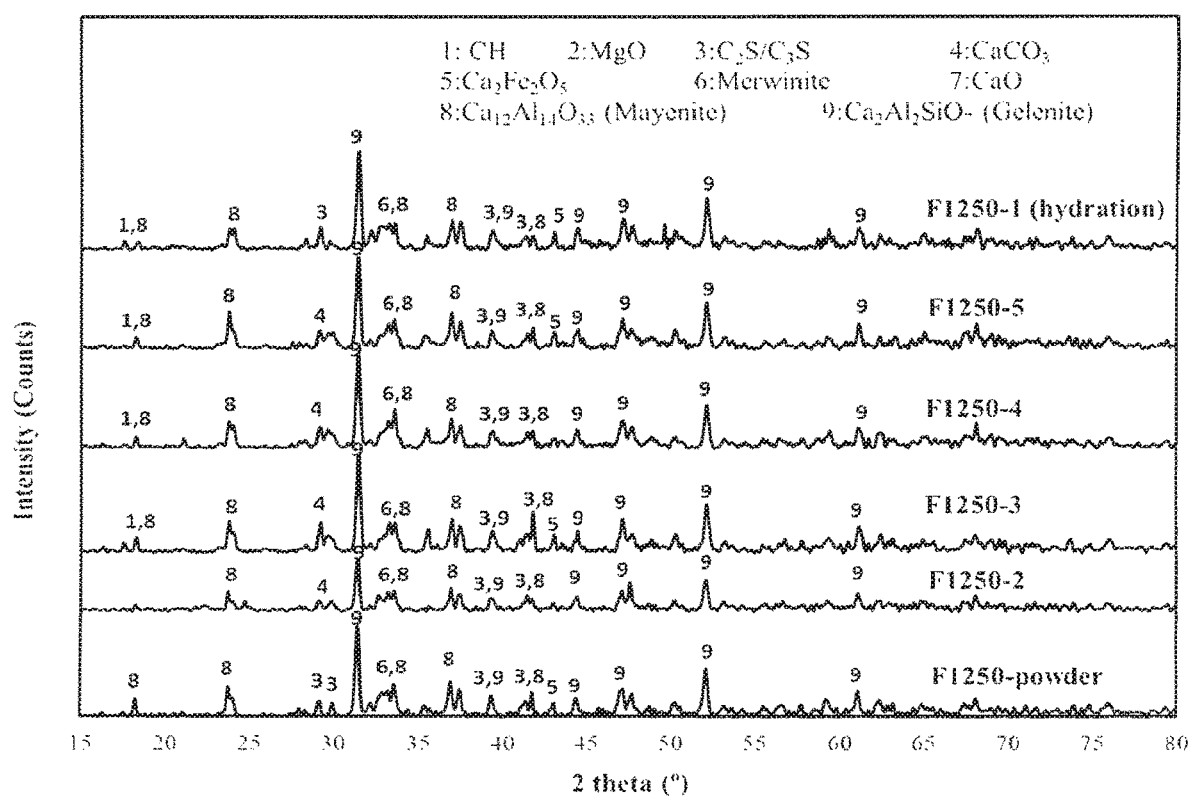
FIG. 31 is a graph showing XRD patterns for samples subjected to different carbonation and hydration durations according to one exemplary embodiment.

FIG. 31 illustrates the XRD patterns of non-cured cement, hydrated cement and carbonated samples subject to variable durations of subsequent hydration. Comparing the patterns of the carbonated sample to the non-cured powder, one can notice that the calcium silicate phase is consumed during carbonation to form the calcium carbonate phase, indicated by label "4" in the figure. The low intensity of the peak at 2θ of 29° is reflective of the low $CO_2$ uptake achieved by this sample. Gehlenite did not effectively react with $CO_2$ as the intensity of their respective peaks did not substantially change after carbonation curing. Meanwhile, a slight reduction of peaks for mayenite suggests its low reactivity with carbon dioxide. The peaks for the CH phase were characteristically weak in intensity. Due to the observation of no significant jump in the CH peak for the carbonated samples subjected to 0, 3, 14 and 35 days of hydration, one can conclude that only small quantities of CH were generated over this period. It is worth noting that the intensity of non-carbonatable (or non $CO_2$-reactive) phases, such as merwinite and gehlenite, remained constant throughout the various curing ages. In other words, calcium, if bonded to either Si/Mg or Si/Al, cannot participate in a reaction with carbon dioxide.

Cement made solely from waste materials is possible to be made as low-energy cement. Instead of limestone, a typical source of calcium oxide in cement production, ladle slag was introduced as a proper replacement for limestone. Production of cement from waste materials is feasible at a temperature which is 200° C. lower than Portland cement production. Lower energy consumption, preservation of natural resources, and diversion from landfills are among the important benefits gained from implementing such a process at a practical level.

In this experimental program, limestone was totally replaced by ladle slag to produce environmentally-friendly cement. Fly ash was introduced to react with ladle slag at high temperature to promote the formation of calcium silicate phases. Mixtures of ladle slag and fly ash were subject to an optimized clinkering process devised to promote calcium silicate phases. The synthesized cement exhibits a more environmentally-friendly and energy efficient material than conventional Portland cement.

The synthesized cement displayed strength development when subject to carbonation, hydration, and both combined. The results also suggest that carbonation curing increased the strength gain associated with subsequent hydration. The composite action generated by calcium carbonate and hydration products eventually plays an important role in gaining strength.

The results of this study show that ladle slag can be mixed with fly ash at a 30 percent ratio to make cement synthesized at a temperature of 1250° C. The higher the clinkering temperatures used, the higher the carbonation and hydration reactivity of the cement. Based on the availability of ladle slag and fly ash, these materials can be used to produce cement with the ability of gaining strength through the carbonation/hydration curing. Production of the proposed material can reduce the energy consumption, the natural resources consumption, the $CO_2$ disposal cost, waste materials landfills and the total $CO_2$ emission.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative and non-limiting and it will be understood by persons skilled in the art that other variants and modifications may be made without departing from the scope of the invention as defined in the claims appended hereto.

REFERENCES

Atis, C, Bilim, C., Celik, O. and Karahan, O. (2009) *"Influence of activator on the strength and drying shrink-* age of alkali-activated slag mortar." Construction and Building Materials 23(1): 548-555.

CCMPA, Canadian Concrete Masonry Producer Association, Metric Technical Manual, Physical properties, 28p.

Concrete Blocks, 2009, http://www.sustainable-buildings.org/wiki/ndex.php/Concrete_Blocks, As of 2013.

El-Hassan, H. (2012) "Static and dynamic carbonation of lightweight concrete masonry units." PhD thesis, McGill University, Canada, 214 p.

Houghton, J., T. (2004) "Global warming: The Complete Briefing." Cambridge University Press, 351 p.

Johnson, D. C. (2000) "Accelerated carbonation of waste calcium silicate materials." SCI lecture paper series.

Maslin, M. (2007) "Global warming: Causes, Effects, and the Future." Voyageur Press, 72 p.

Monkman, S., Shao, Y. (2006) "Assessing the carbonation behavior of cementitious materials." Journal of Materials in Civil Engineering. 18(6): 768-776.

Murphy, J., Meadowcroft, T., Barr, P. (1997) "Enhancement of the cementitious properties of steelmaking slag." 36(5): 315-331.

National Research Council (2011) "American's Climate Choices." Washington D.C., 144 p.

Nisbet, M., Venta, G. (2000) "Fiber-cement in the USA: past, present and the future, Conference proceeding, Inorganic-bonded wood and fiber composite material. 7: 248-257.

Precast Concrete Products, "Demand for precast concrete products to reach $11.3 billion in 2015", http://www.concreteconstruction.net/precast-concrete/demand-for-precast-concrete-products-to-reach-113-billion-in-2015.aspx,/ As of November 2013.

Reddy, A., Pradhan, R., Chandra, S. (2006) "Utilization of basic oxygen furnace slag in the production of hydraulic cement binder." International Journal of Mineral Processing. 79(2): 98-105.

WorldSteel Association (2010) "Factsheet: Steel industry by-products—Achieving the goal of zero-waste." 2p.

Young, J., Berger, R., Breese J. (1974) "Accelerated curing of compacted calcium silicate mortars on exposure to CO2." Presented at 75th annual meeting, The American Ceramic Society, Cincinnati, USA.

Baciocchi, R., Costa, G., Polettini, A., Pomi, R. (2009) "Influence of particle size on the carbonation of stainless steel slag for CO2 storage." Energy Procedia 1(1): 4859-4866.

Canadian Slag Association (2009) http://canslag.ca/techinfo.html, As of May 2014.

Das, B., Prakash, S., Reddy, P S R., Misra, V. N. (2007) "An overview of utilization of slag and sludge from steel industries. Resources Conservation and Recycling. 50(1): 40-57.

Dippenaar, R. (2005) "Industrial uses of slag (the use and re-use of iron and steelmaking slags)." Ironmaking and Steelmaking. 32:35-46.

Euroslag (2010) http://www.euroslag.com/products/statistics/2010/, As of November 2013.

Huijgen, W, Ruijg, G., Comans, R., Witkamp, G. (2006) "Energy consumption and net CO2 sequestration of aqueous mineral carbonation." Industrial and Engineering Chemistry Research. 45(26): 9184-9194.

Isoo, T., Takahashi, T., Okamoto, N., Fukuharat, M. (2000) "Development of large steelmaking slag blocks using a new carbonation process." Advances in Cement Research. 12(3): 97-101.

Juckes, L. M. (2003) "The volume stability of modern steelmaking slags." Mineral Processing and Extractive Metallurgy. 112(3): 177-197.

Li, G., Ni, H. (2011) "Recent progress of the stage processing for steelmaking slags in China considering stability and heat recovery." 2nd International Slag Valorisation Symposium, Leuven, Belgium.

Li, J., Yu., Q., Wei, J., Zhang, T. (2011) "Structural characteristics and hydration kinetics of modifies steel slag." Cement and Concrete Research. 41(3): 324-329.

Manso, J., Losanez, M., Polanco, A., Gonzalez, J. (2005) "Ladle furnace slag in construction." Journal Of Materials In Civil Engineering. 17(5): 513-518.

Monkman, S., Shao, Y., Shi, C. (2009) "Carbonation ladle slag fines for carbon uptake and sand substitute." Journal of Materials in Civil Engineering. 21(11): 657-665.

Motz, H., Geiseler, J. (2011) "Products of steel slags an opportunity to save natural resources." Waste Management. 21(3): 285-293.

Muhmood, L., Vitta, S., Venkateswaan, D. (2009) "Cementitious and pozzolanic behavior of electronic arc furnace steel slags." Cement and Concrete Research. 39(2): 102-109.

Netinger, I., BjegoVic, D., Vrhovac, G. (2011) "Utilization of steel slag as aggregate in concrete." Materials and Structures. 44(9): 1565-1575.

Nippon Slag Association (2012) http://www.slg.jp/e/statistics/index.html, Retrieved in May 2014.

Pal, S., Mukherjee, A., Pathak, S. (2003) "Investigation of hydraulic activity of ground granulated blast furnace in concrete." Cement and Concrete Research. 33(9): 1481-1486.

Radenovic, A., Malina, J., Sofilic, T. "Characterization of Ladle Furnace Slag from Carbon Steel Production as a Potential Adsorbent." (2013) Advances in Materials Science and Engineering. Article ID 198240, 6 pages.

Sajedi, F., Abdul Razak, H. (2010) "The effect of chemical activators on early strength of ordinary Portland cement-slag mortars." Construction and Building Materials. 24(10): 1944-1955.

Shi, C. (2004) "Steel slag-its production, processing, characteristics, and cementitious properties." Journal of Materials in Civil Engineering. 16(3): 230-236.

Shi, C. (2002) "Characteristics and cementitious properties of ladle slag fines from steel production." Cement and Concrete Research. 32(3): 459-462.

Shi, C., Qian, J. (2000) "High performance cementing materials from industrial slags-a review." Resources, Conservation and Recycling. 29(3): 195-207.

Tossavainen, M., Engstrom, F., Yang, Q., Menad, M. (2007) "Characteristics of steel slag under different cooling conditions." Waste Management. 27(10): 1335-1344.

Wang, Q., Yan, P., Feng, J. (2011) "A discussion on improving hydration activity of steel slag by altering its mineral compositions." Journal of Hazardous Materials. 186(2-3): 1070-1075.

Yildirim, I., Prezzi, M. (2011) "Chemical, mineralogical, and morphological properties of steel slag." Advances in Civil Engineering. Article ID 463638, 13 pages.

Zevenhoven, R., Wiklund, A., Fagerlund, J., Eloneva, J., Veen, B., Geerlings, H., Mossel, G., Boerrigter, H. (2010) "Carbonation of calcium-containing mineral and industrial by-products." Frontiers of Chemical Engineering in China, 4: 110-119.

Zomeren, A., Laan, S., Kobesen, H., Huijgen, W, Comasn, R. (2011) "Changes in mineralogical and leaching properties of converter steel slag resulting from accelerated carbonation at low CO2 pressure." *Waste Manage.* 31(11): 2236-2244.

Zong, Y., Cang, D., Zhen, Y., Li, Y., Bai, H. 2009 "Component modification of steel slag in air quenching process to improve grindability." *Transactions of Nonferrous Metals Society of China.* 19(3): 834-839.

Adolfsson, D., Menad, N., Viggh, E., Björkman, B. (2007) "Hydraulic properties of sulphoaluminate belite cement based on steelmaking slags." *Advances in Cement Research.* 19(3): 133-138.

Adolfsson, D., Robinson, R., Engstrom, F., Bjorkman, B. (2011) "Influence of mineralogy on the hydraulic properties of ladle slag." *Cement and Concrete Research.* 41(8): 865-871.

ASTM C114 (2011) "Standard test methods for chemical analysis of hydraulic cement." ASTM International, PA, USA.

Chung, F. (1974) "Quantitative interpretation of x-ray diffraction patterns of mixtures. I. Matrix-flushing method for quantitative multicomponent analysis." *Journal of Applied Crystallography.* 7:519-525.

He, F., Xu, A., Wang, H., He, D., Tian, N. (2012) "End temperature prediction of molten steel in LF based on CBR." *Steel Research International.* 83(11): 1079-1086.

Monkman, S, Shao, Y., Shi, C. (2009) "Carbonated ladle slag fines for carbon uptake and sand substitute." *Journal of Materials in Civil Engineering.* 21(11): 657-665.

Murri, A., Rickard, W. D. A., Bignozzi, M. C., Van Riessen, A. (2013) "High temperature behaviour of ambient cured alkali-activated materials based on ladle slag." *Cement and Concrete Research.* 43:51-61.

Papayianni, I., Anastasiou, E. (2012) "Effect of granulometry on cementitious properties of ladle furnace slag." *Cement and Concrete Composites.* 34(3): 400-407.

Posch, W, Presslinger, H., Hiebler, H. (2002) "Mineralogical evaluation of ladle slags at voestalpine stahl GmbH." *Ironmak Steelmak.* 29(4): 308-312.

Rodriguez, A., Manso, J. M., Aragon, A., Gonzalez, J. J. (2009) "Strength and workability of masonry mortars manufactured with ladle furnace slag." *Resources, Conservation and Recycling.* 53(11): 645-651.

Segui, P., Aubert, J., Husson, B., Measson, M. (2013) "Valorization of wastepaper sludge ash as main component of hydraulic road binder." *Waste and Biomass Valorization.* 4(2): 297-307.

Setién, J., Hernandez, D., Gonzalez, J. J. (2009) "Characteristics of ladle furnace basic slag for use as a construction material." *Construction and Building Materials.* 23(5): 1788-1794.

Shi, C., Hu, S. (2003) "Cementitious properties of ladle slag fines under autoclave curing conditions." *Cement and Concrete Research.* 33(11): 1851-1856.

Champenois, J., Coumes, C., Poulesquen, A., Bescop, P., Damidot, D. (2013) "Beneficial use of a cell coupling rheometry, conductimetry, and calorimetry to investigate the early age hydration of calcium sulfoaluminate cement." *Rheologica Acta.* 52(2): 177-187.

Chen, I., Juenger, M. (2012) "Incorporation of coal combustion residuals into calcium sulfoaluminate-belite cement clinkers." *Cement and Concrete Composites.* 34(8): 893-902.

Georgescu, M., Tipan, J., Badanoiu, L., Crisan, D., Dragan, I. (2000) "Highly reactive dicalcium silicate synthesised by hydrothermal processing." *Cement and Concrete Composites.* 22(5): 315-319.

Janotka, I., Krajèi, U., Mojumdar, S. C. (2007) "Performance of sulphoaluminate-belite cement with high c4a3s content." *Ceramics.* 51(2): 74-81.

Kacimi, L., Simon-Masseron, A., Salem, S., Ghomari, A., Derriche, Z. (2009) "Synthesis of belite cement clinker of high hydraulic reactivity." *Cement and Concrete Research.* 39(7): 559-565.

Rostami, V., Shao, Y., Boyd, A. (2011) "Durability of concrete pipes subjected to combined steam and carbonation curing." *Building and Construction Materials.* 25(8): 3345-3355.

Singh, N., Rai, S., Singh, N. (2002) "Highly reactive β dicalcium silicate." *Journal of American Ceramic Society.* 85: 2171-2176.

Singh, N. (2006) "Hydrothermal synthesis of β-dicalcium silicate (β-Ca2SiO4)." *Progress in Crystal Growth and Characterization of Materials.* 52: 77-83.

Taylor, H. F. W. (1997) "Cement chemistry." Second edition, Thomas Telford Publishing, 459 p.

Uibu, M., Kuusik, R., Andreas, L., Kirsimae, K. (2011) "The CO2-binding by Ca-Mg-silicates in direct aqueos carbonation of oil shale ash and steel slag." *Energy Procedia* 4: 925-932.

Ukrainczyk, N., Mihelj, N., Sipusic. J. (2013) "Calcium sulfoaluminate eco-cement from industrial waste." *Chemical and Biochemical Engineering.* 27(1): 83-93.

British Geological Survey (2005) "Mineral profile: Cement raw materials." Office of the Deputy Prime Minister. 20 p.

Bye, G. C. (1999) "Portland cement Thomas Telford" 225 p.

Jankovic, A., Valery, W, Davis, E. (2004) "Cement grinding optimisation." *Minerals Engineering.* 17(11): 1075-1081.

Komljenovic, M., Petrainovi-Stojkanovi, L. J., Baarevi, Z., Jovanovi, N., Rosi, A. (2009) "Fly ash as the potential raw mixture component for Portland cement clinker synthesis." *Journal of Thermal Analysis and calorimetry.* 96(2): 363-368.

Madlool, N. A., Saidur, R., Hossain, M. S., Rahim, N. A. (2011) "A critical review on energy use and savings in the cement industries." *Renewable and Sustainable Energy Reviews.* 15:4: 2042-2060.

Sherman, N., Beretkal, J., Santoro, L., Valenti, G. L. (1995) "Long-term behaviour of hydraulic binders based on calcium sulfoaluminate and calcium sulfosilicate." *Cement and Concrete Research.* 25(1): 113-126.

Wang, J., Dai, Y., Gao, L. (2009) "Energy analyses and parametric optimizations for different cogeneration power plants in cement industry." *Applied Energy.* 86(6): 941-948.

Akers, S., Studinka J. (1989) "Ageing behaviour of cellulose fibre cement composites in natural weathering and accelerated tests" *The International Journal of Cement Composites and Lightweight Concrete.* 11(2): 93-97.

ASTM C90 (2014) "Standard specification for loadbearing concrete masonry units." ASTM International; PA, USA.

ASTM C1185 (2012) "Standard test methods for sampling and testing non-asbestos fiber-cement flat sheet, roofing and siding shingles, and clapboards." ASTM International; PA, USA.

Cement Association of Canada (2013) http://www.cement.ca/en/Manufacturing/History-of-Cement.html, as of August 2013.

CSA A23.1 (2009) "Concrete materials and methods of concrete construction/Test methods and standard practices for concrete." Canada.

Fuwape, J., Fabiyi, J., Osuntuyi, E. (2007) "*Technical assessment of three layered cement-bonded boards produced from wastepaper and sawdust.*" *Waste Management.* 27(11): 1611-1616.

Guntekin, E., Sahin, H. (2009) "*Accelerated weathering performance of cement bonded fiberboard.*" *Scientific Research and Essay.* 4(5): 484-492.

Haoze, W, Jun, C., Zhenzhao, P., Xin, C. (2011) "*Effects of carbonation on steel slag products.*" *Advanced Materials Research.* 177: 485-488.

Johnson, D. C., Macleod, C., Cray, P., Hills, C. (2003) "*Solidification of stainless steel slag by accelerated carbonation.*" *Environmental Technology.* 24(6): 671-678.

Mohr, B., Nanko, H., Kurtis, K. (2005) "*Durability of kraft pulp fiber-cement composites to wet/dry cycling*" *Cement and Concrete Composites.* 27(4): 435-448

Monkman, S., Shao, Y. (2010) "*Carbonation curing of slag-cement concrete for binding CO2 and improving performance.*" *Journal of Materials in Civil Engineering.* 22: 296-304

Monkman, S., Shao, Y. (2010b) "*Integration of carbon sequestration into curing process of precast concrete.*" *Canadian Journal of Civil Engineering.* 37: 302-310

Monkoman, S. (2008) "*Maximizing carbon uptake and performance gain in slag-containing concretes through early carbonation.*" *PhD thesis*, McGill University, Canada, 222 p.

Rostami, V., Shao, Y., Boyd, A., He, Z. (2012) "*Microstructure of cement paste subject to early carbonation curing.*" *Cement and Concrete Research.* 42(1): 186-193.

Simatupang, M., Habighorst, C., Lang, H., Neubauer, A. (1995) "*Investigations on the influence of the addition of carbon dioxide on the production and properties of rapidly set wood-cement composites.*" *Cement and Concrete Composites.* 17(3): 187-197.

Soroushian, P., Wonb, J., Hassan, M. (2012) "*Durability characteristics of CO2-cured cellulose fiber reinforced cement composites.*" *Construction and Building Materials.* 34: 44-53

Soroushian, P., Marikunte, S., Won, J. (1994) "*Wood fiber reinforced cement composites under wetting-drying and freezing-thawing cycles.*" *Journal of Materials in Civil Engineering.* 6(4): 595-611.

Transportation Association of Canada (2013) "*Integration of carbon dioxide curing into precast concrete production.*" http://www.tac-atc.ca/english/resourcecentre/readingroom/conference/conf2010/docs/k3/niven.pdf, as of Aug. 25, 2013.

Turgut, P. (2007) "*Cement composites with limestone dust and different grades of wood sawdust.*" *Building and Environment.* 42(11): 3801-3807.

The invention claimed is:

1. A building product, comprising:
    a granular material; and
    a binder consisting of steel slag, wherein the steel slag has a cumulative calcium silicate content of at least about 20% and a free lime content of less than about 7%;
    wherein the building product is a construction block wherein said construction block has a durability and mechanical properties meeting masonry units requirements assessed under standards BS 6073 (2008), CSA A23.1 (2009) and ASTM C90.

2. The building product of claim 1, wherein the steel slag has a silicon dioxide content of at least about 6%.

3. The building product of claim 1, wherein the steel slag comprises at least one of electric arc furnace (EAF) and basic oxygen furnace (BOF) slag.

4. The building product of claim 3, wherein the steel slag comprises a mixture of EAF and BOF slags.

5. The building product of claim 4, wherein the steel slag comprises ladle slag.

6. The building product of claim 1, wherein the steel slag comprises slag of a fineness greater than about 150 $m^2/kg$.

7. The building product of claim 1, wherein the granular material is chosen from natural lightweight aggregate, expanded clay aggregate, expanded shale aggregate, expanded slag aggregate, expanded steel slag aggregate and expanded iron slag aggregate.

8. The building product of claim 1, comprising at least 30% of steel slag with reference to the total mass of the building product.

9. The building product of claim 1, wherein the steel slag has a cumulative calcium silicate content of at least about 30%.

10. The building product of claim 1, wherein the steel slag has a cumulative calcium silicate content of at least about 40%.

11. The building product of claim 1, comprising at least 40% of steel slag with reference to the total mass of the building product.

12. The building product of claim 1, comprising at least 50% of steel slag with reference to the total mass of the building product.

13. The building product of claim 1, comprising at least 60% of steel slag with reference to the total mass of the building product.

* * * * *